United States Patent
Yang et al.

(10) Patent No.: US 10,756,999 B2
(45) Date of Patent: Aug. 25, 2020

(54) VIRTUALIZED NETWORK FUNCTION INFORMATION OBTAINING METHOD, APPARATUS, AND SYSTEM

(71) Applicant: Huawei Technologies Co., Ltd., Shenzhen (CN)

(72) Inventors: Xu Yang, Beijing (CN); Fang Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 15/898,036

(22) Filed: Feb. 15, 2018

(65) Prior Publication Data

US 2018/0176115 A1 Jun. 21, 2018

Related U.S. Application Data

(63) Continuation of application No. PCT/CN2015/088057, filed on Aug. 25, 2015.

(51) Int. Cl.
*G06F 15/173* (2006.01)
*H04L 12/26* (2006.01)
*H04L 12/24* (2006.01)

(52) U.S. Cl.
CPC .............. *H04L 43/14* (2013.01); *H04L 41/00* (2013.01); *H04L 41/0631* (2013.01); *H04L 41/14* (2013.01); *H04L 41/20* (2013.01); *H04L 43/062* (2013.01); *H04L 43/0829* (2013.01); *H04L 43/0852* (2013.01)

(58) Field of Classification Search
USPC ........................................................ 709/224
See application file for complete search history.

(56) References Cited

U.S. PATENT DOCUMENTS

| | | | |
|---|---|---|---|
| 6,888,797 B1 | 5/2005 | Cao et al. | |
| 2015/0234725 A1 | 8/2015 | Cillis et al. | |
| 2016/0205004 A1* | 7/2016 | Chou | H04L 43/08 709/224 |
| 2016/0224409 A1 | 8/2016 | Liu et al. | |

(Continued)

FOREIGN PATENT DOCUMENTS

| | | |
|---|---|---|
| CN | 102035861 A | 4/2011 |
| CN | 104170323 A | 11/2014 |

(Continued)

OTHER PUBLICATIONS

"Network Functions Virtualisation"—Introductory White Paper, SDN and OpenFlow World Congress, Darmstadt—Germany, (Oct. 22-24, 2012).

*Primary Examiner* — Anthony Mejia
(74) *Attorney, Agent, or Firm* — Leydig, Voit & Mayer, Ltd.

(57) ABSTRACT

A VNF information obtaining method and apparatus are provided. Detailed VNF running information can be obtained, so as to provide more comprehensive and more accurate data for determining a fault cause. The method includes instantiating, by a NFVO, a VNFM based on a software package of the VNFM to establish a communication connection between the VNFM and the NFVO; and receiving, by the NFVO during monitoring, monitoring information that is sent from the VNFM after the VNFM summarizes and analyzes monitoring data of a VNF in a NS.

17 Claims, 17 Drawing Sheets

(56) References Cited

U.S. PATENT DOCUMENTS

| | | | |
|---|---|---|---|
| 2016/0315802 A1 | 10/2016 | Wei et al. | |
| 2016/0359805 A1* | 12/2016 | Spraggs | H04L 41/0806 |
| 2017/0006083 A1* | 1/2017 | McDonnell | H04L 67/06 |
| 2017/0208147 A1* | 7/2017 | I'Anson | H04L 47/82 |
| 2017/0257276 A1* | 9/2017 | Chou | H04L 41/0823 |
| 2017/0346676 A1* | 11/2017 | Andrianov | H04L 41/0631 |
| 2018/0152347 A1* | 5/2018 | Dhandu | H04L 41/0843 |

FOREIGN PATENT DOCUMENTS

| | | |
|---|---|---|
| CN | 104219107 A | 12/2014 |
| CN | 104685830 A | 6/2015 |
| EP | 3119034 A1 | 1/2017 |
| WO | 2014110453 A1 | 7/2014 |
| WO | 2015100611 A1 | 7/2015 |
| WO | 2015113234 A1 | 8/2015 |

* cited by examiner

During monitoring, an NFVO receives information about monitoring performed by a monitoring management entity on a to-be-monitored VNF  — S401
FIG. 13
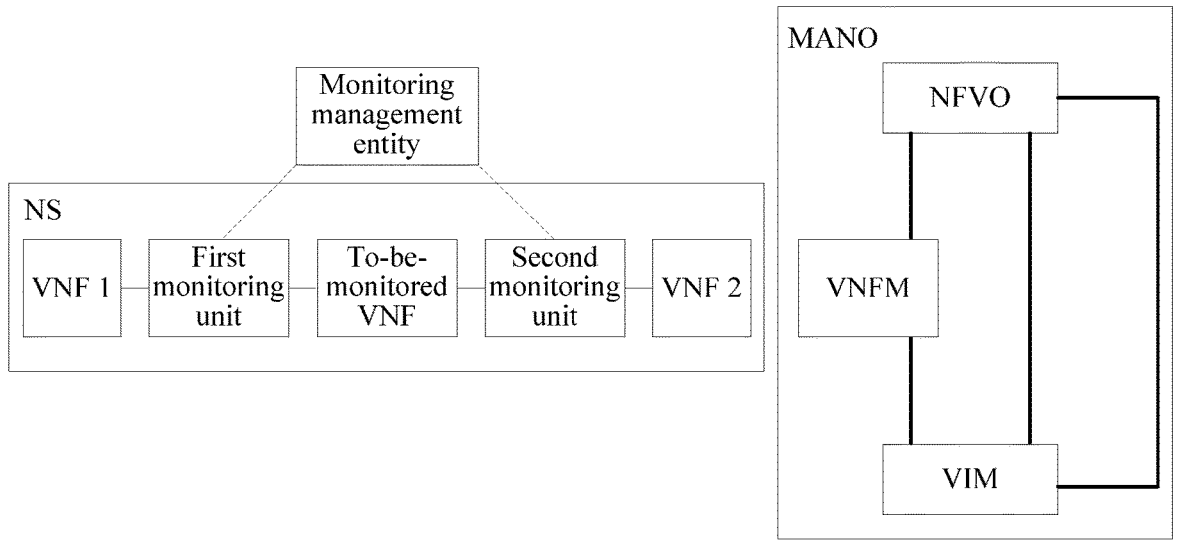
FIG. 14
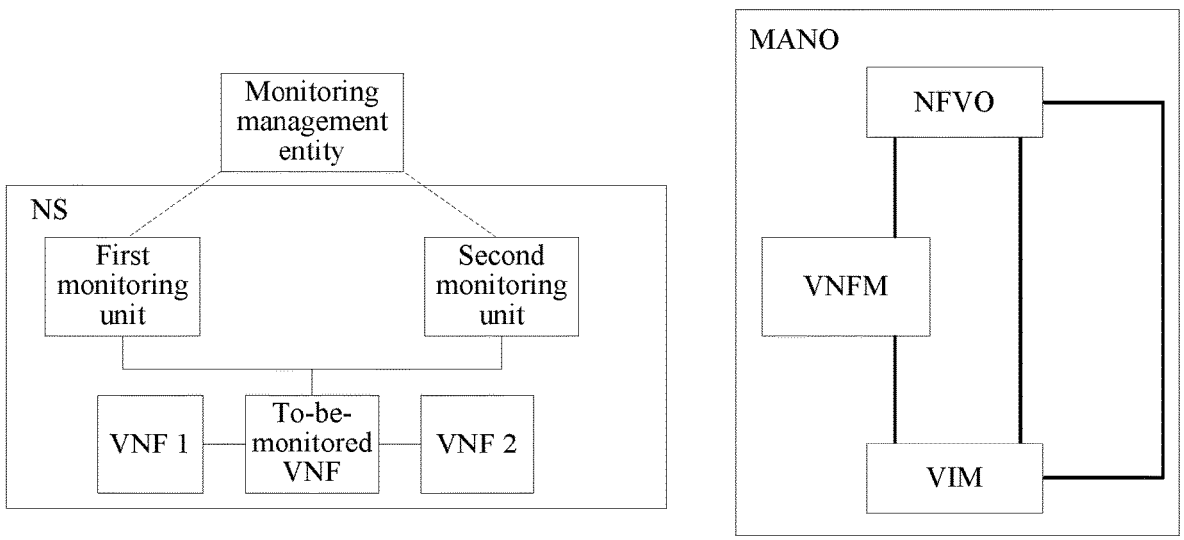
FIG. 15

VIRTUALIZED NETWORK FUNCTION INFORMATION OBTAINING METHOD, APPARATUS, AND SYSTEM

CROSS-REFERENCE TO RELATED APPLICATIONS

This application is a continuation of International Patent Application No. PCT/CN2015/088057 filed on Aug. 25, 2015. The disclosure of the aforementioned application is hereby incorporated by reference in the entity.

TECHNICAL FIELD

The disclosure relates to the field of communications technologies, and in particular, to a VNF information obtaining method, apparatus, and system.

BACKGROUND

NFV (Network Function Virtualization) aims to implement some network functions on a general high-performance server, switch, and storage by using an IT virtualization technology. The network functions need to be implemented by using software and be capable of running on general server hardware. Moreover, an operation such as instantiation, auto scaling, or migration needs to be automatically performed on the network functions according to a requirement.

In an existing NFV environment, VNF (virtualized network function) running information may be obtained in two manners.

In a first manner, VNF service running information, that is, internally recorded VNF running information, is obtained by using an EMS (element management system). The VNF service running information includes fault information, performance information, and the like (for example, whether software runs normally and a data packet processing rate).

In a second manner, running information of a bottom-layer virtual resource, that is, running information of a resource used by a VNF, is obtained by using a VIM (virtualized infrastructure manager). The running information similarly includes fault information, performance information, and the like (for example, CPU usage and link bandwidth usage).

However, in an existing network, not all network elements have an EMS. For example, a value-added service device, represented by a firewall, a video acceleration device, or the like, has no dedicated EMS for management of the device. Therefore, when this type of service is deployed in the NFV environment, VNF service running information cannot be obtained by using the EMS. However, using only the running information obtained by using the VIM is insufficient to determine a VNF service status completely and in a timely manner. For example, when link bandwidth usage suddenly increases/decreases, MANO (management and orchestration) in NFV cannot determine a specific fault cause, but can only perform limited processing, for example, active/standby switchover, and reporting to an OSS (operations support system) in NFV to request further fault diagnosis. This is likely to increase troubleshooting time, and therefore affects quality of network service provisioning.

SUMMARY

Embodiments of the disclosure provide a VNF information obtaining method, apparatus, and system, so that MANO can obtain more detailed VNF running information, to improve quality of network service provisioning.

To achieve the foregoing objectives, the disclosure uses the following technical solutions.

A first aspect of the disclosure provides a VNF information obtaining method, applied to a Network Functions Virtualization NFV system, where the NFV system includes at least one virtualized network function VNF and a management and orchestration system MANO, and the MANO includes at least two virtualized network function managers VNFMs and a network functions virtualization orchestrator NFVO, where the at least two VNFMs include a first VNFM and a second VNFM, the first VNFM is a life cycle management unit of the VNF, the second VNFM is a monitoring management unit of one or more VNFs in the VNF, and the one or more VNFs are referred to as a to-be-monitored VNF; and the method includes:

instantiating, by the NFVO, the second VNFM based on a software package of the second VNFM, so that a communications connection is established between the second VNFM and the NFVO; and receiving, by the NFVO during monitoring, monitoring information that is sent by the second VNFM after the second VNFM summarizes and analyzes monitoring data of the to-be-monitored VNF.

With reference to the first aspect, in a first possible implementation, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units; and after the instantiating, by the NFVO, the second VNFM, the method further includes:

initiating, by the NFVO, a monitoring unit instantiation request to the second VNFM, so that the second VNFM instantiates the first and the second monitoring units based on a description file of the first and the second monitoring units, and therefore communications connections are established between the first and the second monitoring units and the second VNFM.

With reference to the first possible implementation of the first aspect, in a second possible implementation, after the second VNFM instantiates the first and the second monitoring units based on the description file of the first and the second monitoring units, the method further includes:

adjusting, by the NFVO, the NS that includes the to-be-monitored VNF, so that communications connections are established between the first and the second monitoring units and the to-be-monitored VNF.

With reference to the first aspect, in a third possible implementation, the NFV system is connected to an operations support system OSS, and before the instantiation of the monitoring units, the method further includes:

receiving, by the NFVO, a monitoring request sent by the OSS, where the monitoring request is used to request to monitor the to-be-monitored VNF in the NS; or when a user initiates a monitoring request by using the NFVO, receiving, by the NFVO, the monitoring request sent by the user, where the monitoring request is used to request to monitor the to-be-monitored VNF in the NS.

With reference to the third possible implementation of the first aspect, in a fourth possible implementation of the first aspect, the monitoring request includes:

identity ID information of the NS, identity ID information of the to-be-monitored VNF, a test item, a test parameter, and authentication information, where the test item is a specified indicator that needs to be tested, and the test item includes a processing delay and a packet loss rate; and the test parameter includes a quantity of test times, a test frequency, a format of a test data packet, a quantity of result reporting times, and a result reporting frequency.

With reference to the second possible implementation of the first aspect, in a fifth possible implementation of the first aspect, the adjusting, by the NFVO, the NS that includes the to-be-monitored VNF further includes:

adding the first and the second monitoring units to an original link that includes the to-be-monitored VNF; or creating a dedicated test link based on an original link that includes the to-be-monitored VNF, where the test link includes the first and the second monitoring units.

With reference to any one of the first aspect or the possible implementations of the first aspect, in a sixth possible implementation of the first aspect, the NFV system is connected to an operations support system OSS, and after the receiving, by the NFVO, monitoring information that is sent by the second VNFM after the second VNFM summarizes and analyzes monitoring data of the to-be-monitored VNF, the method further includes:

sending, by the NFVO, the received monitoring information to the OSS.

A second aspect of the disclosure provides a VNF information obtaining method, applied to a Network Functions Virtualization NFV system, where the NFV includes at least one virtualized network function VNF and a management and orchestration system MANO, and the MANO includes at least two virtualized network function managers VNFMs and a network functions virtualization orchestrator NFVO, where the at least two VNFMs include a first VNFM and a second VNFM, the first VNFM is a life cycle management unit of the VNF, the second VNFM is a monitoring management unit of one or more VNFs in the VNF, and the one or more VNFs are referred to as a to-be-monitored VNF; and the method includes:

establishing, by the second VNFM, a communications connection to the NFVO when the second VNFM is instantiated by the NFVO;

receiving, by the second VNFM, monitoring data of monitoring the to-be-monitored VNF;

summarizing and analyzing, by the second VNFM, the received monitoring data, to obtain monitoring information of the to-be-monitored VNF; and sending, by the second VNFM to the NFVO, the monitoring information obtained after summarization and analysis.

With reference to the second aspect, in a first possible implementation of the second aspect, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units; and after the second VNFM is instantiated by the NFVO, the method further includes: instantiating, by the second VNFM, the first and the second monitoring units based on a description file of the first and the second monitoring units, so that communications connections are established between the first and the second monitoring units and the second VNFM.

With reference to the first possible implementation of the second aspect, in a second possible implementation of the second aspect, before the receiving, by the second VNFM, monitoring data of monitoring the to-be-monitored VNF, the method further includes:

configuring, by the second VNFM, the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNFM; and the receiving, by the second VNFM, monitoring data of monitoring the to-be-monitored VNF is specifically: receiving, by the second VNFM, the monitoring data of monitoring the to-be-monitored VNF, sent by the second monitoring unit.

A third aspect of the disclosure provides a VNF information obtaining method, applied to a Network Functions Virtualization NFV system, where the NFV system includes a virtualized network function VNF and a management and orchestration system MANO, the MANO includes a virtualized network function manager VNFM and a network functions virtualization orchestrator NFVO, and a communications connection is established between the VNFM and the NFVO, where when there are at least two VNFs, the at least two VNFs include a first VNF and a second VNF, the second VNF is a monitoring management unit of the first VNF, the first VNF is referred to as a to-be-monitored VNF, and the VNFM is a life cycle management unit of the second VNF and the to-be-monitored VNF; and the method includes:

initiating, by the NFVO to the VNFM, a request for instantiating the second VNF, so that the VNFM instantiates the second VNF based on a description file of the second VNF, and therefore a communications connection is established between the second VNF and the VNFM; and receiving, by the NFVO during monitoring, monitoring information that is sent by the second VNF after the second VNF summarizes and analyzes monitoring data.

With reference to the third aspect, in a first possible implementation of the third aspect, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units; and after the VNFM instantiates the second VNF, the method further includes:

initiating, by the NFVO, a monitoring unit instantiation request to the VNFM, so that the VNFM instantiates the first and the second monitoring units based on a description file of the first and the second monitoring units.

With reference to the first possible implementation of the third aspect, in a second possible implementation of the third aspect, after the VNFM instantiates the first and the second monitoring units based on the description file of the first and the second monitoring units, the method further includes:

adjusting, by the NFVO, the NS that includes the to-be-monitored VNF, so that communications connections are established between the first and the second monitoring units and the to-be-monitored VNF, and communications connections are established between the first and the second monitoring units and the second VNF.

With reference to the second possible implementation of the third aspect, in a third possible implementation of the third aspect, the adjusting, by the NFVO, the NS that includes the to-be-monitored VNF further includes:

adding the first and the second monitoring units to an original link that includes the to-be-monitored VNF; or creating a dedicated test link based on an original link that includes the to-be-monitored VNF, where the test link includes the first and the second monitoring units.

With reference to any one of the third aspect or the possible implementations of the third aspect, in a fourth possible implementation of the third aspect, the NFV system is connected to an operations support system OSS, and after the receiving, by the NFVO, monitoring information that is sent by the second VNF after the second VNF summarizes and analyzes monitoring data, the method further includes:

sending, by the NFVO, the received monitoring information to the OSS.

A fourth aspect of the disclosure provides a VNF information obtaining method, applied to a Network Functions Virtualization NFV system, where the NFV system includes a virtualized network function VNF and a management and orchestration system MANO, the MANO includes a virtualized network function manager VNFM and a network functions virtualization orchestrator NFVO, and a communications connection is established between the VNFM and the NFVO, where when there are at least two VNFs, the at least two VNFs include a first VNF and a second VNF, the second VNF is a monitoring management unit of the first VNF, the first VNF is referred to as a to-be-monitored VNF, and the VNFM is a life cycle management unit of the second VNF and the to-be-monitored VNF; and the method includes:

establishing, by the second VNF, a communications connection to the VNFM when the second VNF is instantiated by the VNFM;

receiving, by the second VNF, monitoring data of monitoring the to-be-monitored VNF;

summarizing and analyzing, by the second VNF, the received monitoring data, to obtain monitoring information of the to-be-monitored VNF; and sending, by the second VNF to the NFVO, the monitoring information obtained after summarization and analysis.

With reference to the fourth aspect, in a first possible implementation of the fourth aspect, the to-be-monitored VNF and the second VNF are located in a network service NS, a first monitoring unit and a second monitoring unit for monitoring the to-be-monitored VNF are configured in the NS, the VNFM is further a life cycle management unit of the first and the second monitoring units, the VNFM instantiates the first and the second monitoring units, and before the receiving, by the second VNF, monitoring data of monitoring the to-be-monitored VNF, the method further includes:

configuring, by the second VNF, the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNF; and the receiving, by the second VNF, monitoring data of monitoring the to-be-monitored VNF is specifically: receiving, by the second VNF, the monitoring data of monitoring the to-be-monitored VNF, sent by the second monitoring unit.

A fifth aspect of the disclosure provides a VNF information obtaining method, applied to a Network Functions Virtualization NFV system, where the NFV system includes at least one virtualized network function VNF and a management and orchestration system MANO, and the MANO includes a virtualized network function manager VNFM and a network functions virtualization orchestrator NFVO, where the NFVO is a monitoring management unit of one or more VNFs in the VNF, the one or more VNFs are referred to as a to-be-monitored VNF, and the VNFM is a life cycle management unit of the to-be-monitored VNF; and the method includes:

receiving, by the NFVO, monitoring data of monitoring the to-be-monitored VNF; and summarizing and analyzing, by the NFVO, the received monitoring data, to obtain monitoring information of the to-be-monitored VNF.

With reference to the fifth aspect, in a first possible implementation of the fifth aspect, the to-be-monitored VNF is located in a network service NS, a first monitoring unit and a second monitoring unit for monitoring the to-be-monitored VNF are configured in the NS, the VNFM is further a life cycle management unit of the first and the second monitoring units, and the method further includes:

initiating, by the NFVO, a monitoring unit instantiation request to the VNFM, so that the VNFM instantiates the first and the second monitoring units based on a description file of the first and the second monitoring units, and therefore, communications connections are established between the NFVO and the first and the second monitoring units, or connections are established between the NFVO and the first and the second monitoring units by using the VNFM.

With reference to the first possible implementation of the fifth aspect, in a second possible implementation of the fifth aspect, after the VNFM instantiates the first and the second monitoring units based on the description file of the first and the second monitoring units, the method further includes:

adjusting, by the NFVO, the NS that includes the to-be-monitored VNF, so that communications connections are established between the first and the second monitoring units and the to-be-monitored VNF.

With reference to the fifth aspect, in a third possible implementation of the fifth aspect, before the receiving, by the NFVO, monitoring data of monitoring the to-be-monitored VNF, if communications connections are established between the NFVO and the first and the second monitoring units, the method further includes:

configuring, by the NFVO, the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO; and the receiving, by the NFVO, monitoring data of monitoring the to-be-monitored VNF is specifically: receiving, by the NFVO, the monitoring data of monitoring the to-be-monitored VNF, sent by the second monitoring unit; or if communications connections are established between the NFVO and the first and the second monitoring units by using the VNFM, the method further includes:

configuring, by the NFVO, the first and the second monitoring units by using the VNFM, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO by using the VNFM; and the receiving, by the NFVO, monitoring data of monitoring the to-be-monitored VNF is specifically: receiving, by the NFVO by using the VNFM, the monitoring data of monitoring the to-be-monitored VNF, sent by the second monitoring unit.

With reference to the second possible implementation of the fifth aspect, in a fourth possible implementation of the fifth aspect, the adjusting, by the NFVO, the NS that includes the to-be-monitored VNF further includes:

adding the first and the second monitoring units to an original link that includes the to-be-monitored VNF; or creating a dedicated test link based on an original link that includes the to-be-monitored VNF, where the test link includes the first and the second monitoring units.

With reference to any one of the fifth aspect or the possible implementations of the fifth aspect, in a fifth possible implementation of the fifth aspect, the NFV system is connected to an operations support system OSS, and after the summarizing and analyzing, by the NFVO, the received monitoring data, to obtain monitoring information of the to-be-monitored VNF, the method further includes:

sending, by the NFVO, the obtained monitoring information to the OSS.

A sixth aspect of the disclosure provides a VNF information obtaining method, applied to a Network Functions Virtualization NFV system, where the NFV system includes at least one virtualized network function VNF, a management and orchestration system MANO, and a monitoring management entity, the MANO includes a virtualized network function manager VNFM and a network functions virtualization orchestrator NFVO, the monitoring management entity is a monitoring management unit of one or more VNFs in the VNF, the one or more VNFs are referred to as a to-be-monitored VNF, the VNFM is a life cycle management unit of the to-be-monitored VNF, and the method includes:

receiving, by the NFVO during monitoring, information about monitoring performed by the monitoring management entity on the to-be-monitored VNF.

With reference to the sixth aspect, in a first possible implementation of the sixth aspect, the to-be-monitored VNF is located in a network service NS, a first monitoring unit and a second monitoring unit for monitoring the to-be-monitored VNF are configured in the NS, the VNFM is further a life cycle management unit of the first and the second monitoring units, and the method further includes:

receiving, by the NFVO, a monitoring unit software package uploaded by the monitoring management entity, where the software package includes a description file of the first and the second monitoring units; and initiating, by the NFVO, a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

With reference to the first possible implementation of the sixth aspect, in a second possible implementation of the sixth aspect, after the VNFM instantiates the first and the second monitoring units based on the description file of the first and the second monitoring units, the method further includes:

adjusting, by the NFVO, the NS that includes the to-be-monitored VNF, so that communications connections are established between the first and the second monitoring units and the to-be-monitored VNF.

With reference to the second possible implementation of the sixth aspect, in a third possible implementation of the sixth aspect, the adjusting, by the NFVO, the NS that includes the to-be-monitored VNF further includes:

adding the first and the second monitoring units to an original link that includes the to-be-monitored VNF; or creating a dedicated test link based on an original link that includes the to-be-monitored VNF, where the test link includes the first and the second monitoring units.

With reference to any one of the sixth aspect or the possible implementations of the sixth aspect, in a fourth possible implementation of the sixth aspect, the NFV system is connected to an operations support system OSS, and after the receiving, by the NFVO, information about monitoring performed by the monitoring management entity on the to-be-monitored VNF, the method further includes:

sending, by the NFVO, the received monitoring information to the OSS.

A seventh aspect of the disclosure provides a VNF information obtaining method, applied to a Network Functions Virtualization NFV system, where the NFV system includes at least one virtualized network function VNF, a management and orchestration system MANO, and a monitoring management entity, and the MANO includes a virtualized network function manager VNFM and a network functions virtualization orchestrator NFVO, where a communications connection is established between the monitoring management entity and the MANO by using a corresponding interface, the monitoring management entity is a monitoring management unit of one or more VNFs in the VNF, the one or more VNFs are referred to as a to-be-monitored VNF, and the VNFM is a life cycle management unit of the to-be-monitored VNF; and the method includes:

receiving, by the monitoring management entity during monitoring, monitoring data of monitoring the to-be-monitored VNF;

summarizing and analyzing, by the monitoring management entity, the received monitoring data, to obtain monitoring information of the to-be-monitored VNF; and sending, by the monitoring management entity, the monitoring information to the NFVO.

With reference to the seventh aspect, in a first possible implementation of the seventh aspect, the to-be-monitored VNF is located in a network service NS, a first monitoring unit and a second monitoring unit for monitoring the to-be-monitored VNF are configured in the NS, and the VNFM is further a life cycle management unit of the first and the second monitoring units; and before the receiving, by the monitoring management entity, monitoring data of monitoring the to-be-monitored VNF, the method further includes:

uploading, by the monitoring management entity, a monitoring unit software package, where the software package includes a description file of the first and the second monitoring units; where the NFVO initiates a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

With reference to the first possible implementation of the seventh aspect, in a second possible implementation of the seventh aspect, before the receiving, by the monitoring management entity, monitoring data of monitoring the to-be-monitored VNF, and after instantiation of the first and the second monitoring units, the method further includes:

configuring, by the monitoring management entity, the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the monitoring management entity; and the receiving, by the monitoring management entity, monitoring data of monitoring the to-be-monitored VNF is specifically: receiving, by the monitoring management entity, the monitoring data of monitoring the to-be-monitored VNF, sent by the second monitoring unit.

An eighth aspect of the disclosure provides a network functions virtualization orchestrator NFVO, applied to a Network Functions Virtualization NFV system, where the NFV system includes at least one virtualized network function VNF and a management and orchestration system MANO, and the MANO includes at least two virtualized network function managers VNFMs and the network functions virtualization orchestrator NFVO, where the at least two VNFMs include a first VNFM and a second VNFM, the first VNFM is a life cycle management unit of the VNF, the second VNFM is a monitoring management unit of one or more VNFs in the VNF, and the one or more VNFs are referred to as a to-be-monitored VNF; and the NFVO includes:

a second-VNFM instantiation unit and a receiving unit, where the second-VNFM instantiation unit is configured to instantiate the second VNFM based on a software package of the second VNFM, so that a communications connection is established between the second VNFM and the NFVO; and the receiving unit is configured to receive, during monitoring, monitoring information that is sent by the second VNFM after the second VNFM summarizes and analyzes monitoring data of the to-be-monitored VNF.

With reference to the eighth aspect, in a first possible implementation, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units; and the NFVO further includes a monitoring unit instantiation request unit, where the monitoring unit instantiation request unit is configured to initiate a monitoring unit instantiation request to the second VNFM, so that the second VNFM instantiates the first and the second monitoring units based on a description file of the first and the second monitoring units, and therefore communications connections are established between the first and the second monitoring units and the second VNFM.

With reference to the eighth possible implementation, in a second possible implementation, the NFVO further includes an NS adjustment unit; and the NS adjustment unit is configured to adjust the NS that includes the to-be-monitored VNF, so that communications connections are established between the first and the second monitoring units and the to-be-monitored VNF.

With reference to the eighth aspect, in a third possible implementation, the NFV system is connected to an operations support system OSS; and the receiving unit is further configured to:

receive a monitoring request sent by the OSS, where the monitoring request is used to request to monitor the to-be-monitored VNF in the NS; or when a user initiates a monitoring request by using the NFVO, receive the monitoring request sent by the user, where the monitoring request is used to request to monitor the to-be-monitored VNF in the NS.

With reference to the second possible implementation of the eighth aspect, in a fourth possible implementation of the eighth aspect, the NS adjustment unit is further configured to:

add the first and the second monitoring units to an original link that includes the to-be-monitored VNF; or create a dedicated test link based on an original link that includes the to-be-monitored VNF, where the test link includes the first and the second monitoring units.

With reference to any one of the eighth aspect or the possible implementations of the eighth aspect, in a fifth possible implementation of the eighth aspect, the NFV system is connected to the operations support system OSS;

the NFVO further includes a sending unit; and the sending unit is configured to send the received monitoring information to the OSS.

A ninth aspect of the disclosure provides a second VNFM, applied to a Network Functions Virtualization NFV system, where the NFV includes at least one virtualized network function VNF and a management and orchestration system MANO, and the MANO includes at least two virtualized network function managers VNFMs and a network functions virtualization orchestrator NFVO, where the at least two VNFMs include a first VNFM and the second VNFM, the first VNFM is a life cycle management unit of the VNF, the second VNFM is a monitoring management unit of one or more VNFs in the VNF, and the one or more VNFs are referred to as a to-be-monitored VNF; and the second VNFM includes:

a communications connection establishment unit, a receiving unit, a processing unit, and a sending unit, where the communications connection establishment unit is configured to establish a communications connection to the NFVO when the second VNFM is instantiated by the NFVO;

the receiving unit is configured to receive monitoring data of monitoring the to-be-monitored VNF;

the processing unit is configured to summarize and analyze the received monitoring data, to obtain monitoring information of the to-be-monitored VNF; and the sending unit is configured to send, to the NFVO, the monitoring information obtained after summarization and analysis.

With reference to the ninth aspect, in a first possible implementation of the ninth aspect, the to-be-monitored VNF is located in a network service NS, a first monitoring unit and a second monitoring unit for monitoring the to-be-monitored VNF are configured in the NS, the second VNFM is further a life cycle management unit of the first and the second monitoring units, and the second VNFM further includes a monitoring unit instantiation unit; and the monitoring unit instantiation unit is configured to instantiate the first and the second monitoring units based on a description file of the first and the second monitoring units, so that communications connections are established between the first and the second monitoring units and the second VNFM.

With reference to the first possible implementation of the ninth aspect, in a second possible implementation of the ninth aspect, the second VNFM further includes a configuration unit;

the configuration unit is specifically configured to:
configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNFM; and the receiving unit is specifically configured to receive the monitoring data of monitoring the to-be-monitored VNF, sent by the second monitoring unit.

A tenth aspect of the disclosure provides an NFVO, applied to a Network Functions Virtualization NFV system, where the NFV system includes a virtualized network function VNF and a management and orchestration system MANO, the MANO includes a virtualized network function manager VNFM and the network functions virtualization orchestrator NFVO, and a communications connection is established between the VNFM and the NFVO, where when there are at least two VNFs, the at least two VNFs include a first VNF and a second VNF, the second VNF is a monitoring management unit of the first VNF, the first VNF is referred to as a to-be-monitored VNF, and the VNFM is a life cycle management unit of the second VNF and the to-be-monitored VNF; and the NFVO includes:
a second-VNF instantiation request unit and a receiving unit, where
the second-VNF instantiation request unit is configured to initiate, to the VNFM, a request for instantiating the second VNF, so that the VNFM instantiates the second VNF based on a description file of the second VNF, and therefore a communications connection is established between the second VNF and the VNFM; and
the receiving unit is configured to receive, during monitoring, monitoring information that is sent by the second VNF after the second VNF summarizes and analyzes monitoring data.

With reference to the tenth aspect, in a first possible implementation of the tenth aspect, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units; and the NFVO further includes a monitoring unit instantiation request unit, where
the monitoring unit instantiation request unit is configured to initiate a monitoring unit instantiation request to the VNFM, so that the VNFM instantiates the first and the second monitoring units based on a description file of the first and the second monitoring units, and therefore communications connections are established between the first and the second monitoring units and the VNFM.

With reference to the first possible implementation of the tenth aspect, in a second possible implementation of the tenth aspect, the NFVO further includes an NS adjustment unit; and the NS adjustment unit is configured to adjust the NS that includes the to-be-monitored VNF, so that communications connections are established between the first and the second monitoring units and the to-be-monitored VNF, and communications connections are established between the first and the second monitoring units and the second VNF.

With reference to the second possible implementation of the tenth aspect, in a third possible implementation of the tenth aspect, the NS adjustment unit is specifically configured to:
add the first and the second monitoring units to an original link that includes the to-be-monitored VNF; or
create a dedicated test link based on an original link that includes the to-be-monitored VNF, where the test link includes the first and the second monitoring units.

With reference to any one of the tenth aspect or the possible implementations of the tenth aspect, in a fourth possible implementation of the tenth aspect, the NFV system is connected to an operations support system OSS, and the NFVO further includes a sending unit, where
the sending unit is configured to send the received monitoring information to the OSS.

An eleventh aspect of the disclosure provides a second VNF, applied to a Network Functions Virtualization NFV system, where the NFV system includes a virtualized network function VNF and a management and orchestration system MANO, the MANO includes a virtualized network function manager VNFM and a network functions virtualization orchestrator NFVO, and a communications connection is established between the VNFM and the NFVO, where when there are at least two VNFs, the at least two VNFs include a first VNF and the second VNF, the second VNF is a monitoring management unit of the first VNF, the first VNF is referred to as a to-be-monitored VNF, and the VNFM is a life cycle management unit of the second VNF and the to-be-monitored VNF; and the second VNF includes:
a communications connection establishment unit, a receiving unit, a processing unit, and a sending unit, where
the communications connection establishment unit is configured to establish a communications connection to the VNFM when the second VNF is instantiated by the VNFM;
the receiving unit is configured to receive monitoring data of monitoring the to-be-monitored VNF;
the processing unit is configured to summarize and analyze the monitoring data received by the receiving unit, to obtain monitoring information of the to-be-monitored VNF; and
the sending unit is configured to send, to the NFVO, the monitoring information obtained after summarization and analysis.

With reference to the eleventh aspect, in a first possible implementation of the eleventh aspect, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units; and the second VNF further includes a configuration unit, where the configuration unit is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNF; and the receiving unit is specifically configured to receive the monitoring data of monitoring the to-be-monitored VNF, sent by the second monitoring unit.

A twelfth aspect of the disclosure provides an NFVO, applied to a Network Functions Virtualization NFV system, where the NFV system includes at least one virtualized network function VNF and a management and orchestration system MANO, and the MANO includes a virtualized network function manager VNFM and the network functions virtualization orchestrator NFVO, where the NFVO is a monitoring management unit of one or more VNFs in the VNF, the one or more VNFs are referred to as a to-be-monitored VNF, and the VNFM is a life cycle management unit of the to-be-monitored VNF; and the NFVO includes:

a receiving unit and a processing unit, where the receiving unit is configured to receive monitoring data of monitoring the to-be-monitored VNF; and the processing unit is configured to summarize and analyze the monitoring data received by the receiving unit, to obtain monitoring information of the to-be-monitored VNF.

With reference to the twelfth aspect, in a first possible implementation of the twelfth aspect, the to-be-monitored VNF is located in a network service NS, a first monitoring unit and a second monitoring unit for monitoring the to-be-monitored VNF are configured in the NS, and the VNFM is further a life cycle management unit of the first and the second monitoring units; and the NFVO further includes a monitoring unit instantiation request unit, where the monitoring unit instantiation request unit is configured to initiate a monitoring unit instantiation request to the VNFM, so that the VNFM instantiates the first and the second monitoring units based on a description file of the first and the second monitoring units, and therefore, communications connections are established between the NFVO and the first and the second monitoring units, or connections are established between the NFVO and the first and the second monitoring units by using the VNFM.

With reference to the first possible implementation of the twelfth aspect, in a second possible implementation of the twelfth aspect, the NFVO further includes an NS adjustment unit; and the NS adjustment unit is configured to adjust the NS that includes the to-be-monitored VNF, so that communications connections are established between the first and the second monitoring units and the to-be-monitored VNF.

With reference to the twelfth aspect, in a third possible implementation of the twelfth aspect, the NFVO further includes a configuration unit;

the configuration unit is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO; and the receiving unit is specifically configured to receive the monitoring data of monitoring the to-be-monitored VNF, sent by the second monitoring unit.

With reference to the second possible implementation of the twelfth aspect, in a fourth possible implementation of the twelfth aspect, the NFVO further includes a configuration unit;

the configuration unit is configured to configure the first and the second monitoring units by using the VNFM, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO by using the VNFM; and the receiving unit is specifically configured to receive, by using the VNFM, the monitoring data of monitoring the to-be-monitored VNF, sent by the second monitoring unit.

With reference to the second possible implementation of the twelfth aspect, in a fifth possible implementation of the twelfth aspect, the NS adjustment unit is further configured to:

add the first and the second monitoring units to an original link that includes the to-be-monitored VNF; or create a dedicated test link based on an original link that includes the to-be-monitored VNF, where the test link includes the first and the second monitoring units.

With reference to any one of the twelfth aspect or the possible implementations of the twelfth aspect, in a sixth possible implementation of the twelfth aspect, the NFV system is connected to an operations support system OSS, and the NFVO further includes a sending unit, where the sending unit is configured to send the received monitoring information to the OSS.

A thirteenth aspect of the disclosure provides an NFVO, applied to a Network Functions Virtualization NFV system, where the NFV system includes at least one virtualized network function VNF, a management and orchestration system MANO, and a monitoring management entity, the MANO includes a virtualized network function manager VNFM and the network functions virtualization orchestrator NFVO, the monitoring management entity is a monitoring management unit of one or more VNFs in the VNF, the one or more VNFs are referred to as a to-be-monitored VNF, and the VNFM is a life cycle management unit of the to-be-monitored VNF;

the NFVO includes a receiving unit; and the receiving unit is configured to receive, during monitoring, information about monitoring performed by the monitoring management entity on the to-be-monitored VNF.

With reference to the thirteenth aspect, in a first possible implementation of the thirteenth aspect, the to-be-monitored VNF is located in a network service NS, a first monitoring unit and a second monitoring unit for monitoring the to-be-monitored VNF are configured in the NS, and the VNFM is further a life cycle management unit of the first and the second monitoring units;

the NFVO further includes a monitoring unit instantiation request unit;

the receiving unit is configured to receive a monitoring unit software package uploaded by the monitoring management entity, where the software package includes a description file of the first and the second monitoring units; and the monitoring unit instantiation request unit is configured to initiate a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

With reference to the first possible implementation of the thirteenth aspect, in a second possible implementation of the thirteenth aspect, the NFVO further includes an NS adjustment unit; and the NS adjustment unit is configured to adjust the NS that includes the to-be-monitored VNF, so that communications connections are established between the first and the second monitoring units and the to-be-monitored VNF.

With reference to the second possible implementation of the thirteenth aspect, in a third possible implementation of the thirteenth aspect, the NS adjustment unit is further configured to:

add the first and the second monitoring units to an original link that includes the to-be-monitored VNF; or create a dedicated test link based on an original link that includes the to-be-monitored VNF, where the test link includes the first and the second monitoring units.

With reference to any one of the thirteenth aspect or the possible implementations of the thirteenth aspect, in a fourth possible implementation of the thirteenth aspect, the NFV system is connected to an operations support system OSS, and the NFVO further includes a sending unit, where the sending unit is configured to send the received monitoring information to the OSS.

A fourteenth aspect of the disclosure provides a monitoring management entity, applied to a Network Functions Virtualization NFV system, where the NFV system includes at least one virtualized network function VNF, a management and orchestration system MANO, and the monitoring management entity, and the MANO includes a virtualized network function manager VNFM and a network functions virtualization orchestrator NFVO, where a communications connection is established between the monitoring management entity and the MANO by using a corresponding interface, the monitoring management entity is a monitoring management unit of one or more VNFs in the VNF, the one or more VNFs are referred to as a to-be-monitored VNF, and the VNFM is a life cycle management unit of the to-be-monitored VNF; and the monitoring management entity includes:

a receiving unit, a processing unit, and a sending unit, where the receiving unit is configured to receive, during monitoring, monitoring data of monitoring the to-be-monitored VNF;

the processing unit is configured to summarize and analyze the monitoring data received by the receiving unit, to obtain monitoring information of the to-be-monitored VNF; and the sending unit is configured to send the monitoring information to the NFVO.

With reference to the fourteenth aspect, in a first possible implementation of the fourteenth aspect, the to-be-monitored VNF is located in a network service NS, a first monitoring unit and a second monitoring unit for monitoring the to-be-monitored VNF are configured in the NS, and the VNFM is further a life cycle management unit of the first and the second monitoring units;

the monitoring management entity further includes an upload unit;

the upload unit is configured to upload a monitoring unit software package, where the software package includes a description file of the first and the second monitoring units; and the NFVO initiates a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

With reference to the first possible implementation of the fourteenth aspect, in a second possible implementation of the fourteenth aspect, the monitoring management entity further includes a configuration unit;

the configuration unit is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the monitoring management entity; and the receiving unit is specifically configured to receive the monitoring data of monitoring the to-be-monitored VNF, sent by the second monitoring unit.

A fifteenth aspect of the disclosure provides a network functions virtualization orchestrator NFVO, applied to a Network Functions Virtualization NFV system, where the NFV system includes at least one virtualized network function VNF and a management and orchestration system MANO, and the MANO includes at least two virtualized network function managers VNFMs and the network functions virtualization orchestrator NFVO, where the at least two VNFMs include a first VNFM and a second VNFM, the first VNFM is a life cycle management unit of the VNF, the second VNFM is a monitoring management unit of one or more VNFs in the VNF, and the one or more VNFs are referred to as a to-be-monitored VNF; and the NFVO includes:

a processor and a receiver, where the processor is configured to instantiate the second VNFM based on a software package of the second VNFM, so that a communications connection is established between the second VNFM and the NFVO; and the receiver is configured to receive, during monitoring, monitoring information that is sent by the second VNFM after the second VNFM summarizes and analyzes monitoring data of the to-be-monitored VNF.

With reference to the fifteenth aspect, in a first possible implementation, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units; and the processor is further configured to initiate a monitoring unit instantiation request to the second VNFM, so that the second VNFM instantiates the first and the second monitoring units based on a description file of the first and the second monitoring units, and therefore communications connections are established between the first and the second monitoring units and the second VNFM.

With reference to the eighth possible implementation, in a second possible implementation, the processor is configured to adjust the NS that includes the to-be-monitored VNF, so that communications connections are established between the first and the second monitoring units and the to-be-monitored VNF.

With reference to the fifteenth aspect, in a third possible implementation, the NFV system is connected to an operations support system OSS, and the receiver is further configured to:

receive a monitoring request sent by the OSS, where the monitoring request is used to request to monitor the to-be-monitored VNF in the NS; or when a user initiates a monitoring request by using the NFVO, receive the monitoring request sent by the user, where the monitoring request is used to request to monitor the to-be-monitored VNF in the NS.

With reference to the second possible implementation of the fifteenth aspect, in a fourth possible implementation of the fifteenth aspect, the processor is further configured to:

add the first and the second monitoring units to an original link that includes the to-be-monitored VNF; or create a dedicated test link based on an original link that includes the to-be-monitored VNF, where the test link includes the first and the second monitoring units.

With reference to any one of the fifteenth aspect or the possible implementations of the fifteenth aspect, in a fifth possible implementation of the fifteenth aspect, the NFV system is connected to the operations support system OSS;

the NFVO further includes a transmitter; and the transmitter is configured to send the received monitoring information to the OSS.

A sixteenth aspect of the disclosure provides a second VNFM, applied to a Network Functions Virtualization NFV system, where the NFV includes at least one virtualized network function VNF and a management and orchestration system MANO, and the MANO includes at least two virtualized network function managers VNFMs and a network functions virtualization orchestrator NFVO, where the at least two VNFMs include a first VNFM and the second VNFM, the first VNFM is a life cycle management unit of the VNF, the second VNFM is a monitoring management unit of one or more VNFs in the VNF, and the one or more VNFs are referred to as a to-be-monitored VNF; and the second VNFM includes:

a processor, a receiver, and a transmitter, where the processor is configured to establish a communications connection to the NFVO when the second VNFM is instantiated by the NFVO;

the receiver is configured to receive monitoring data of monitoring the to-be-monitored VNF;

the processor is configured to summarize and analyze the received monitoring data, to obtain monitoring information of the to-be-monitored VNF; and the transmitter is configured to send, to the NFVO, the monitoring information obtained after summarization and analysis.

With reference to the sixteenth aspect, in a first possible implementation of the sixteenth aspect, the to-be-monitored VNF is located in a network service NS, a first monitoring unit and a second monitoring unit for monitoring the to-be-monitored VNF are configured in the NS, the second VNFM is further a life cycle management unit of the first and the second monitoring units, and the processor is configured to instantiate the first and the second monitoring units based on a description file of the first and the second monitoring units, so that communications connections are established between the first and the second monitoring units and the second VNFM.

With reference to the first possible implementation of the sixteenth aspect, in a second possible implementation of the sixteenth aspect, the processor is specifically configured to:

configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNFM; and the receiver is specifically configured to receive the monitoring data of monitoring the to-be-monitored VNF, sent by the second monitoring unit.

A seventeenth aspect of the disclosure provides an NFVO, applied to a Network Functions Virtualization NFV system, where the NFV system includes a virtualized network function VNF and a management and orchestration system MANO, the MANO includes a virtualized network function manager VNFM and the network functions virtualization orchestrator NFVO, and a communications connection is established between the VNFM and the NFVO, where when there are at least two VNFs, the at least two VNFs include a first VNF and a second VNF, the second VNF is a monitoring management unit of the first VNF, the first VNF is referred to as a to-be-monitored VNF, and the VNFM is a life cycle management unit of the second VNF and the to-be-monitored VNF; and the NFVO includes:

a processor and a receiver, where the processor is configured to initiate, to the VNFM, a request for instantiating the second VNF, so that the VNFM instantiates the second VNF based on a description file of the second VNF, and therefore a communications connection is established between the second VNF and the VNFM; and the receiver is configured to receive, during monitoring, monitoring information that is sent by the second VNF after the second VNF summarizes and analyzes monitoring data.

With reference to the seventeenth aspect, in a first possible implementation of the seventeenth aspect, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units; and the processor is configured to initiate a monitoring unit instantiation request to the VNFM, so that the VNFM instantiates the first and the second monitoring units based on a description file of the first and the second monitoring units, and therefore communications connections are established between the first and the second monitoring units and the VNFM.

With reference to the first possible implementation of the seventeenth aspect, in a second possible implementation of the seventeenth aspect, the processor is configured to adjust the NS that includes the to-be-monitored VNF, so that communications connections are established between the first and the second monitoring units and the to-be-monitored VNF, and communications connections are established between the first and the second monitoring units and the second VNF.

With reference to the second possible implementation of the seventeenth aspect, in a third possible implementation of the seventeenth aspect, the processor is specifically configured to:

add the first and the second monitoring units to an original link that includes the to-be-monitored VNF; or create a dedicated test link based on an original link that includes the to-be-monitored VNF, where the test link includes the first and the second monitoring units.

With reference to any one of the seventeenth aspect or the possible implementations of the seventeenth aspect, in a fourth possible implementation of the seventeenth aspect, the NFV system is connected to an operations support system OSS, and the NFVO further includes a transmitter, where the transmitter is configured to send the received monitoring information to the OSS.

An eighteenth aspect of the disclosure provides a second VNF, applied to a Network Functions Virtualization NFV system, where the NFV system includes a virtualized network function VNF and a management and orchestration system MANO, the MANO includes a virtualized network function manager VNFM and a network functions virtualization orchestrator NFVO, and a communications connection is established between the VNFM and the NFVO, where when there are at least two VNFs, the at least two VNFs include a first VNF and the second VNF, the second VNF is a monitoring management unit of the first VNF, the first VNF is referred to as a to-be-monitored VNF, and the VNFM is a life cycle management unit of the second VNF and the to-be-monitored VNF; and the second VNF includes:

a processor, a receiver, and a transmitter, where the processor is configured to establish a communications connection to the VNFM when the second VNF is instantiated by the VNFM;

the receiver is configured to receive monitoring data of monitoring the to-be-monitored VNF;

the processor is configured to summarize and analyze the monitoring data received by the receiver, to obtain monitoring information of the to-be-monitored VNF; and the transmitter is configured to send, to the NFVO, the monitoring information obtained after summarization and analysis.

With reference to the eighteenth aspect, in a first possible implementation of the eighteenth aspect, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units;

the processor is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNF; and the receiver is specifically configured to receive the monitoring data of monitoring the to-be-monitored VNF, sent by the second monitoring unit.

A nineteenth aspect of the disclosure provides an NFVO, applied to a Network Functions Virtualization NFV system, where the NFV system includes at least one virtualized network function VNF and a management and orchestration system MANO, and the MANO includes a virtualized network function manager VNFM and the network functions virtualization orchestrator NFVO, where the NFVO is a monitoring management unit of one or more VNFs in the VNF, the one or more VNFs are referred to as a to-be-monitored VNF, and the VNFM is a life cycle management unit of the to-be-monitored VNF; and the NFVO includes:

a receiver and a processor, where the receiver is configured to receive monitoring data of monitoring the to-be-monitored VNF; and the processor is configured to summarize and analyze the monitoring data received by the receiver, to obtain monitoring information of the to-be-monitored VNF.

With reference to the nineteenth aspect, in a first possible implementation of the nineteenth aspect, the to-be-monitored VNF is located in a network service NS, a first monitoring unit and a second monitoring unit for monitoring the to-be-monitored VNF are configured in the NS, and the VNFM is further a life cycle management unit of the first and the second monitoring units; and the processor is further configured to initiate a monitoring unit instantiation request to the VNFM, so that the VNFM instantiates the first and the second monitoring units based on a description file of the first and the second monitoring units, and therefore, communications connections are established between the NFVO and the first and the second monitoring units, or connections are established between the NFVO and the first and the second monitoring units by using the VNFM.

With reference to the first possible implementation of the nineteenth aspect, in a second possible implementation of the nineteenth aspect, the processor is further configured to adjust the NS that includes the to-be-monitored VNF, so that communications connections are established between the first and the second monitoring units and the to-be-monitored VNF.

With reference to the nineteenth aspect, in a third possible implementation of the nineteenth aspect, the processor is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO; and the receiver is specifically configured to receive the monitoring data of monitoring the to-be-monitored VNF, sent by the second monitoring unit.

With reference to the second possible implementation of the nineteenth aspect, in a fourth possible implementation of the nineteenth aspect, the processor is configured to configure the first and the second monitoring units by using the VNFM, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO by using the VNFM; and the receiver is specifically configured to receive, by using the VNFM, the monitoring data of monitoring the to-be-monitored VNF, sent by the second monitoring unit.

With reference to the second possible implementation of the nineteenth aspect, in a fifth possible implementation of the nineteenth aspect, the processor is further configured to:

add the first and the second monitoring units to an original link that includes the to-be-monitored VNF; or create a dedicated test link based on an original link that includes the to-be-monitored VNF, where the test link includes the first and the second monitoring units.

With reference to any one of the nineteenth aspect or the possible implementations of the nineteenth aspect, in a sixth possible implementation of the nineteenth aspect, the NFV system is connected to an operations support system OSS, and the NFVO further includes a transmitter, where the transmitter is configured to send the received monitoring information to the OSS.

A twentieth aspect of the disclosure provides an NFVO, applied to a Network Functions Virtualization NFV system, where the NFV system includes at least one virtualized network function VNF, a management and orchestration system MANO, and a monitoring management entity, the MANO includes a virtualized network function manager VNFM and the network functions virtualization orchestrator NFVO, the monitoring management entity is a monitoring management unit of one or more VNFs in the VNF, the one or more VNFs are referred to as a to-be-monitored VNF, and the VNFM is a life cycle management unit of the to-be-monitored VNF;

the NFVO includes a receiver; and the receiver is configured to receive, during monitoring, information about monitoring performed by the monitoring management entity on the to-be-monitored VNF.

With reference to the twentieth aspect, in a first possible implementation of the twentieth aspect, the to-be-monitored VNF is located in a network service NS, a first monitoring unit and a second monitoring unit for monitoring the to-be-monitored VNF are configured in the NS, and the VNFM is further a life cycle management unit of the first and the second monitoring units;

the NFVO further includes a processor;

the receiver is configured to receive a monitoring unit software package uploaded by the monitoring management entity, where the software package includes a description file of the first and the second monitoring units; and the processor is configured to initiate a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

With reference to the first possible implementation of the twentieth aspect, in a second possible implementation of the twentieth aspect, the processor is configured to adjust the NS that includes the to-be-monitored VNF, so that communications connections are established between the first and the second monitoring units and the to-be-monitored VNF.

With reference to the second possible implementation of the twentieth aspect, in a third possible implementation of the twentieth aspect, the processor is further configured to:

add the first and the second monitoring units to an original link that includes the to-be-monitored VNF; or create a dedicated test link based on an original link that includes the to-be-monitored VNF, where the test link includes the first and the second monitoring units.

With reference to any one of the twentieth aspect or the possible implementations of the twentieth aspect, in a fourth possible implementation of the twentieth aspect, the NFV system is connected to an operations support system OSS, and the NFVO further includes a transmitter, where the transmitter is configured to send the received monitoring information to the OSS.

A twenty-first aspect of the disclosure provides a monitoring management entity, applied to a Network Functions Virtualization NFV system, where the NFV system includes at least one virtualized network function VNF, a management and orchestration system MANO, and the monitoring management entity, and the MANO includes a virtualized network function manager VNFM and a network functions virtualization orchestrator NFVO, where a communications connection is established between the monitoring management entity and the MANO by using a corresponding interface, the monitoring management entity is a monitoring management unit of one or more VNFs in the VNF, the one or more VNFs are referred to as a to-be-monitored VNF, and the VNFM is a life cycle management unit of the to-be-monitored VNF; and the monitoring management entity includes:

a receiver, a processor, and a transmitter, where the receiver is configured to receive, during monitoring, monitoring data of monitoring the to-be-monitored VNF;

the processor is configured to summarize and analyze the monitoring data received by the receiver, to obtain monitoring information of the to-be-monitored VNF; and the transmitter is configured to send the monitoring information to the NFVO.

With reference to the twenty-first aspect, in a first possible implementation of the twenty-first aspect, the to-be-monitored VNF is located in a network service NS, a first monitoring unit and a second monitoring unit for monitoring the to-be-monitored VNF are configured in the NS, and the VNFM is further a life cycle management unit of the first and the second monitoring units;

the processor is configured to upload a monitoring unit software package, where the software package includes a description file of the first and the second monitoring units; and the NFVO initiates a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

With reference to the first possible implementation of the twenty-first aspect, in a second possible implementation of the twenty-first aspect, the processor is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the monitoring management entity; and the receiver is specifically configured to receive the monitoring data of monitoring the to-be-monitored VNF, sent by the second monitoring unit.

A twenty-second aspect of the disclosure provides a Network Functions Virtualization NFV system, where the NFV system includes at least one virtualized network function VNF and a management and orchestration system MANO, and the MANO includes at least two virtualized network function managers VNFMs and a network functions virtualization orchestrator NFVO, where the at least two VNFMs include a first VNFM and a second VNFM, the first VNFM is a life cycle management unit of the VNF, the second VNFM is a monitoring management unit of one or more VNFs in the VNF, and the one or more VNFs are referred to as a to-be-monitored VNF;

the NFVO is configured to:

instantiate the second VNFM based on a software package of the second VNFM, so that a communications connection is established between the second VNFM and the NFVO; and receive, during monitoring, monitoring information that is sent by the second VNFM after the second VNFM summarizes and analyzes monitoring data of the to-be-monitored VNF; and the second VNFM is configured to:

establish a communications connection to the NFVO when the second VNFM is instantiated by the NFVO;

receive the monitoring data of monitoring the to-be-monitored VNF;

summarize and analyze the received monitoring data, to obtain the monitoring information of the to-be-monitored VNF; and send, to the NFVO, the monitoring information obtained after summarization and analysis.

A twenty-third aspect of the disclosure provides a Network Functions Virtualization NFV system, where the NFV system includes a virtualized network function VNF and a management and orchestration system MANO, the MANO includes a virtualized network function manager VNFM and a network functions virtualization orchestrator NFVO, and a communications connection is established between the VNFM and the NFVO, where when there are at least two VNFs, the at least two VNFs include a first VNF and a second VNF, the second VNF is a monitoring management unit of the first VNF, the first VNF is referred to as a to-be-monitored VNF, and the VNFM is a life cycle management unit of the second VNF and the to-be-monitored VNF;

the NFVO is configured to:

initiate, to the VNFM, a request for instantiating the second VNF, so that the VNFM instantiates the second VNF based on a description file of the second VNF, and therefore a communications connection is established between the second VNF and the VNFM; and receive, during monitoring, monitoring information that is sent by the second VNF after the second VNF summarizes and analyzes monitoring data; and the second VNF is configured to:

establish a communications connection to the VNFM when the second VNF is instantiated by the VNFM;

receive the monitoring data of monitoring the to-be-monitored VNF;

summarize and analyze the received monitoring data, to obtain the monitoring information of the to-be-monitored VNF; and send, to the NFVO, the monitoring information obtained after summarization and analysis.

A twenty-fourth aspect of the disclosure provides a Network Functions Virtualization NFV system, where the NFV system includes at least one virtualized network function VNF and a management and orchestration system MANO, and the MANO includes a virtualized network function manager VNFM and a network functions virtualization orchestrator NFVO, where the NFVO is a monitoring management unit of one or more VNFs in the VNF, the one or more VNFs are referred to as a to-be-monitored VNF, and the VNFM is a life cycle management unit of the to-be-monitored VNF; and the NFVO is configured to:

receive monitoring data of monitoring the to-be-monitored VNF; and summarize and analyze the received monitoring data, to obtain monitoring information of the to-be-monitored VNF.

A twenty-fifth aspect of the disclosure provides a Network Functions Virtualization NFV system, applied to the Network Functions Virtualization NFV system, where the NFV system includes at least one virtualized network function VNF, a management and orchestration system MANO, and a monitoring management entity, the MANO includes a virtualized network function manager VNFM and a network functions virtualization orchestrator NFVO, the monitoring management entity is a monitoring management unit of one or more VNFs in the VNF, the one or more VNFs are referred to as a to-be-monitored VNF, and the VNFM is a life cycle management unit of the to-be-monitored VNF;

the NFVO is configured to:

receive, during monitoring, information about monitoring performed by the monitoring management entity on the to-be-monitored VNF; and the monitoring management entity is configured to:

receive, during monitoring, monitoring data of monitoring the to-be-monitored VNF;

summarize and analyze the received monitoring data, to obtain the monitoring information of the to-be-monitored VNF; and send the monitoring information to the NFVO.

According to the VNF information obtaining method, apparatus, and system provided in the embodiments of the disclosure, a new MANO and NS architecture is deployed. Compared with a case that VNF running status information is not sent in an existing MANO and NS architecture, in the embodiments, detailed VNF running information can be obtained by detecting the to-be-monitored VNF. In this way, more comprehensive and more accurate data can be provided for determining a fault cause. This improves quality of network service provisioning.

BRIEF DESCRIPTION OF DRAWINGS

To describe the technical solutions in the embodiments of the disclosure more clearly, the following briefly describes the accompanying drawings required for describing the embodiments. Apparently, the accompanying drawings in the following description show only some embodiments of the disclosure, and a person of ordinary skill in the art may still derive other drawings from these accompanying drawings without creative efforts.

FIG. 13 is a flowchart of a VNF information obtaining method according to Embodiment 6 of the disclosure;

FIG. 14 is an example of a schematic diagram of a VNF information obtaining method according to Embodiment 6 of the disclosure;

FIG. 15 is another example of a schematic diagram of a VNF information obtaining method according to Embodiment 6 of the disclosure;

DESCRIPTION OF EMBODIMENTS

The following clearly describes the technical solutions in the embodiments of the disclosure with reference to the accompanying drawings in the embodiments of the disclosure. Apparently, the described embodiments are merely some but not all of the embodiments of the disclosure. All other embodiments obtained by a person of ordinary skill in the art based on the embodiments of the disclosure without creative efforts shall fall within the protection scope of the disclosure.

For ease of understanding, a technology related to the disclosure is described as follows.

In 2012, operators issued a Network Functions Virtualization (NFV) white paper, and declared that the NFV Industry Specification Group (ISG) was founded in the European Telecommunications Standards Institute (ETSI). In addition, currently, nearly a hundred companies all over the world have become members of the NFV ISG. The operators founded the NFV ISG to define Network Functions Virtualization requirements of the operators and related technical reports, expecting to implement some network functions on a general high-performance server, switch, and storage by using an Internet technology (IT) virtualization technology. For such a purpose of the operators, the network functions need to be implemented by using software, and be capable of running on hardware of the general high-performance server, switch, storage, and the like. In addition, the network functions can be migrated to, instantiated at, and deployed at different locations in a network according to a requirement, with no need for installation of a new device. Currently, for many types of network devices, such as a server, a router, a storage device, a content delivery network (CDN), and a switch, software-hardware separation can be implemented by using an NFV technology, so that the network devices can be deployed at a data center, a network node, or a home of a user. In addition, the NFV white paper issued by the operators states that scenarios about which the operators concern include a broadband network gateway (BNG), carrier grade address translation (CG-NAT), a router, a mobile network EPC (evolved packet core), an Internet Protocol multimedia network subsystem (IMS), a radio access network (RAN), a home network, and the like.

Figure 1:
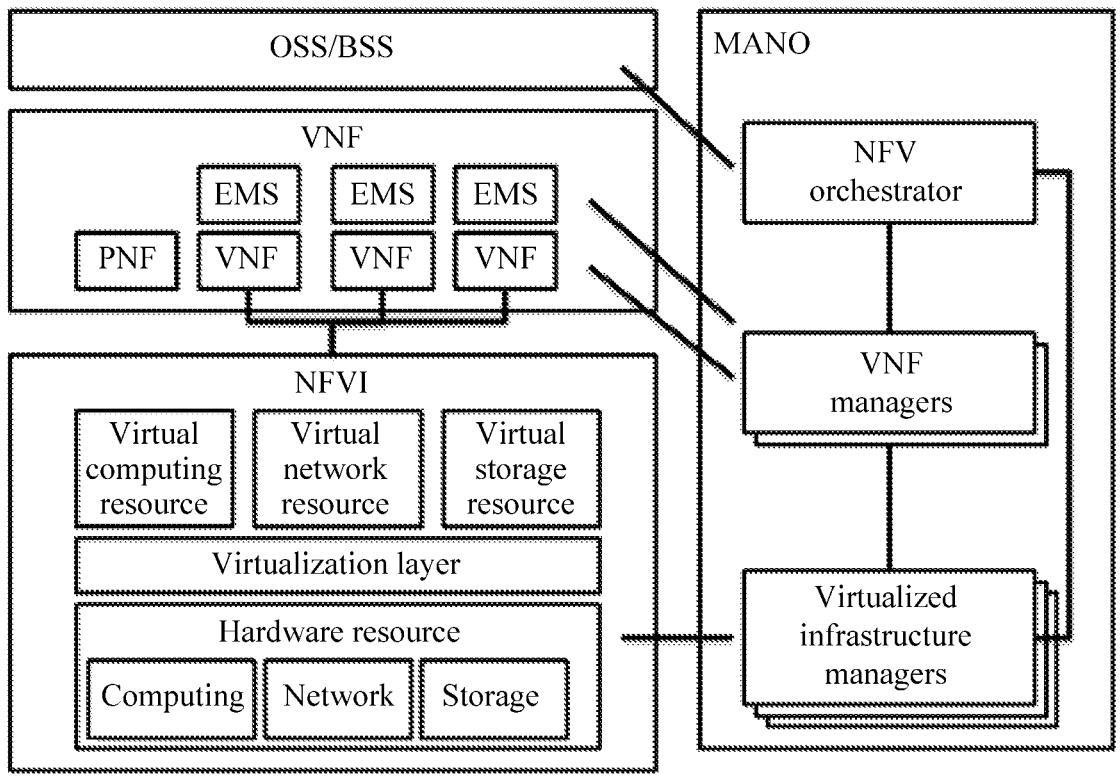
FIG. 1 is an architectural diagram of an NFV system in the conventional art.

The NFV technology mainly includes three key features. A first feature is as follows: Software defining the network functions is completely separated from the general high-performance server, storage, and switch, and runs, as virtualized software, on general computation, storage, and network device platforms. A second feature is that software and hardware components are deployed as independent modules. A third feature is automated orchestration, that is, a software device is remotely installed and managed based on general hardware and in a completely automated manner. In addition, the NFV technology has a unique architecture. FIG. 1 shows an NFV end-to-end architecture defined in an existing standard, and the architecture mainly includes three parts.

(1) A virtualized network function (VNF) unit: A VNF is a virtualized network function, such as a virtualized EPC node, corresponding to a physical network function (PNF) in a conventional network. NFV expects that a VNF and a PNF of a same type can have a same function, same performance, and a same external interface. The VNF may include multiple virtualized network function components (VNFC). Usually, one VNFC runs on one virtual machine (VM). Therefore, in deployment, one VNF may include one or more VMs.

(2) An element management system (EMS) unit: The EMS unit performs fault management, configuration management, accounting management, performance management, and security management (FCAPS) functions on the VNF.

(3) An NFV infrastructure (NFVI) unit: NFVI includes a hardware resource, a virtual resource, and a virtualization layer.

The virtual resource represents a resource that is simulated by using software and that has a hardware system function. The virtualization layer represents a virtual host platform with an advanced resource management function.

Usually, a combination of the virtualization layer and the hardware resource is an entity that can provide the required virtual resource for the VNF.

(4) A virtualized infrastructure manager (VIM): The VIM is a virtualized entity configured to control and manage virtual computing, storage, and network resources.

(5) An NFV orchestrator (NFVO): The NFVO is responsible for orchestrating and managing an NFV resource (including an NFVI resource and a VNF resource) and implementing an NFV service topology on the NFVI.

(6) A VNF management unit (VNFM): The VNF management unit is responsible for life cycle management of a VNF instance.

(7) An operations and business support system (OSS/BSS): The system is an integrated resource information sharing support system of a telecommunications operator, and mainly includes network management, system management, accounting, operating, an account, a customer service, and other parts.

The NFVO, the VNFM, and the VIM together constitute an NFV management and network orchestrator (MANO) architecture.

In addition, an NS (network service) has a specific function, and usually includes several one or more VNFs. The VNFs in the NS may be combined in multiple manners. Different combination manners may be described by using a VNF forwarding graph (VNFFG).

To make the advantages of the technical solutions in the disclosure clearer, the following describes the disclosure in detail with reference to the accompanying drawings and the embodiments.

Embodiment 1

Embodiment 1 of the disclosure provides a VNF information obtaining method, applied to an NFV system. The NFV system includes at least one VNF and an MANO, and the MANO includes at least two VNFMs and an NFVO.

The at least two VNFMs include a first VNFM and a second VNFM. The first VNFM is a life cycle management unit of the VNF, and a communications connection is established between the first VNFM and the NFVO. The second VNFM is a monitoring management unit of one or more VNFs in the VNF. The one or more VNFs are referred to as a to-be-monitored VNF.

Based on the foregoing MANO structure, the first VNFM has a same function as a VNFM in the conventional art, that is, serves as the life cycle management unit of the VNF; and the second VNFM is newly added and is specially used as the monitoring management unit of the one or more VNFs in the VNF. Therefore, the MANO including the second VNFM can obtain detailed running information of a monitored VNF by means of VNF monitoring, so as to provide more comprehensive and more accurate data for determining a fault cause. This improves quality of network service provisioning.

Figure 2:
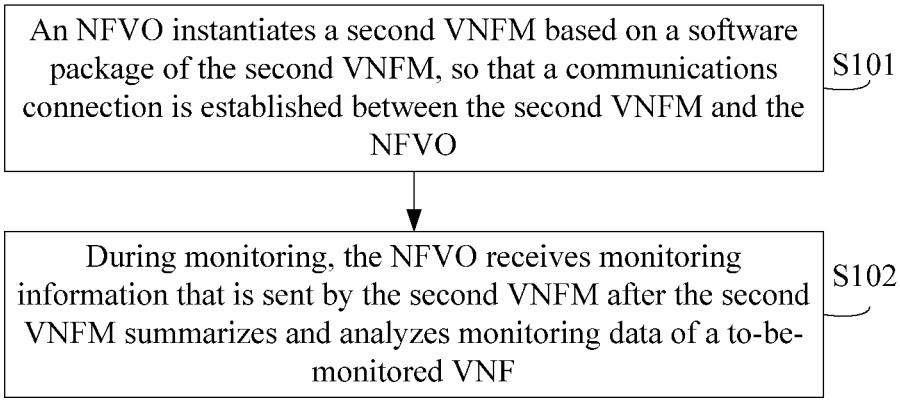
FIG. 2 is a flowchart of a VNF information obtaining method according to Embodiment 1 of the disclosure.

Specifically, as shown in FIG. 2, the VNF information obtaining method includes the following steps.

Step S101: The NFVO instantiates the second VNFM based on a software package of the second VNFM, so that a communications connection is established between the second VNFM and the NFVO.

Specifically, after the software package of the second VNFM is uploaded to the NFVO, the NFVO instantiates the second VNFM based on the software package of the second VNFM, so that the communications connection is established between the second VNFM and the NFVO.

In this step, the software package may include a description file of the second VNFM. The description file of the second VNFM records information such as a provider, a function description, and an ID of the second VNFM. In addition, the software package may further include a configuration file. The configuration file may be a file including some configuration parameters required in a program initialization or running process. Such a configuration file may be used as a part of the description file. The software package may further include security authentication information, so that operations such as uploader authentication, data integrity verification, and software security check may be performed in a software package upload process. In addition, the software package may include a software program of the second VNFM, or obtaining manner information of a software program of the second VNFM, such as an FTP address, a user name, and a password, and is used for instantiating the second VNFM. The obtaining manner information of the software program may be used as a part of the description file.

A process of instantiating the second VNFM by the NFVO may be specifically as follows: The NFVO first starts the second VNFM based on the software package of the second VNFM. After the second VNFM is started, the communications connection is established between the VNFM and the NFVO. Then, the NFVO performs authentication on the second VNFM, capability report of the second VNFM, for example, reporting that the second VNFM has a monitoring function capability, and policy configuration related to the second VNFM. The policy configuration may include configuration of an optional-VIM list, a resource usage quota, and the like.

In the foregoing process of instantiating the second VNFM by the NFVO, monitoring information can be transmitted between the NFVO and the second VNFM by using the communications connection established between the VNFM and the NFVO.

Based on step S101, further, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units.

After the NFVO instantiates the second VNFM, the VNF information obtaining method further includes the following step:

The NFVO initiates a monitoring unit instantiation request to the second VNFM, so that the VNFM instantiates the first and the second monitoring units based on a description file of the first and the second monitoring units, and therefore communications connections are established between the first and the second monitoring units and the second VNFM.

Specifically, after a software package including the description file of the first and the second monitoring units is uploaded to the NFVO, the NFVO initiates the monitoring unit instantiation request to the second VNFM, so that the VNFM instantiates the first and the second monitoring units based on the description file of the first and the second monitoring units, and therefore the communications connections are established between the first and the second monitoring units and the second VNFM.

In this step, the software package includes the description file of the first and the second monitoring units. The description file of the first and the second monitoring units records information such as composition, a topology, and a required resource of the monitoring units. Herein, the description file of the first and the second monitoring units may be one file.

It should be noted that the software package including the description file of the monitoring units and the software package of the second VNFM may be uploaded to the NFVO together. After the software packages are uploaded to the NFVO, the NFVO instantiates the second VNFM based on the software package of the second VNFM, and then, the VNFM instantiates the monitoring units based on the description file of the monitoring units.

A process of instantiating the monitoring units by the second VNFM may be specifically as follows: After the NFVO initiates the monitoring unit instantiation request to the second VNFM, the second VNFM obtains, from the description file of the monitoring units, information about the resource required by the monitoring units, and sends a resource allocation request to the NFVO. Then, the NFVO applies to a VIM for resource allocation, and in this case, the VIM starts a virtual machine, configures a network, and returns virtual-machine information. The NFVO forwards the information to the second VNFM. Then, the communications connections are established between the second VNFM and the monitoring units, and the second VNFM configures the monitoring units, so that the monitoring units can normally run and work.

In the foregoing process of instantiating the monitoring units by the second VNFM, monitoring data can be transmitted between the monitoring units and the second VNFM by using the communications connections established between the monitoring units and the second VNFM.

Optionally, after the second VNFM instantiates the monitoring units based on the description file of the first and the second monitoring units, the VNF information obtaining method further includes the following step:

The NFVO adjusts the NS that includes the to-be-monitored VNF, so that communications connections are established between the first and the second monitoring units and the to-be-monitored VNF.

Test data can be transmitted between the first and the second monitoring units and the to-be-monitored VNF by using the communications connections established between the first and the second monitoring units and the to-be-monitored VNF. A test data transmission process may be specifically as follows: The first monitoring unit sends the test data to the to-be-monitored VNF according to configurations, so that the test data is received by the second monitoring unit after being processed by the to-be-monitored VNF, and the second monitoring unit processes and analyzes the received processed test data to obtain monitoring data, and sends the monitoring data to the second VNFM.

Further, in a process of adjusting, by the NFVO, the NS that includes the to-be-monitored VNF, a manner of connection between the first and the second monitoring units, the to-be-monitored VNF, and the second VNFM may be specifically the following two connection manners.

In a first connection manner, the first and the second monitoring units are added to an original link that includes the to-be-monitored VNF.

Figure 3:
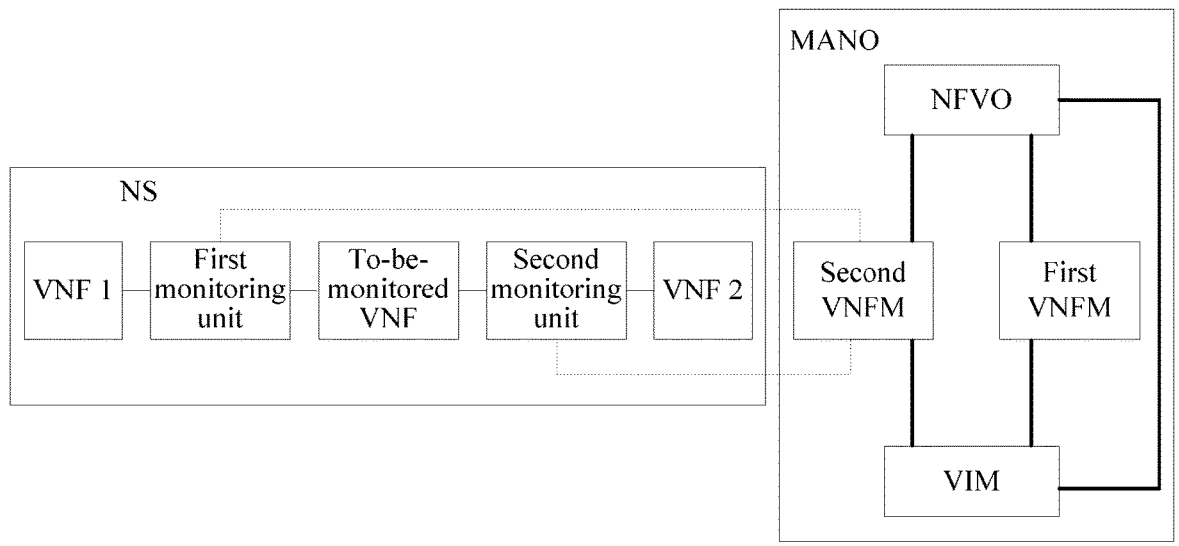
FIG. 3 is an example of a schematic diagram of a VNF information obtaining method according to Embodiment 1 of the disclosure.

Specifically, for example, one to-be-monitored VNF is monitored. As shown in FIG. 3, an MANO system includes an NFVO, a first VNFM, a second VNFM, and a VIM. An NS includes a first monitoring unit, the to-be-monitored VNF, a second monitoring unit, and other VNFs that do not need to be monitored (marked as a VNF 1 and a VNF 2 in FIG. 3). Before the monitoring units are deployed in the NS, an original link includes the to-be-monitored VNF, the VNF 1, and the VNF 2. After the monitoring units are deployed in the NS, referring to FIG. 3, the first and the second monitoring units are deployed in the link including the VNF 1 and the VNF 2. In addition, the second VNFM is separately connected to the first and the second monitoring units by using a dedicated link.

In the foregoing first connection manner, a formed serial link is easier to implement, and NS adjustment is relatively simple.

In a second connection manner, a dedicated test link is created based on an original link that includes the to-be-monitored VNF, where the test link includes the first and the second monitoring units.

Figure 4:
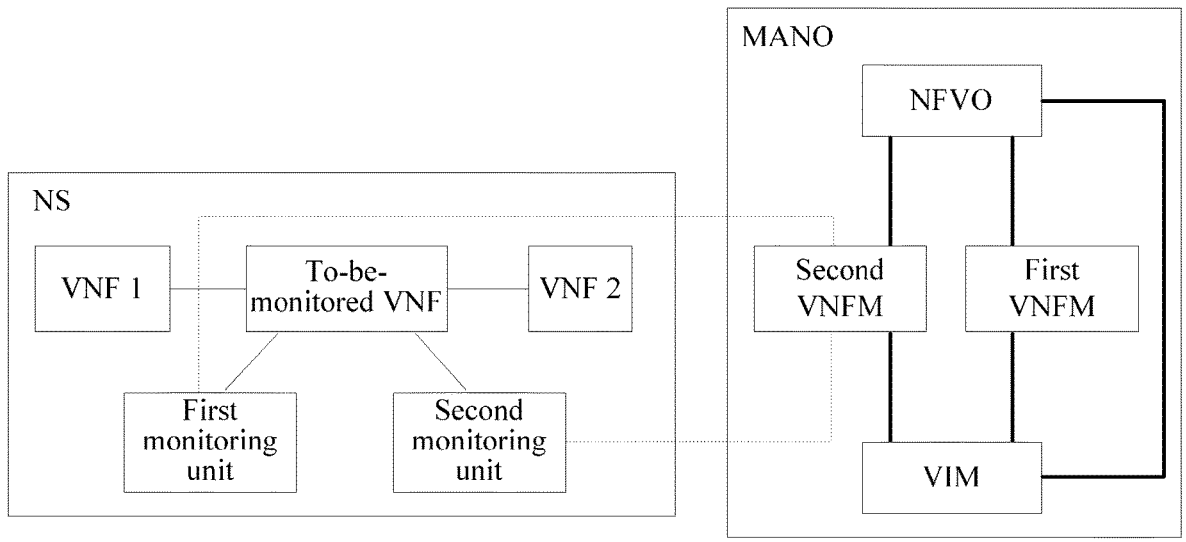
FIG. 4 is another example of a schematic diagram of a VNF information obtaining method according to Embodiment 1 of the disclosure.

Specifically, for example, one to-be-monitored VNF is monitored. As shown in FIG. 4, an MANO system includes an NFVO, a first VNFM, a second VNFM, and a VIM. An NS includes a first monitoring unit, the to-be-monitored VNF, a second monitoring unit, and other VNFs that do not need to be monitored (marked as a VNF 1 and a VNF 2 in FIG. 4). Before the monitoring units are deployed in the NS, an original link includes the to-be-monitored VNF, the VNF 1, and the VNF 2. After the monitoring units are deployed in the NS, referring to FIG. 4, the first monitoring unit, the second monitoring unit, and the to-be-monitored VNF are located in one serial link. The serial link is a link different from the original link including the to-be-monitored VNF, the VNF 1, and the VNF 2. The second VNFM is separately connected to the first and the second monitoring units by using a dedicated link.

In the foregoing second connection manner, although a VNFFG/an NFP (network forwarding path) further needs to be created and a test interface provided by the to-be-monitored VNF further needs to be enabled during NS adjustment, using such a connection manner can avoid mixture of test data and service data, and reduce impact of the test data on the service data to some extent.

In addition, optionally, before instantiation of the monitoring units, the VNF information obtaining method further includes the following step:

The NFVO receives a monitoring request sent by an OSS, where the monitoring request is used to request to monitor the to-be-monitored VNF in the NS; or when a user initiates a monitoring request by using the NFVO, the NFVO receives the monitoring request sent by the user, where the monitoring request is used to request to monitor the to-be-monitored VNF in the NS.

In the specific embodiment, the step of receiving the monitoring request by the NFVO may be performed before the step of instantiating the second VNFM by the NFVO. Alternatively, the step of receiving the monitoring request by the NFVO may be performed after the step of instantiating the second VNFM by the NFVO. That is, the second VNFM is instantiated first, and is in an idle state in this case. The steps of monitoring unit instantiation and NS adjustment are performed after the monitoring request is received.

Further, the foregoing monitoring request may include the following information:

ID information of the NS, ID information of the to-be-monitored VNF, a test item, a test parameter, and authentication information, where the test item is a specified indicator that needs to be tested, and the test item includes a processing delay and a packet loss rate; and the test parameter includes a quantity of test times, a test frequency, a format of a test data packet, a quantity of result reporting times, and a result reporting frequency.

In addition, the ID information of the NS is used by the system to identify, from multiple NSs, the NS that needs to be monitored or the NS to which the to-be-monitored VNF belongs. The ID information of the to-be-monitored VNF is used by the NFVO to identify the to-be-monitored VNF from multiple VNFs. In this embodiment, usually, one NS is corresponding to one or more second VNFMs. One NS may include one to-be-monitored VNF, or may include multiple to-be-monitored VNFs. Monitoring management of the multiple to-be-monitored VNFs may be performed by a same second VNFM, or may be performed by different second VNFMs.

Step S102: During monitoring, the NFVO receives monitoring information that is sent by the second VNFM after the second VNFM summarizes and analyzes monitoring data of the to-be-monitored VNF.

Specifically, after the second VNFM is instantiated by the NFVO and the communications connection is established between the second VNFM and the NFVO, the second VNFM, serving as the monitoring management unit of the to-be-monitored VNF, can receive and summarize the monitoring data of monitoring the to-be-monitored VNF, and obtain the monitoring information by means of analysis according to the summarized monitoring data. Then, the second VNFM sends the monitoring information to the NFVO, that is, the NFVO receives the monitoring information sent by the second VNFM.

Content of the monitoring information in this step is corresponding to content of the monitoring request in step S101. For example, when the test item in the content of the monitoring request is the packet loss rate, the content of the monitoring information includes packet loss rate information.

Optionally, after step S102, the method further includes the following step: The NFVO sends the received monitoring information to the OSS.

According to the VNF information obtaining method provided in Embodiment 1 of the disclosure, in a new MANO and NS architecture provided in this embodiment of the disclosure, the second VNFM is the monitoring management unit of the one or more VNFs, and the one or more VNFs are referred to as the to-be-monitored VNF. In this case, the information obtaining method includes: instantiating, by the NFVO, the second VNFM based on the software package of the second VNFM, so that the communications connection is established between the second VNFM and the NFVO; and receiving, by the NFVO during monitoring, the monitoring information that is sent by the second VNFM after the second VNFM summarizes and analyzes the monitoring data of the to-be-monitored VNF. Compared with a manner that VNF running status information is not sent in an existing MANO and NS architecture, according to the VNF running status information obtaining method in the new MANO and NS architecture, the MANO in this embodiment can obtain detailed VNF running information by detecting the to-be-monitored VNF by using the second VNFM, so as to provide more comprehensive and more accurate data for determining a fault cause. This improves quality of network service provisioning.

Embodiment 2

Embodiment 2 of the disclosure provides a VNF information obtaining method, applied to an NFV system. The NFV system includes at least one VNF and an MANO, and the MANO includes at least two VNFMs and an NFVO.

The at least two VNFMs include a first VNFM and a second VNFM. The first VNFM is a life cycle management unit of the VNF, and a communications connection is established between the first VNFM and the NFVO. The second VNFM is a monitoring management unit of one or more VNFs in the VNF. The one or more VNFs are referred to as a to-be-monitored VNF.

It should be noted that, based on the foregoing MANO structure, the first VNFM has a same function as a VNFM in the conventional art, that is, serves as the life cycle management unit of the VNF; and the second VNFM is newly added and is specially configured to perform monitoring management on the one or more VNFs in the VNF. Therefore, the MANO including the second VNFM can obtain detailed running information of a monitored VNF by means of VNF monitoring, so as to provide more comprehensive and more accurate data for determining a fault cause. This improves quality of network service provisioning.

Figure 5:
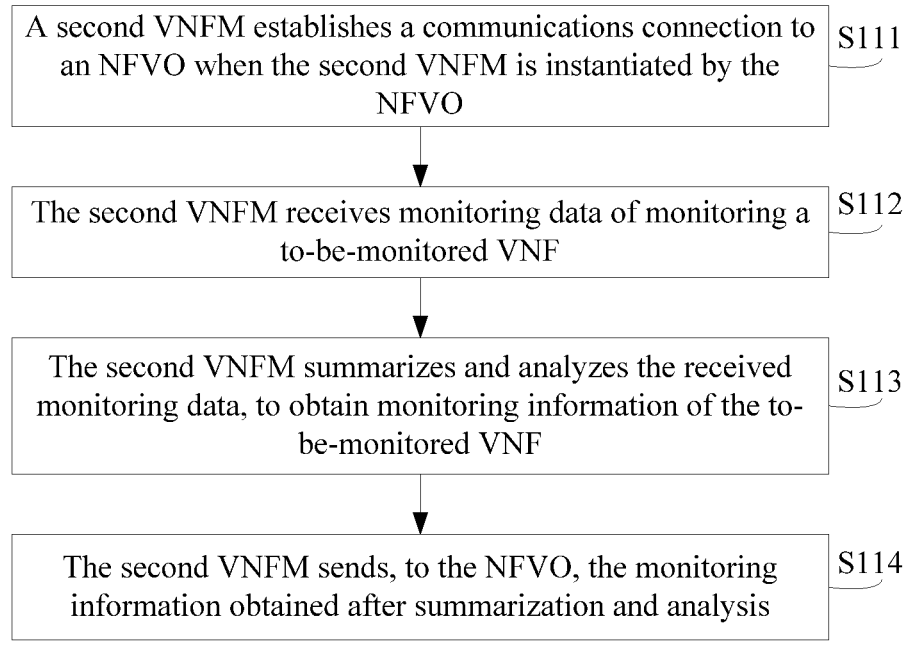
FIG. 5 is a flowchart of a VNF information obtaining method according to Embodiment 2 of the disclosure.

Specifically, as shown in FIG. 5, the information obtaining method includes the following steps.

Step S111: The second VNFM establishes a communications connection to the NFVO when the second VNFM is instantiated by the NFVO.

In this step, a process in which the second VNFM is instantiated by the NFVO is the same as the process in which the second VNFM is instantiated by the NFVO in Embodiment 1. Details are not described herein again.

In the process in which the second VNFM is instantiated by the NFVO, monitoring information can be transmitted between the NFVO and the second VNFM by using the communications connection established between the second VNFM and the NFVO.

Further, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units.

After the second VNFM is instantiated by the NFVO, the information obtaining method further includes the following step:

Step S111': The second VNFM instantiates the first and the second monitoring units based on a description file of the first and the second monitoring units, so that communications connections are established between the first and the second monitoring units and the second VNFM.

Further, before the second VNFM receives monitoring data of monitoring the to-be-monitored VNF, the method further includes the following step:

The second VNFM configures the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNFM.

In the foregoing step, two connection processes of establishing the communications connections between the (first and the second) monitoring units and the second VNFM and establishing communications connections between the monitoring units and the to-be-monitored VNF are deployment processes performed by the NFVO. After the NFVO completes deployment, the second VNFM is notified to start a monitoring process. The notification may carry a configuration parameter of the monitoring units. After receiving the start notification, the second VNFM configures the monitoring units according to the received configuration parameter, and starts monitoring after completing configuration. At the beginning of the monitoring process, the first monitoring unit sends the test data to the to-be-monitored VNF according to the configurations. The to-be-monitored VNF processes the test data, and then sends the processed test data to the second monitoring unit. The second monitoring unit processes and analyzes the test data to obtain the monitoring data, and sends the monitoring data to the second VNFM.

It can be understood that the foregoing function descriptions of the first and the second monitoring units are merely an example. In the example, the first monitoring unit sends the test data to the to-be-monitored VNF according to the configurations, and the second monitoring unit receives the test data processed by the to-be-monitored VNF. However, the disclosure is not limited thereto. A person skilled in the art can easily figure out that functions of the first and the second monitoring units are interchangeable, or that functions of the first and the second monitoring units may be implemented by one integrated monitoring unit.

In addition, quantities of the first and the second monitoring units are not limited in the disclosure. For example, when there are multiple to-be-monitored VNFs, one first monitoring unit may be configured, to send test data to all the to-be-monitored VNFs, and one second monitoring unit may be configured, to receive the test data processed by the to-be-monitored VNFs. Alternatively, multiple first monitoring units and multiple second monitoring units may be correspondingly configured. For example, each of the multiple first monitoring units sends test data to each to-be-monitored VNF, and each of the multiple second monitoring units receives the test data processed by each to-be-monitored VNF.

Step S112: The second VNFM receives monitoring data of monitoring the to-be-monitored VNF.

Based on step S111', that the second VNFM receives monitoring data of monitoring the to-be-monitored VNF is specifically the following step:

The second VNFM receives the monitoring data of monitoring the to-be-monitored VNF, sent by the second monitoring unit.

Step S113: The second VNFM summarizes and analyzes the received monitoring data, to obtain monitoring information of the to-be-monitored VNF.

Step S114: The second VNFM sends, to the NFVO, the monitoring information obtained after summarization and analysis.

Content of the monitoring information in this step is corresponding to content of the monitoring request in step S111. For example, when the test item in the content of the monitoring request is the packet loss rate, the content of the monitoring information includes packet loss rate information.

According to the VNF information obtaining method provided in Embodiment 2 of the disclosure, in a new MANO and NS architecture provided in this embodiment of the disclosure, the second VNFM is the monitoring management unit of the one or more VNFs, and the one or more VNFs are referred to as the to-be-monitored VNF. In this case, the information obtaining method includes: establishing, by the second VNFM, the communications connection to the NFVO when the second VNFM is instantiated by the NFVO; receiving, by the second VNFM, the monitoring data of monitoring the to-be-monitored VNF; summarizing and analyzing, by the second VNFM, the received monitoring data, to obtain the monitoring information of the to-be-monitored VNF; and sending, by the second VNFM to the NFVO, the monitoring information obtained after summarization and analysis. Compared with a manner that VNF running status information is not sent in an existing MANO and NS architecture, according to the VNF running status information obtaining method in the new MANO and NS architecture, the MANO in this embodiment can obtain detailed VNF running information by proactively monitoring the to-be-monitored VNF by using the second VNFM, so as to provide more comprehensive and more accurate data for determining a fault cause. This improves quality of network service provisioning.

Embodiment 3

Embodiment 3 of the disclosure provides a VNF information obtaining method, applied to an NFV system. The NFV system includes a VNF and an MANO, the MANO includes a VNFM and an NFVO, and a communications connection is established between the VNFM and the NFVO.

When there are at least two VNFs, the at least two VNFs include a first VNF and a second VNF. The second VNF is a monitoring management unit of the first VNF, the first VNF is referred to as a to-be-monitored VNF, and the VNFM is a life cycle management unit of the second VNF and the to-be-monitored VNF.

It should be noted that, in the foregoing MANO structure, the second VNF is newly added and is specially configured to perform monitoring management on the to-be-monitored VNF. When receiving monitoring data of the to-be-monitored VNF, the second VNF can summarize and analyze the monitoring data to obtain monitoring information of the to-be-monitored VNF. In this case, the MANO including the second VNF can obtain detailed running information of a monitored VNF by means of VNF monitoring, so as to provide more comprehensive and more accurate data for determining a fault cause. This improves quality of network service provisioning.

Figure 6:
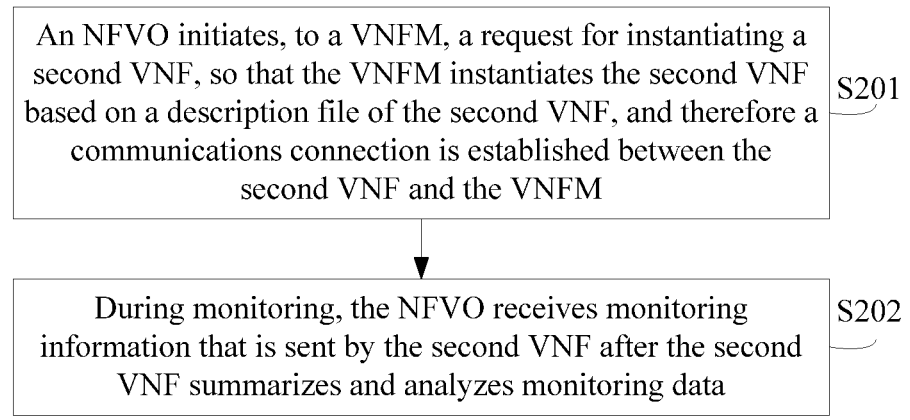
FIG. 6 is a flowchart of a VNF information obtaining method according to Embodiment 3 of the disclosure.

Specifically, as shown in FIG. 6, the VNF information obtaining method includes the following steps.

Step S201: The NFVO initiates, to the VNFM, a request for instantiating the second VNF, so that the VNFM instantiates the second VNF based on a description file of the second VNF, and therefore a communications connection is established between the second VNF and the VNFM.

Specifically, after a software package including the description file of the second VNF is uploaded to the NFVO, the NFVO initiates, to the VNFM, the request for instantiating the second VNF, so that the VNFM instantiates the second VNF based on the description file of the second VNF, and therefore the communications connection is established between the second VNF and the VNFM.

In this step, the software package may include the description file of the second VNF. The description file of the second VNF records information such as composition, a topology, and a required resource of the second VNF. In addition, the software package may further include a configuration file. The configuration file may be a file including some configuration parameters required in a program initialization or running process, and may also be used as a part of the description file. It should be noted that the software package may further include security authentication information, so that operations such as uploader authentication, data integrity verification, and software security check may be performed in a software package upload process.

A process of instantiating the second VNF by the VNFM may be specifically as follows: After the NFVO initiates, to the VNFM, the request for instantiating the second VNF, the VNFM obtains, from the description file, information about the resource required by the second VNF, and sends a resource allocation request to the NFVO. Then, the NFVO applies to a VIM for resource allocation, and in this case, the VIM starts a virtual machine, configures a network, and returns virtual-machine information. The NFVO forwards the information to the VNFM. Then, the communications connection is established between the VNFM and the second VNF, and the VNFM configures the second VNF, so that the second VNF can normally run and work.

In the foregoing process of instantiating the second VNF by the VNFM, monitoring information can be transmitted between the VNFM and the second VNF by using the communications connection established between the VNFM and the second VNF.

Based on step S201, further, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units.

After the VNFM instantiates the second VNF, the VNF information obtaining method further includes the following step:

The NFVO initiates a monitoring unit instantiation request to the VNFM, so that the VNFM instantiates the monitoring units based on a description file of the first and the second monitoring units, and therefore communications connections are established between the first and the second monitoring units and the VNFM.

Specifically, after a software package including the description file of the first and the second monitoring units is uploaded to the NFVO, the NFVO initiates the monitoring unit instantiation request to the VNFM, so that the VNFM instantiates the monitoring units based on the description file of the first and the second monitoring units, and therefore the communications connections are established between the first and the second monitoring units and the VNFM.

In this step, the software package may include the description file of the first and the second monitoring units. The description file of the first and the second monitoring units records information such as composition, a topology, and a required resource of the monitoring units.

It should be noted that the software packages including the description files of the (first and the second) monitoring units and the second VNF may be uploaded to the NFVO together. After the software packages are uploaded to the NFVO, the VNFM first instantiates the second VNF based on the description file of the second VNF, and then, the VNFM instantiates the monitoring units based on the description file of the monitoring units.

It can be understood that the foregoing function descriptions of the first and the second monitoring units are merely an example, and reference may be made to the explanation in Embodiment 2. Details are not described herein again. In addition, quantities of the first and the second monitoring units are not limited in the disclosure. For example, when there are multiple to-be-monitored VNFs, one first monitoring unit may be configured, to send test data to all the to-be-monitored VNFs, and one second monitoring unit may be configured, to receive the test data processed by the to-be-monitored VNFs. Alternatively, multiple first monitoring units and multiple second monitoring units may be correspondingly configured. For example, each of the multiple first monitoring units sends test data to each to-be-monitored VNF, and each of the multiple second monitoring units receives the test data processed by each to-be-monitored VNF.

A process of instantiating the monitoring units by the VNFM may be specifically as follows: After the NFVO initiates the monitoring unit instantiation request to the VNFM, the VNFM obtains, from the description file, information about the resource required by the monitoring units, and sends a resource allocation request to the NFVO. Then, the NFVO applies to a VIM for resource allocation, and in this case, the VIM starts a virtual machine, configures a network, and returns virtual-machine information. The NFVO forwards the information to the VNFM. Then, the communications connections are established between the VNFM and the monitoring units, and the VNFM configures the monitoring units, so that the monitoring units can normally run and work.

In the foregoing process of instantiating the monitoring units by the VNFM, monitoring information can be transmitted between the monitoring units and the VNFM by using the communications connections established between the monitoring units and the VNFM.

Optionally, after the VNFM instantiates the first and the second monitoring units based on the description file of the first and the second monitoring units, the VNF information obtaining method further includes the following step:

The NFVO adjusts the NS that includes the to-be-monitored VNF, so that communications connections are established between the first and the second monitoring units and the to-be-monitored VNF, and communications connections are established between the first and the second monitoring units and the second VNF.

Test data can be transmitted between the first and the second monitoring units and the to-be-monitored VNF by using the communications connections established between the first and the second monitoring units and the to-be-monitored VNF. A test data transmission process may be specifically as follows: The first and the second monitoring units send the test data to the to-be-monitored VNF, and the first and the second monitoring units receive the test data processed by the to-be-monitored VNF.

Monitoring data can be transmitted between the monitoring units and the second VNF by using the communications connections established between the monitoring units and the second VNF.

Further, in a process of adjusting, by the NFVO, the NS that includes the to-be-monitored VNF, the communications connections established between the first and the second monitoring units, the to-be-monitored VNF, and the second VNF may be specifically implemented in the following two connection manners:

In a first connection manner, the first and the second monitoring units are added to an original link that includes the to-be-monitored VNF.

Figure 7:
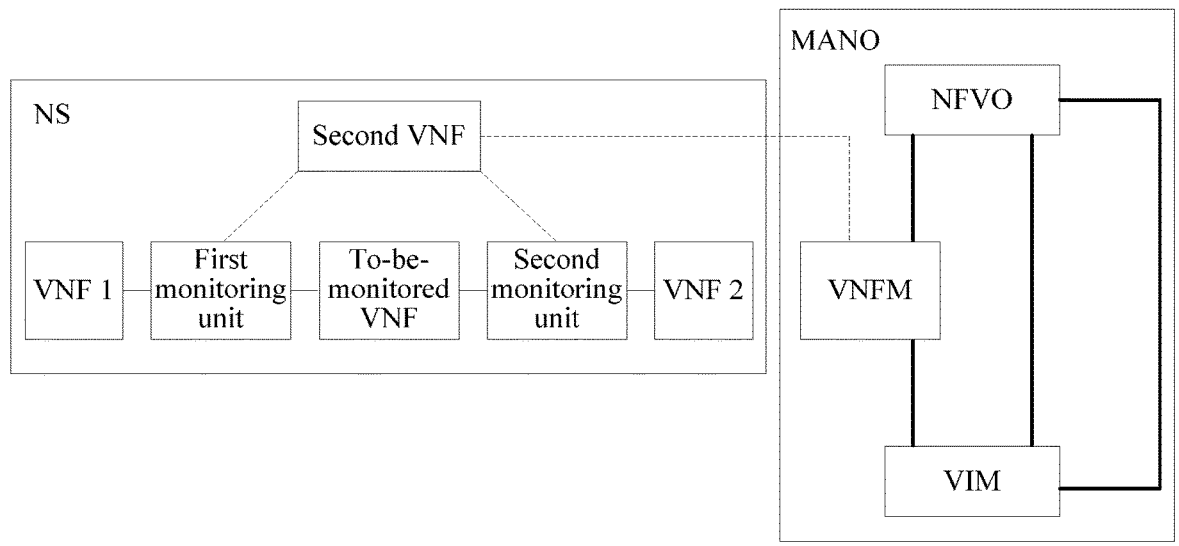
FIG. 7 is an example of a schematic diagram of a VNF information obtaining method according to Embodiment 3 of the disclosure.

Specifically, for example, one to-be-monitored VNF is monitored. As shown in FIG. 7, an MANO system includes an NFVO, a VNFM, and a VIM. An NS includes a first monitoring unit, the to-be-monitored VNF, a second monitoring unit, a second VNF, and other VNFs that do not need to be monitored (marked as a VNF 1 and a VNF 2 in FIG. 7). Before the monitoring units are deployed in the NS, an original link includes the to-be-monitored VNF, the VNF 1, and the VNF 2. After the monitoring units are deployed in the NS, referring to FIG. 7, the first and the second monitoring units are deployed in the link including the VNF 1 and the VNF 2. In addition, the second VNF is connected to the first and the second monitoring units by using a dedicated link.

In the foregoing first connection manner, a formed serial link is easier to implement, and NS adjustment is relatively simple.

In a second connection manner, a dedicated test link is created based on an original link that includes the to-be-monitored VNF, where the test link includes the first and the second monitoring units.

Figure 8:
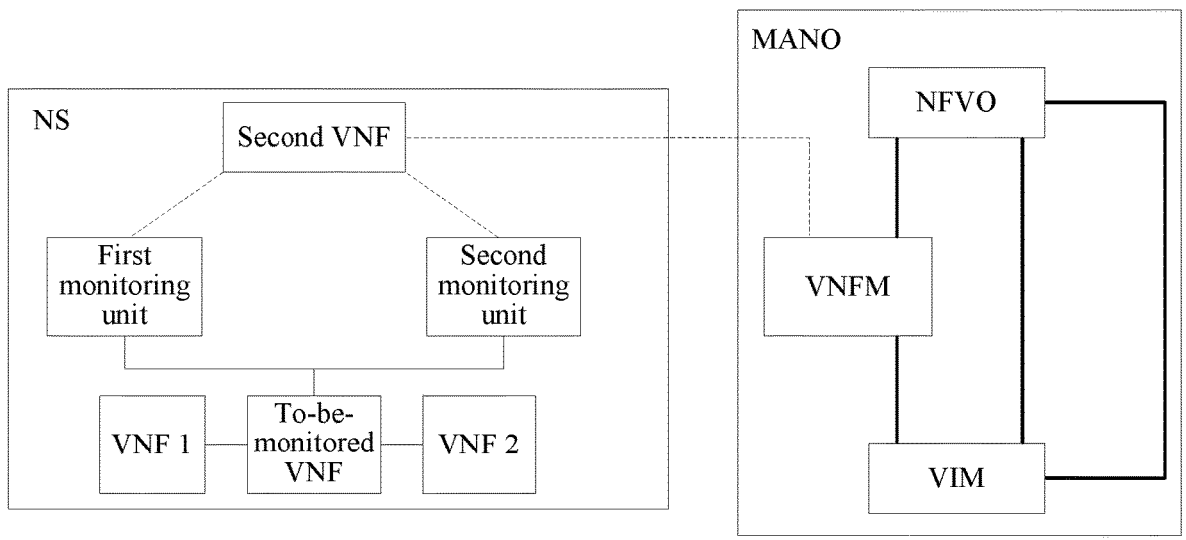
FIG. 8 is another example of a schematic diagram of a VNF information obtaining method according to Embodiment 3 of the disclosure.

For example, one to-be-monitored VNF is monitored. As shown in FIG. 8, an MANO system includes an NFVO, a VNFM, and a VIM. An NS includes a first monitoring unit, the to-be-monitored VNF, a second monitoring unit, a second VNF, and other VNFs that do not need to be monitored (marked as a VNF 1 and a VNF 2 in FIG. 8). Before the monitoring units are deployed in the NS, an original link includes the to-be-monitored VNF, the VNF 1, and the VNF 2. After the monitoring units are deployed in the NS, referring to FIG. 8, the first monitoring unit, the second monitoring unit, and the to-be-monitored VNF are located in one serial link. The serial link is a link different from the original link including the to-be-monitored VNF, the VNF 1, and the VNF 2. In addition, the second VNF is connected to the first and the second monitoring units by using a dedicated link.

In the foregoing second connection manner, although a VNFFG/an NFP further needs to be created and a test interface provided by the to-be-monitored VNF further needs to be enabled during NS adjustment, using such a connection manner can avoid mixture of test data and service data, and reduce impact of the test data on the service data to some extent.

In addition, optionally, before the VNFM instantiates the second VNF based on the description file of the second VNF, the VNF information obtaining method further includes the following step:

The NFVO receives a monitoring request sent by an OSS, where the monitoring request is used to request to monitor the to-be-monitored VNF in the NS; or when a user initiates a monitoring request by using the NFVO, the NFVO receives the monitoring request sent by the user, where the monitoring request is used to request to monitor the to-be-monitored VNF in the NS.

After the NFVO receives the monitoring request sent by the OSS or the user, the VNFM instantiates the monitoring units and the second VNF, and the NFVO adjusts the NS that includes the to-be-monitored VNF.

Further, the foregoing monitoring request may include the following information:

ID information of the NS, ID information of the to-be-monitored VNF, a test item, a test parameter, and authentication information, where the test item is a specified indicator that needs to be tested, and the test item includes a processing delay and a packet loss rate; and the test parameter includes a quantity of test times, a test frequency, a format of a test data packet, a quantity of result reporting times, and a result reporting frequency.

In addition, the ID information of the NS is used by the system to identify, from multiple NSs, the NS that needs to be monitored or the NS to which the to-be-monitored VNF belongs. The ID information of the to-be-monitored VNF is used by the NFVO to identify the to-be-monitored VNF from multiple VNFs. In this embodiment, usually, one NS is corresponding to one or more second VNFs. One NS may include one to-be-monitored VNF, or may include multiple to-be-monitored VNFs. Monitoring management of the multiple to-be-monitored VNFs may be performed by a same second VNF, or may be performed by different second VNFs.

Step S202: During monitoring, the NFVO receives monitoring information that is sent by the second VNF after the second VNF summarizes and analyzes monitoring data.

It should be noted that, that "the NFVO receives monitoring information that is sent by the second VNF" in step S202 may be as follows: The NFVO receives the monitoring information from the second VNF by using the VNFM, or the NFVO directly receives the monitoring information from the second VNF.

Specifically, when the NFVO receives the monitoring information from the second VNF by using the VNFM, after the second VNF is instantiated by the VNFM and the communications connection is established between the second VNF and the VNFM, the second VNF, serving as the monitoring management unit of the to-be-monitored VNF, can receive and summarize the monitoring data of monitoring the to-be-monitored VNF, obtain the monitoring information by means of analysis according to the summarized monitoring data, and then send the monitoring information to the VNFM. Because the communications connection between the VNFM and the NFVO is also established, the VNFM further sends the monitoring information to the NFVO. Therefore, the NFVO receives, by using the VNFM, the monitoring information that is sent by the second VNF after the second VNF summarizes and analyzes the monitoring data.

Content of the monitoring information in this step is corresponding to content of the monitoring request in step S101. That is, when the test item in the content of the monitoring request is the packet loss rate, the content of the monitoring information includes packet loss rate information.

Optionally, after step S202, the method further includes the following step: The NFVO sends the received monitoring information to the OSS.

According to the VNF information obtaining method provided in Embodiment 3 of the disclosure, in a new MANO and NS architecture provided in this embodiment of the disclosure, the second VNF is the monitoring management unit of the first VNF, the first VNF is referred to as the to-be-monitored VNF, and the VNFM is the life cycle management unit of the second VNF and the to-be-monitored VNF. In this case, the information obtaining method includes: instantiating, by the NFVO, the second VNFM based on the description file of the second VNF, so that the communications connection is established between the second VNF and the NFVO; and receiving, by the NFVO during monitoring, the monitoring information that is sent by the second VNF after the second VNF summarizes and analyzes the monitoring data. Compared with a manner that VNF running status information is not sent in an existing MANO and NS architecture, according to the VNF running status information obtaining method in the new MANO and NS architecture, the MANO in this embodiment can obtain detailed VNF running information by detecting the to-be-monitored VNF by using the second VNF, so as to provide more comprehensive and more accurate data for determining a fault cause. This improves quality of network service provisioning.

Embodiment 4

Embodiment 4 of the disclosure provides a VNF information obtaining method, applied to an NFV system. The NFV system includes a VNF and an MANO, the MANO includes a VNFM and an NFVO, and a communications connection is established between the VNFM and the NFVO.

When there are at least two VNFs, the at least two VNFs include a first VNF and a second VNF. The second VNF is a monitoring management unit of the first VNF, the first VNF is referred to as a to-be-monitored VNF, and the VNFM is a life cycle management unit of the second VNF and the to-be-monitored VNF.

In the foregoing MANO structure, the second VNF is newly added and is specially configured to perform monitoring management on the to-be-monitored VNF. When receiving monitoring data of the to-be-monitored VNF, the second VNF can summarize and analyze the monitoring data to obtain monitoring information of the to-be-monitored VNF. In this case, the MANO including the second VNF can obtain detailed running information of a monitored VNF by means of VNF monitoring, so as to provide more comprehensive and more accurate data for determining a fault cause. This improves quality of network service provisioning.

Figure 9:
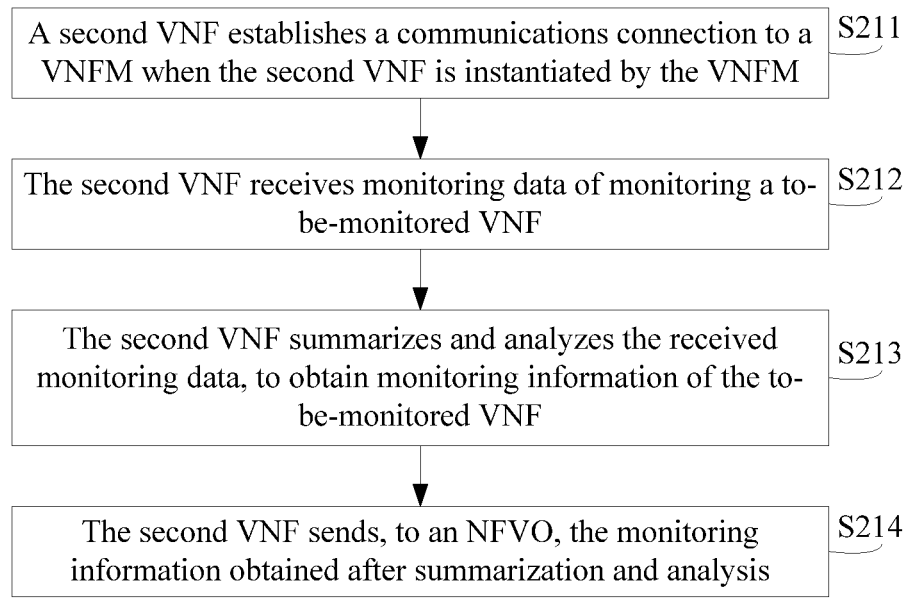
FIG. 9 is a flowchart of a VNF information obtaining method according to Embodiment 4 of the disclosure.

Specifically, as shown in FIG. 9, the information obtaining method includes the following steps.

Step S211: The second VNF establishes a communications connection to the VNFM when the second VNF is instantiated by the VNFM.

In this step, a process in which the second VNF is instantiated by the VNFM is the same as the process in which the second VNF is instantiated by the VNFM in Embodiment 3. Details are not described herein again.

In the process in which the second VNF is instantiated by the VNFM, the monitoring information can be transmitted between the second VNF and the VNFM by using the communications connection established between the second VNF and the VNFM.

Based on step S211, further, the to-be-monitored VNF and the second VNF are located in an NS, a first monitoring unit and a second monitoring unit for monitoring the to-be-monitored VNF are configured in the NS, the VNFM is further a life cycle management unit of the first and the second monitoring units, and the VNFM instantiates the first and the second monitoring units. Before the second VNF receives the monitoring data of monitoring the to-be-monitored VNF, the method further includes the following step:

Step S211': The second VNF configures the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNF.

In the foregoing step, connection processes of establishing communications connections between the (first and the second) monitoring units and the second VNF and establishing communications connections between the monitoring units and the to-be-monitored VNF are deployment processes performed by the NFVO. After deployment is completed, the second VNF is notified to start a monitoring process. The notification may carry a configuration parameter of the monitoring units. After receiving the start notification, the second VNF configures the monitoring units according to the received configuration parameter, and starts monitoring after completing configuration. At the beginning of the monitoring process, the first monitoring unit sends the test data to the to-be-monitored VNF according to the configurations. The to-be-monitored VNF processes the test data, and then sends the processed test data to the second monitoring unit. The second monitoring unit processes and analyzes the test data to obtain the monitoring data, and sends the monitoring data to the second VNF.

Step S212: The second VNF receives the monitoring data of monitoring the to-be-monitored VNF.

Based on step S211', that the second VNF receives the monitoring data of monitoring the to-be-monitored VNF is specifically as follows:

Step S212': The second VNF receives the monitoring data of monitoring the to-be-monitored VNF, sent by the monitoring unit.

When the monitoring unit includes the first and the second monitoring units, a communications connection is established between each of the first and the second monitoring units and the to-be-monitored VNF, and a communications connection is established between each of the first and the second monitoring units and the second VNF, based on step S211', step S212', that is, the second VNF receives the monitoring data of monitoring the to-be-monitored VNF, sent by the monitoring unit, may further be specifically as follows: The second VNF receives the monitoring data of monitoring the to-be-monitored VNF, sent by the second monitoring unit.

Step S213: The second VNF summarizes and analyzes the received monitoring data, to obtain the monitoring information of the to-be-monitored VNF.

Step S214: The second VNF sends, to the NFVO, the monitoring information obtained after summarization and analysis.

In this step, the second VNF may send, to the NFVO by using the VNFM, the monitoring information obtained after summarization and analysis. This is corresponding to the step that "the NFVO receives the monitoring information from the second VNF by using the VNFM". Alternatively, the second VNF may directly send, to the NFVO, the monitoring information obtained after summarization and analysis. This is corresponding to the step that "the NFVO directly receives the monitoring information from the second VNF". According to the VNF information obtaining method provided in Embodiment 4 of the disclosure, in a new MANO and NS architecture provided in this embodiment of the disclosure, the second VNF is the monitoring management unit of the first VNF, the first VNF is referred to as the to-be-monitored VNF, and the VNFM is the life cycle management unit of the second VNF and the to-be-monitored VNF. In this case, the information obtaining method includes: establishing, by the second VNF, the communications connection to the VNFM; receiving, by the second VNF, the monitoring data of monitoring the to-be-monitored VNF; summarizing and analyzing, by the second VNF, the received monitoring data, to obtain the monitoring information of the to-be-monitored VNF; and sending, by the second VNF to the NFVO, the monitoring information obtained after summarization and analysis. Compared with a manner that VNF running status information is not sent in an existing MANO and NS architecture, according to the VNF running status information obtaining method in the new MANO and NS architecture, the MANO in this embodiment can obtain detailed VNF running information by proactively monitoring the to-be-monitored VNF by using the second VNF, so as to provide more comprehensive and more accurate data for determining a fault cause. This improves quality of network service provisioning.

Embodiment 5

Embodiment 5 of the disclosure provides a VNF information obtaining method, applied to an NFV system. The NFV system includes at least one VNF and an MANO, the MANO includes a VNFM and an NFVO, and a communications connection is established between the VNFM and the NFVO.

The NFVO is a monitoring management unit of one or more VNFs in the VNF, the one or more VNFs are referred to as a to-be-monitored VNF, and the VNFM is a life cycle management unit of the to-be-monitored VNF.

In the foregoing MANO structure, the NFVO is further reused to perform monitoring management on the to-be-monitored VNF. When receiving monitoring data of the to-be-monitored VNF, the NFVO summarizes and analyzes the monitoring data to obtain monitoring information of the to-be-monitored VNF. In this way, the MANO including the NFVO can obtain detailed running information of a monitored VNF by means of VNF monitoring, so as to provide more comprehensive and more accurate data for determining a fault cause. This improves quality of network service provisioning.

Figure 10:
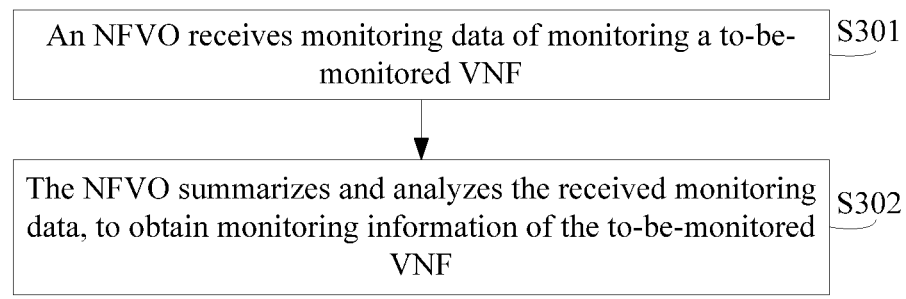
FIG. 10 is a flowchart of a VNF information obtaining method according to Embodiment 5 of the disclosure.

Specifically, as shown in FIG. 10, the information obtaining method includes the following steps.

Step S301: The NFVO receives the monitoring data of monitoring the to-be-monitored VNF.

Step S302: The NFVO summarizes and analyzes the received monitoring data, to obtain the monitoring information of the to-be-monitored VNF.

According to the VNF information obtaining method provided in Embodiment 5 of the disclosure, in a new MANO and NS architecture provided in this embodiment of the disclosure, the NFV system includes the at least one VNF and the MANO, the MANO includes the VNFM and the NFVO, and the communications connection is established between the VNFM and the NFVO. The NFVO is the monitoring management unit of the one or more VNFs, and the one or more VNFs are referred to as the to-be-monitored VNF. In this case, the information obtaining method includes: receiving, by the NFVO, the monitoring data of monitoring the to-be-monitored VNF; and summarizing and analyzing, by the NFVO, the received monitoring data, to obtain the monitoring information of the to-be-monitored VNF. Compared with a manner that VNF running status information is not sent in an existing MANO and NS architecture, according to the VNF running status information obtaining method in the new MANO and NS architecture, the MANO in this embodiment can obtain detailed VNF running information by detecting the to-be-monitored VNF by using the NFVO, so as to provide more comprehensive and more accurate data for determining a fault cause. This improves quality of network service provisioning. In addition, such an NFVO reusing manner avoids deployment of a dedicated test management unit. Therefore, management is relatively simplified.

Further, the to-be-monitored VNF is located in a network service NS, a first monitoring unit and a second monitoring unit for monitoring the to-be-monitored VNF are configured in the NS, and the VNFM is further a life cycle management unit of the first and the second monitoring units. The method further includes the following step:

The NFVO initiates a monitoring unit instantiation request to the VNFM, so that the VNFM instantiates the first and the second monitoring units based on a description file of the first and the second monitoring units, and therefore, communications connections are established between the NFVO and the first and the second monitoring units, or communications connections are established between the NFVO and the first and the second monitoring units by using the VNFM.

In this embodiment of the disclosure, according to different manners of connection between the VNFM and the first and the second monitoring units, a process of instantiating the monitoring units by the VNFM may be specifically classified into the following two cases:

Case 1: After a software package of the first and the second monitoring units is uploaded to the NFVO, where the software package includes the description file of the first and the second monitoring units, the NFVO initiates the monitoring unit instantiation request to the VNFM, and the VNFM obtains, from the description file, information about a resource required by the monitoring units, and sends a resource allocation request to the NFVO. Then, the NFVO applies to a VIM for resource allocation, and in this case, the VIM starts a virtual machine, configures a network, and returns virtual-machine information. The NFVO forwards the information to the VNFM. Then, the VNFM sends configuration-related information to the first and the second monitoring units, so that the communications connections are established between the NFVO and the first and the second monitoring units. Then, the NFVO configures the monitoring units, so that the monitoring units can normally run and work.

That the VNFM configures related information is specifically as follows: The VNFM notifies the monitoring units of an IP address or a MAC address of the NFVO, so that the monitoring units initiate connections to the NFVO.

Case 2: After a software package of the first and the second monitoring units is uploaded to the NFVO, where the software package includes the description file of the first and the second monitoring units, the NFVO initiates the monitoring unit instantiation request to the VNFM, and the VNFM obtains, from the description file, information about a resource required by the monitoring units, and sends a resource allocation request to the NFVO. Then, the NFVO applies to a VIM for resource allocation, and in this case, the VIM starts a virtual machine, configures a network, and returns virtual-machine information. The NFVO forwards the information to the VNFM. Then, the NFVO configures the first and the second monitoring units by using the VNFM, so that the monitoring units can normally run and work.

In the foregoing process of instantiating the monitoring units by the VNFM, the monitoring data can be transmitted between the monitoring units and the NFVO by using the communications connections established between the monitoring units and the NFVO.

Further, after the VNFM instantiates the first and the second monitoring units based on the description file of the first and the second monitoring units, the method further includes the following step:

The NFVO adjusts the NS that includes the to-be-monitored VNF, so that communications connections are established between the first and the second monitoring units and the to-be-monitored VNF.

Test data can be transmitted between the first and the second monitoring units and the to-be-monitored VNF by using the communications connections established between the first and the second monitoring units and the to-be-monitored VNF. A test data transmission process may be specifically as follows: The test data is received by the second monitoring unit after being processed by the to-be-monitored VNF, and the second monitoring unit processes and analyzes the received processed test data to obtain the monitoring data, and sends the monitoring data to the NFVO by using the VNFM.

Optionally, in an embodiment of the disclosure, during monitoring, before the NFVO receives the monitoring data of monitoring the to-be-monitored VNF, the monitoring units may be configured in the following two manners:

In a first configuration manner, the NFVO configures the first and the second monitoring units, so that the first monitoring unit sends the test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO.

In such a configuration manner, step S301 is specifically as follows: The NFVO receives the monitoring data of monitoring the to-be-monitored VNF, sent by the second monitoring unit.

In a second configuration manner, the NFVO configures the first and the second monitoring units by using the VNFM, so that the first monitoring unit sends the test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO by using the VNFM.

In such a configuration manner, step S301 is specifically as follows: The NFVO receives, by using the VNFM, the monitoring data of monitoring the to-be-monitored VNF, sent by the second monitoring unit.

Optionally, in an embodiment of the disclosure, in a process of adjusting, by the NFVO, the NS that includes the to-be-monitored VNF, the communications connections established between the first and the second monitoring units, the to-be-monitored VNF, and the NFVO may be specifically implemented in the following two connection manners:

In a first connection manner, the first and the second monitoring units are added to an original link that includes the to-be-monitored VNF.

Figure 11:
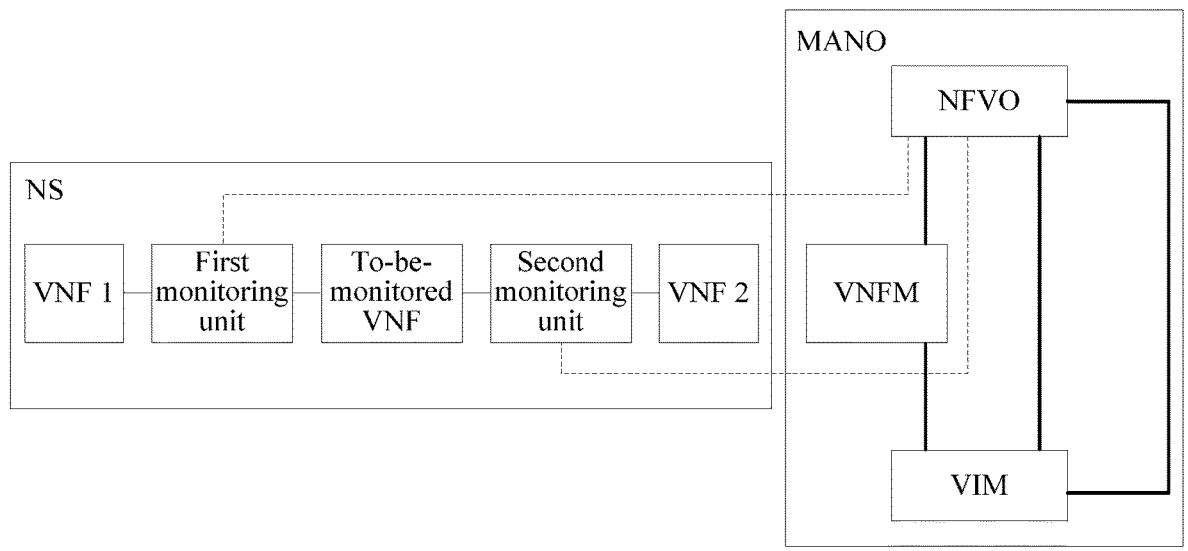
FIG. 11 is an example of a schematic diagram of a VNF information obtaining method according to Embodiment 5 of the disclosure.

For example, one to-be-monitored VNF is monitored. As shown in FIG. 11, an MANO system includes an NFVO, a VNFM, and a VIM. An NS includes a first monitoring unit, the to-be-monitored VNF, a second monitoring unit, and other VNFs that do not need to be monitored (marked as a VNF 1 and a VNF 2 in FIG. 11). Before the monitoring units are deployed in the NS, an original link includes the to-be-monitored VNF, the VNF 1, and the VNF 2. After the monitoring units are deployed in the NS, referring to FIG. 11, the first monitoring unit, the second monitoring unit, and the to-be-monitored VNF are located in one serial link. The serial link is a link different from the original link including the to-be-monitored VNF, the VNF 1, and the VNF 2. In addition, the NFVO is separately connected to the first and the second monitoring units by using a dedicated link.

In the foregoing first connection manner, a formed serial link is easier to implement, and NS adjustment is relatively simple.

In a second connection manner, a dedicated test link is created based on an original link that includes the to-be-monitored VNF, where the test link includes the first and the second monitoring units.

Figure 12:
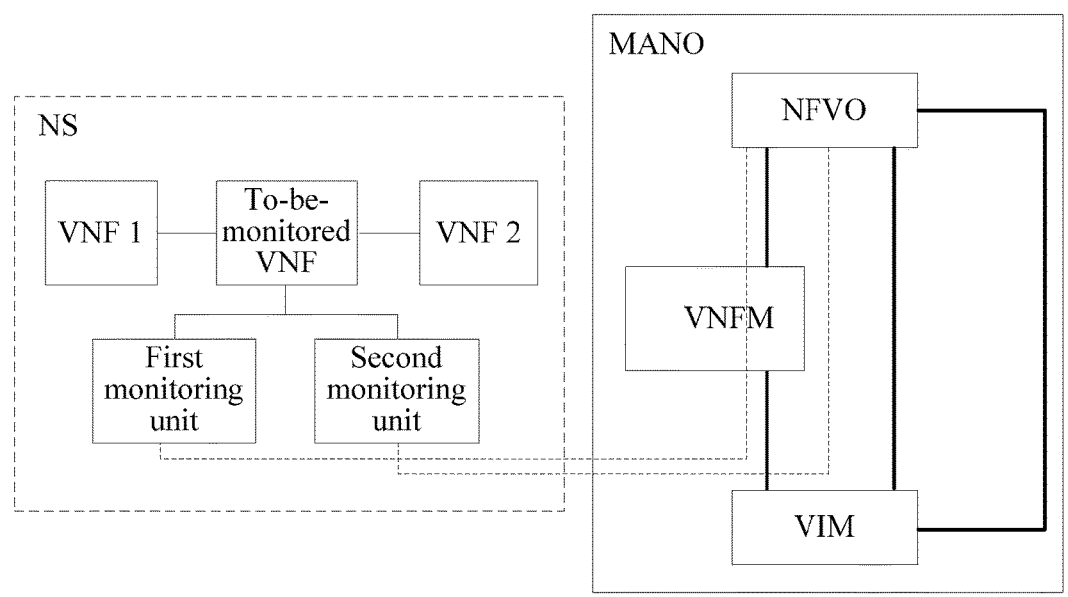
FIG. 12 is another example of a schematic diagram of a VNF information obtaining method according to Embodiment 5 of the disclosure.

Specifically, for example, one to-be-monitored VNF is monitored. As shown in FIG. 12, an MANO system includes an NFVO, a VNFM, and a VIM. An NS includes a first monitoring unit, the to-be-monitored VNF, a second monitoring unit, and other VNFs that do not need to be monitored (marked as a VNF 1 and a VNF 2 in FIG. 12). Before the monitoring units are deployed in the NS, an original link includes the to-be-monitored VNF, the VNF 1, and the VNF 2. After the monitoring units are deployed in the NS, referring to FIG. 12, the first monitoring unit, the second monitoring unit, and the to-be-monitored VNF are located in one serial link. The serial link is a link different from the original link including the to-be-monitored VNF, the VNF 1, and the VNF 2. In addition, the NFVO is separately connected to the first and the second monitoring units by using a dedicated link.

In the foregoing second connection manner, although a VNFFG/an NFP further needs to be created and a test interface provided by the to-be-monitored VNF further needs to be enabled during NS adjustment, using such a connection manner can avoid mixture of test data and service data, and reduce impact of the test data on the service data to some extent.

In addition, optionally, before the NFVO receives the monitoring data of monitoring the to-be-monitored VNF, the method further includes the following step:

The NFVO receives a monitoring request sent by an OSS, where the monitoring request is used to request to monitor the to-be-monitored VNF in the NS; or when a user initiates a monitoring request by using the NFVO, the NFVO receives the monitoring request sent by the user, where the monitoring request is used to request to monitor the to-be-monitored VNF in the NS.

It should be noted that the step of receiving the monitoring request by the NFVO may be performed before the step of configuring the monitoring units.

The monitoring request may include the following information: identity ID information of the NS, identity ID information of the to-be-monitored VNF, a test item, a test parameter, and authentication information, where the test item is a specified indicator that needs to be tested, and the test item includes a processing delay and a packet loss rate; and the test parameter includes a quantity of test times, a test frequency, a format of a test data packet, a quantity of result reporting times, and a result reporting frequency.

Optionally, after step S302, the method further includes the following step: The NFVO sends the received monitoring information to the OSS.

Embodiment 6

Embodiment 6 of the disclosure provides a VNF information obtaining method, applied to an NFV system. The NFV system includes at least one VNF, an MANO, and a monitoring management entity, the MANO includes a VNFM and an NFVO, the monitoring management entity is a monitoring management unit of one or more VNFs in the VNF, the one or more VNFs are referred to as a to-be-monitored VNF, and the VNFM is a life cycle management unit of the to-be-monitored VNF.

It should be noted that the monitoring management entity used for VNF monitoring management is added to the foregoing NFV system. The monitoring management entity may be configured on a physical device outside the MANO. When receiving monitoring data of the to-be-monitored VNF, the monitoring management entity can summarize and analyze the monitoring data to obtain monitoring information of the to-be-monitored VNF. In this way, the MANO can obtain detailed running information of a monitored VNF by using the monitoring management entity, so as to provide more comprehensive and more accurate data for determining a fault cause. This improves quality of network service provisioning.

Based on the foregoing architecture, as shown in FIG. 13, the VNF information obtaining method includes the following steps.

Step S401: During monitoring, the NFVO receives the information about monitoring performed by the monitoring management entity on the to-be-monitored VNF.

Specifically, during monitoring, the monitoring management entity first receives the monitoring data of monitoring the to-be-monitored VNF, and the monitoring management entity summarizes and analyzes the monitoring data to obtain the monitoring information of the to-be-monitored VNF, and sends the monitoring information to the monitoring management entity. Then, the NFVO receives the information about monitoring performed by the monitoring management entity on the to-be-monitored VNF, to use the information for system performance/fault analysis and processing.

Optionally, after step S401, the method further includes the following step: The NFVO sends the received monitoring information to an OSS.

According to the VNF information obtaining method provided in Embodiment 6 of the disclosure, in the new NFV system provided in this embodiment of the disclosure, the NFV system includes the at least one VNF, the MANO, and the monitoring management entity, the MANO includes the VNFM and the NFVO, the monitoring management entity is the monitoring management unit of the one or more VNFs in the VNF, and the one or more VNFs are referred to as the to-be-monitored VNF. During monitoring, the NFVO receives the information about monitoring performed by the monitoring management entity on the to-be-monitored VNF. Compared with a manner that VNF running status information is not sent in an existing NFV system, according to the VNF running status information obtaining method in the new NFV system, the MANO in this embodiment can obtain detailed VNF running information by using the monitoring management entity, so as to provide more comprehensive and more accurate data for determining a fault cause. This improves quality of network service provisioning.

Optionally, in an embodiment of the disclosure, the to-be-monitored VNF is located in an NS, monitoring units for monitoring the to-be-monitored VNF are configured in the NS, and the VNFM is further a life cycle management unit of the monitoring units. The VNF information obtaining method includes the following steps:

First, the NFVO receives a monitoring unit software package uploaded by the monitoring management entity, where the software package includes a description file of the first and the second monitoring units.

Then, the NFVO initiates a monitoring unit instantiation request to the VNFM, so that the VNFM instantiates the monitoring units based on the description file of the first and the second monitoring units, and therefore, communications connections are established between the first and the second monitoring units and the VNFM, and communications connections are established between the first and the second monitoring units and the monitoring management entity.

A process of instantiating the monitoring units by the VNFM may be specifically as follows: After the NFVO initiates the monitoring unit instantiation request to the VNFM, the VNFM obtains, from the description file, information about a resource required by the monitoring units, and sends a resource allocation request to the NFVO. Then, the NFVO applies to a VIM for resource allocation, and in this case, the VIM starts a virtual machine, configures a network, and returns virtual-machine information. The NFVO forwards the information to the VNFM. Then, the communications connections are established between the VNFM and the monitoring units, and the VNFM configures the monitoring units, so that the monitoring units can normally run and work.

In the foregoing process of instantiating the monitoring units by the VNFM, life cycle management performed by the VNFM on the monitoring units can be implemented by using the communications connections established between the monitoring units and the VNFM. The monitoring data can be transmitted between the monitoring units and the monitoring management entity by using the communications connections established between the monitoring units and the monitoring management entity.

Optionally, after the VNFM instantiates the first and the second monitoring units based on the description file of the first and the second monitoring units, the method further includes the following step:

The NFVO adjusts the NS that includes the to-be-monitored VNF, so that communications connections are established between the first and the second monitoring units and the to-be-monitored VNF.

Test data can be transmitted between the monitoring units and the to-be-monitored VNF by using the communications connections established between the monitoring units and the to-be-monitored VNF. A test data transmission process may be specifically as follows: The first monitoring unit sends the test data to the to-be-monitored VNF according to configurations, so that the test data is received by the second monitoring unit after being processed by the to-be-monitored VNF, and the second monitoring unit processes and analyzes the received processed test data to obtain the monitoring data, and sends the monitoring data to the monitoring management entity.

Further, optionally, in a process of adjusting, by the NFVO, the NS that includes the to-be-monitored VNF, the communications connections established between the first and the second monitoring units, the to-be-monitored VNF, and the monitoring management entity may be specifically implemented in the following two connection manners:

In a first connection manner, the first and the second monitoring units are added to an original link that includes the to-be-monitored VNF.

Specifically, for example, one to-be-monitored VNF is monitored. As shown in FIG. 14, an MANO system includes an NFVO, a VNFM, and a VIM. An NS includes a first monitoring unit, the to-be-monitored VNF, a second monitoring unit, and other VNFs that do not need to be monitored (marked as a VNF 1 and a VNF 2 in FIG. 14). Before the monitoring units are deployed in the NS, an original link includes the to-be-monitored VNF, the VNF 1, and the VNF 2. After the monitoring units are deployed in the NS, referring to FIG. 14, the first and the second monitoring units are deployed in the link including the VNF 1 and the VNF 2. In addition, the monitoring management entity is connected to the first and the second monitoring units by using a dedicated link.

In the foregoing first connection manner, a formed serial link is easier to implement, and NS adjustment is relatively simple.

In a second connection manner, a dedicated test link is created based on an original link that includes the to-be-monitored VNF, where the test link includes the first and the second monitoring units.

For example, one to-be-monitored VNF is monitored. As shown in FIG. 15, an MANO system includes an NFVO, a VNFM, and a VIM. An NS includes a first monitoring unit, the to-be-monitored VNF, a second monitoring unit, and other VNFs that do not need to be monitored (marked as a VNF 1 and a VNF 2 in FIG. 15). Before the monitoring units are deployed in the NS, an original link includes the to-be-monitored VNF, the VNF 1, and the VNF 2. After the monitoring units are deployed in the NS, referring to FIG. 15, the first monitoring unit, the second monitoring unit, and the to-be-monitored VNF are located in one serial link. The serial link is a link different from the original link including the to-be-monitored VNF, the VNF 1, and the VNF 2. In addition, the monitoring management entity is connected to the first and the second monitoring units by using a dedicated link.

In the foregoing second connection manner, although a VNFFG/an NFP further needs to be created and a test interface provided by the to-be-monitored VNF further needs to be enabled during NS adjustment, using such a connection manner can avoid mixture of test data and service data, and reduce impact of the test data on the service data to some extent.

In addition, optionally, before the NFVO receives the monitoring data of monitoring the to-be-monitored VNF, the method further includes the following step:

The NFVO receives a monitoring request sent by an OSS, where the monitoring request is used to request to monitor the to-be-monitored VNF in the NS; or the NFVO receives a monitoring request sent by the monitoring management entity, where the monitoring request is used to request to monitor the to-be-monitored VNF in the NS; or when a user initiates a monitoring request by using the NFVO, the NFVO receives the monitoring request sent by the user, where the monitoring request is used to request to monitor the to-be-monitored VNF in the NS.

It should be noted that the step of receiving the monitoring request by the NFVO may be performed before the step of configuring the monitoring units.

The monitoring request may include the following information: identity ID information of the NS, identity ID information of the to-be-monitored VNF, and authentication information.

Embodiment 7

Embodiment 7 of the disclosure provides a VNF information obtaining method, applied to an NFV system. The NFV system includes at least one VNF, an MANO, and a monitoring management entity, and the MANO includes a VNFM and an NFVO.

The monitoring management entity is a monitoring management unit of one or more VNFs in the VNF, the one or more VNFs are referred to as a to-be-monitored VNF, and the VNFM is a life cycle management unit of the to-be-monitored VNF.

It should be noted that the monitoring management entity used for VNF monitoring management is added to the foregoing NFV system. The monitoring management entity may be configured on a physical device outside the MANO. When receiving monitoring data of the to-be-monitored VNF, the monitoring management entity can summarize and analyze the monitoring data to obtain monitoring information of the to-be-monitored VNF. In this way, the MANO can obtain detailed running information of a monitored VNF by using the monitoring management entity, so as to provide more comprehensive and more accurate data for determining a fault cause. This improves quality of network service provisioning.

Figure 16:
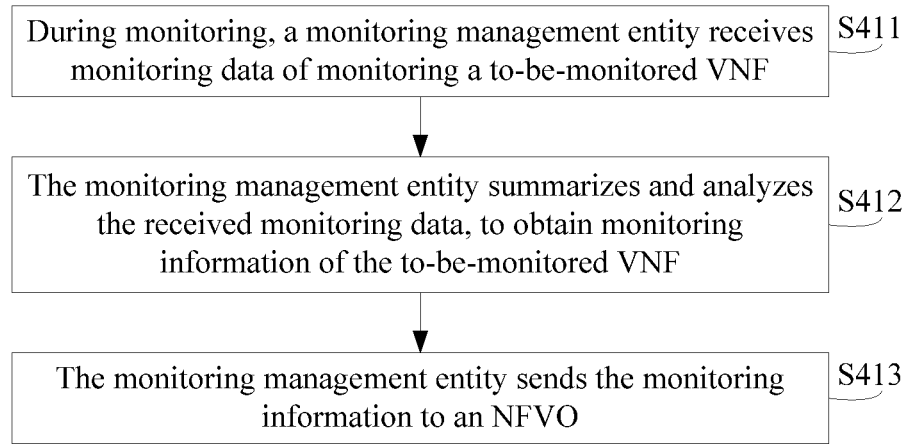
FIG. 16 is a flowchart of a VNF information obtaining method according to Embodiment 7 of the disclosure.

As shown in FIG. 16, the VNF information obtaining method includes the following steps.

Step S411: During monitoring, the monitoring management entity receives the monitoring data of monitoring the to-be-monitored VNF.

Step S412: The monitoring management entity summarizes and analyzes the received monitoring data, to obtain the monitoring information of the to-be-monitored VNF.

Step S413: The monitoring management entity sends the monitoring information to the NFVO.

According to the VNF information obtaining method provided in Embodiment 7 of the disclosure, in the new NFV system provided in this embodiment of the disclosure, the NFV system includes the at least one VNF, the MANO, and the monitoring management entity, the MANO includes the VNFM and the NFVO, the monitoring management entity is the monitoring management unit of the one or more VNFs in the VNF, and the one or more VNFs are referred to as the to-be-monitored VNF. During monitoring, the monitoring management entity receives the monitoring data of monitoring the to-be-monitored VNF, and the monitoring management entity summarizes and analyzes the received monitoring data to obtain the monitoring information of the to-be-monitored VNF. Then, the monitoring management entity sends the monitoring information to the NFVO. Compared with a manner that VNF running status information is not sent in an existing NFV system, according to the VNF running status information obtaining method in the new NFV system, the MANO in this embodiment can obtain detailed VNF running information by using the monitoring management entity, so as to provide more comprehensive and more accurate data for determining a fault cause. This improves quality of network service provisioning.

Optionally, in an embodiment of the disclosure, the to-be-monitored VNF is located in a network service NS, a first monitoring unit and a second monitoring unit for monitoring the to-be-monitored VNF are configured in the NS, and the VNFM is further a life cycle management unit of the first and the second monitoring units. Before the monitoring management entity performs monitoring, especially before the monitoring management entity receives the monitoring data of monitoring the to-be-monitored VNF, the VNF information obtaining method may further include the following steps:

The monitoring management entity uploads a monitoring unit software package, where the software package includes a description file of the first and the second monitoring units.

The NFVO initiates a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the monitoring units and the monitoring management entity.

Further, before the monitoring management entity receives the monitoring data of monitoring the to-be-monitored VNF, and after the first and the second monitoring units are instantiated, the information obtaining method further includes the following step:

The monitoring management entity configures the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the monitoring management entity.

In this case, that the monitoring management entity receives the monitoring data of monitoring the to-be-monitored VNF is specifically as follows: The monitoring management entity receives the monitoring data of monitoring the to-be-monitored VNF, sent by the second monitoring unit.

It should be noted that the VNFM in this embodiment may be an existing VNFM, that is, a VNFM managing a life cycle of the (to-be-monitored) VNF. A new VNFM may be added, where the VNFM is specially used for life cycle management of the monitoring units. In such an implementation, life cycles of the VNF and the monitoring units are managed by different VNFMs, so that responsibilities of all VNFMs in the system are clearly divided, and data transmission of one VNFM does not affect data transmission of another VNFM.

In this specific embodiment, after the monitoring units are instantiated, the communications connections are established between the monitoring units and the monitoring management entity, so that the monitoring management entity performs configuration management on the monitoring units. In a process of establishing the communications connections between the monitoring units and the monitoring management entity, an assisting approach may be used. For example, the NFVO or the VNFM notifies the monitoring units of an IP address or a MAC address of the monitoring management entity (this process is referred to as configuration), so that the monitoring units initiate connections.

Embodiment 8

Corresponding to Embodiment 1, Embodiment 8 of the disclosure provides a network functions virtualization orchestrator NFVO, applied to a Network Functions Virtualization NFV system. The NFV system includes at least one virtualized network function VNF and a management and orchestration system MANO, and the MANO includes at least two virtualized network function managers VNFMs and the network functions virtualization orchestrator NFVO.

The at least two VNFMs include a first VNFM and a second VNFM, the first VNFM is a life cycle management unit of the VNF, the second VNFM is a monitoring management unit of one or more VNFs in the VNF, and the one or more VNFs are referred to as a to-be-monitored VNF.

Figure 17:
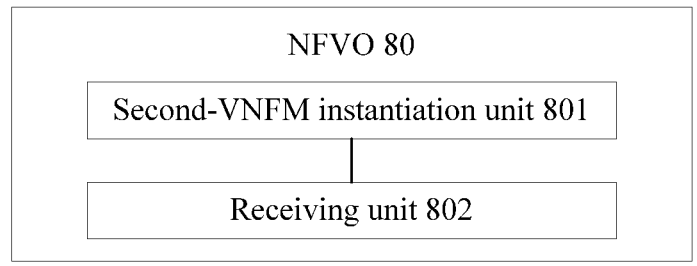
FIG. 17 is a schematic structural diagram of an NFVO according to Embodiment 8 of the disclosure.

As shown in FIG. 17, the NFVO 80 includes:

a second-VNFM instantiation unit 801 and a receiving unit 802.

The second-VNFM instantiation unit 801 is configured to instantiate the second VNFM based on a software package of the second VNFM, so that a communications connection is established between the second VNFM and the NFVO 80.

The receiving unit 802 is configured to receive, during monitoring, monitoring information that is sent by the second VNFM after the second VNFM summarizes and analyzes monitoring data of the to-be-monitored VNF.

According to the NFVO 80 provided in Embodiment 8 of the disclosure, in a new MANO and NS architecture provided in this embodiment of the disclosure, the second VNFM is the monitoring management unit of the one or more VNFs, and the one or more VNFs are referred to as the to-be-monitored VNF. The NFVO includes: the second-VNFM instantiation unit, configured to instantiate the second VNFM based on the software package of the second VNFM, so that the communications connection is established between the second VNFM and the NFVO; and the receiving unit, configured to receive, during monitoring, the monitoring information that is sent by the second VNFM after the second VNFM summarizes and analyzes the monitoring data of the to-be-monitored VNF. The MANO in this embodiment can obtain detailed VNF running information by detecting the to-be-monitored VNF by using the second VNFM, so as to provide more comprehensive and more accurate data for determining a fault cause. This improves quality of network service provisioning.

Optionally, in a specific embodiment of the disclosure, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units.

Figure 18:
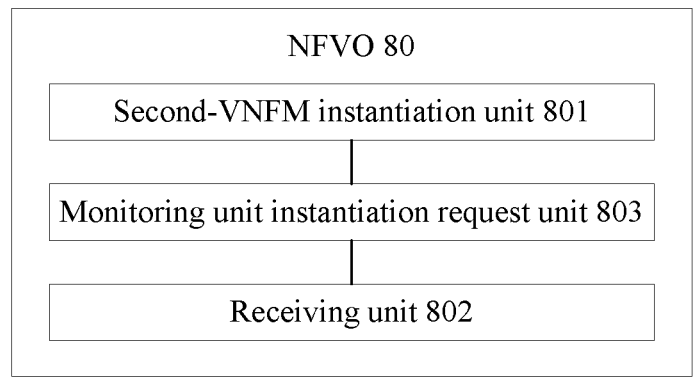
FIG. 18 is another schematic structural diagram of an NFVO according to Embodiment 8 of the disclosure.

In this case, as shown in FIG. 18, the NFVO 80 further includes a monitoring unit instantiation request unit 803.

The monitoring unit instantiation request unit 803 is configured to initiate a monitoring unit instantiation request to the second VNFM, so that the second VNFM instantiates the first and the second monitoring units based on a description file of the first and the second monitoring units, and therefore communications connections are established between the first and the second monitoring units and the second VNFM.

Figure 19:
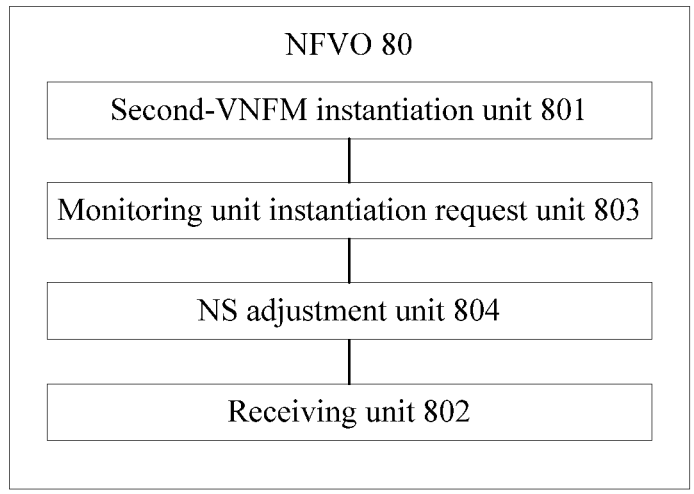
FIG. 19 is another schematic structural diagram of an NFVO according to Embodiment 8 of the disclosure.

Optionally, in a specific embodiment of the disclosure, as shown in FIG. 19, the NFVO 80 further includes an NS adjustment unit 804.

The NS adjustment unit is configured to adjust the NS that includes the to-be-monitored VNF, so that communications connections are established between the first and the second monitoring units and the to-be-monitored VNF.

Optionally, in a specific embodiment of the disclosure, the NFV system is connected to an operations support system OSS, and the receiving unit 802 is further configured to: receive a monitoring request sent by the OSS, where the monitoring request is used to request to monitor the to-be-monitored VNF in the NS; or when a user initiates a monitoring request by using the NFVO, receive the monitoring request sent by the user, where the monitoring request is used to request to monitor the to-be-monitored VNF in the NS.

Optionally, in a specific embodiment of the disclosure, the NS adjustment unit 804 is further configured to:

add the first and the second monitoring units to an original link that includes the to-be-monitored VNF; or create a dedicated test link based on an original link that includes the to-be-monitored VNF, where the test link includes the first and the second monitoring units.

Figure 20:
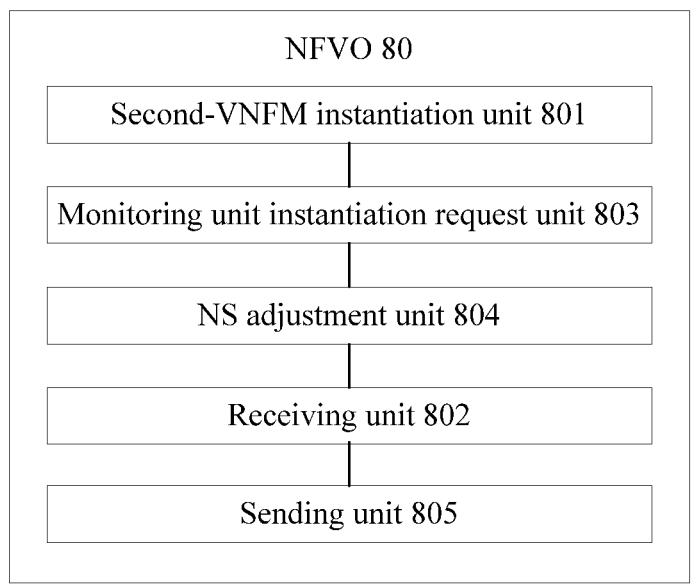
FIG. 20 is another schematic structural diagram of an NFVO according to Embodiment 8 of the disclosure.

Optionally, in a specific embodiment of the disclosure, when the NFV system is connected to the operations support system OSS, as shown in FIG. 20, the NFVO 80 further includes a sending unit 805.

The sending unit 805 is configured to send the received monitoring information to the OSS.

Embodiment 9

Corresponding to Embodiment 2, Embodiment 9 of the disclosure provides a second VNFM, applied to a Network Functions Virtualization NFV system. The NFV includes at least one virtualized network function VNF and a management and orchestration system MANO, and the MANO includes at least two virtualized network function managers VNFMs and a network functions virtualization orchestrator NFVO.

The at least two VNFMs include a first VNFM and the second VNFM, the first VNFM is a life cycle management unit of the VNF, the second VNFM is a monitoring management unit of one or more VNFs in the VNF, and the one or more VNFs are referred to as a to-be-monitored VNF.

Figure 21:
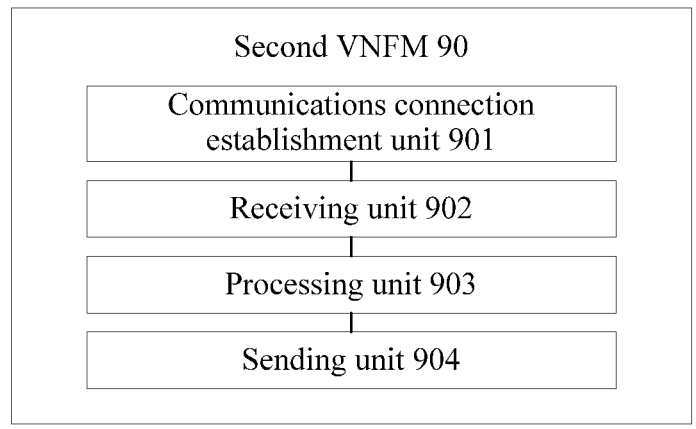
FIG. 21 is a schematic structural diagram of a second VNFM according to Embodiment 9 of the disclosure.

As shown in FIG. 21, the second VNFM 90 includes:

a communications connection establishment unit 901, a receiving unit 902, a processing unit 903, and a sending unit 904.

The communications connection establishment unit 901 is configured to establish a communications connection to the NFVO when the second VNFM is instantiated by the NFVO.

The receiving unit 902 is configured to receive monitoring data of monitoring the to-be-monitored VNF.

The processing unit 903 is configured to summarize and analyze the monitoring data received by the receiving unit 902, to obtain monitoring information of the to-be-monitored VNF.

The sending unit 904 is configured to send, to the NFVO, the monitoring information obtained after summarization and analysis.

According to the second VNFM provided in Embodiment 9 of the disclosure, in a new MANO and NS architecture provided in this embodiment of the disclosure, the second VNFM is the monitoring management unit of the one or more VNFs, and the one or more VNFs are referred to as the to-be-monitored VNF. The second VNFM 90 includes: the communications connection establishment unit, configured to establish the communications connection to the NFVO when the second VNFM is instantiated by the NFVO; the receiving unit, configured to receive the monitoring data of monitoring the to-be-monitored VNF; the processing unit, configured to summarize and analyze the monitoring data received by the receiving unit, to obtain the monitoring information of the to-be-monitored VNF; and the sending unit, configured to send, to the NFVO, the monitoring information obtained after summarization and analysis. The MANO in this embodiment can obtain detailed VNF running information by detecting the to-be-monitored VNF by using the second VNFM, so as to provide more comprehensive and more accurate data for determining a fault cause. This improves quality of network service provisioning.

Figure 22:
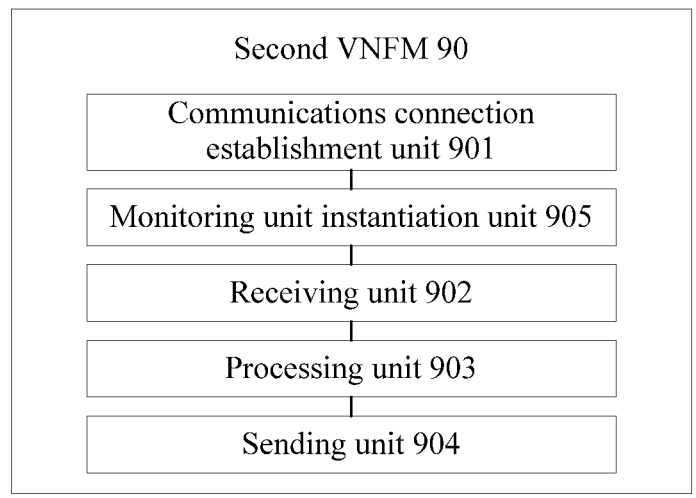
FIG. 22 is another schematic structural diagram of a second VNFM according to Embodiment 9 of the disclosure.

Optionally, in a specific embodiment of the disclosure, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units. As shown in FIG. 22, the second VNFM 90 further includes a monitoring unit instantiation unit 903.

The monitoring unit instantiation unit 903 is configured to instantiate the first and the second monitoring units based on a description file of the first and the second monitoring units, so that communications connections are established between the first and the second monitoring units and the second VNFM 90.

Figure 23:
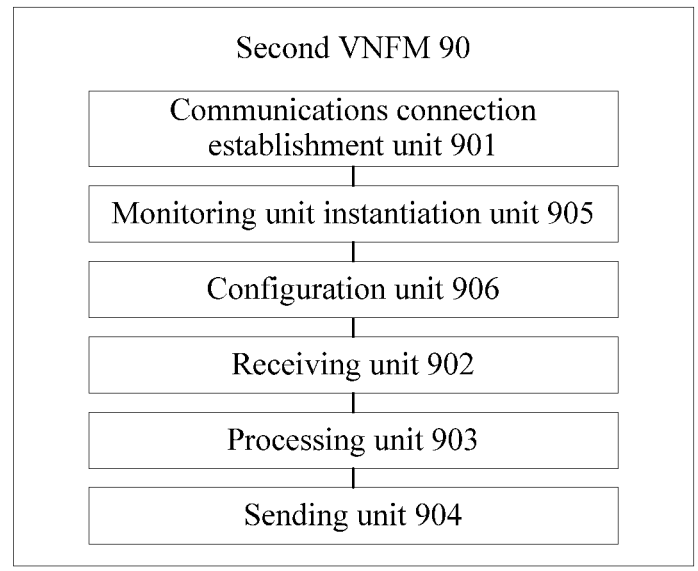
FIG. 23 is another schematic structural diagram of a second VNFM according to Embodiment 9 of the disclosure.

Optionally, in a specific embodiment of the disclosure, as shown in FIG. 23, the second VNFM 90 further includes a configuration unit 905.

The configuration unit 905 is specifically configured to:

configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNFM.

In this case, the receiving unit 902 is specifically configured to receive the monitoring data of monitoring the to-be-monitored VNF, sent by the second monitoring unit.

Embodiment 10

Corresponding to Embodiment 3, Embodiment 10 of the disclosure provides an NFVO, applied to a Network Functions Virtualization NFV system. The NFV system includes a virtualized network function VNF and a management and orchestration system MANO, the MANO includes a virtualized network function manager VNFM and the network functions virtualization orchestrator NFVO, and a communications connection is established between the VNFM and the NFVO.

When there are at least two VNFs, the at least two VNFs include a first VNF and a second VNF. The second VNF is a monitoring management unit of the first VNF, the first VNF is referred to as a to-be-monitored VNF, and the VNFM is a life cycle management unit of the second VNF and the to-be-monitored VNF.

Figure 24:
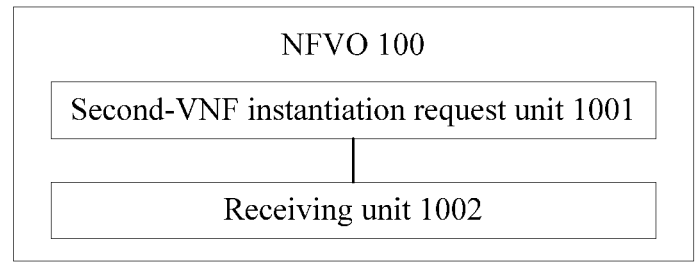
FIG. 24 is a schematic structural diagram of an NFVO according to Embodiment 10 of the disclosure.

As shown in FIG. 24, the NFVO 100 includes:

a second-VNF instantiation request unit 1001 and a receiving unit 1002.

The second-VNF instantiation request unit 1001 is configured to initiate, to the VNFM, a request for instantiating the second VNF, so that the VNFM instantiates the second VNF based on a description file of the second VNF, and therefore a communications connection is established between the second VNF and the VNFM.

The receiving unit 1002 is configured to receive, during monitoring, monitoring information that is sent by the second VNF after the second VNF summarizes and analyzes monitoring data.

The NFVO provided in Embodiment 10 of the disclosure is applied to the Network Functions Virtualization NFV system. In a new MANO and NS architecture provided in this embodiment of the disclosure, the second VNF is the monitoring management unit of the first VNF, the first VNF is referred to as the to-be-monitored VNF, and the VNFM is the life cycle management unit of the second VNF and the to-be-monitored VNF. In this case, the NFVO includes: the monitoring unit instantiation request unit, configured to initiate, to the VNFM, the request for instantiating the second VNF; and the receiving unit, configured to receive, during monitoring, the monitoring information that is sent by the second VNF after the second VNF summarizes and analyzes the monitoring data. The NFVO in this embodiment instantiates the second VNF, and receives the information about monitoring performed by the second VNF on the to-be-monitored VNF. The monitoring information provides more comprehensive and more accurate data for determining a fault cause. This improves quality of network service provisioning.

Optionally, in a specific embodiment of the disclosure, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units.

Figure 25:
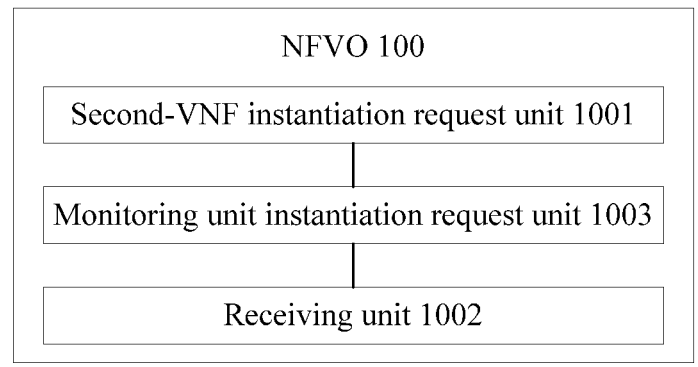
FIG. 25 is another schematic structural diagram of an NFVO according to Embodiment 10 of the disclosure.

Optionally, in a specific embodiment of the disclosure, as shown in FIG. 25, the NFVO 100 further includes a monitoring unit instantiation request unit 1003.

The monitoring unit instantiation request unit 1003 is configured to initiate a monitoring unit instantiation request to the VNFM, so that the VNFM instantiates the first and the second monitoring units based on a description file of the first and the second monitoring units, and therefore communications connections are established between the first and the second monitoring units and the VNFM.

Optionally, in a specific embodiment of the disclosure, the NFVO 100 further includes an NS adjustment unit 1004.

The NS adjustment unit 1004 is configured to adjust the NS that includes the to-be-monitored VNF, so that communications connections are established between the first and the second monitoring units and the to-be-monitored VNF, and communications connections are established between the first and the second monitoring units and the second VNF.

Optionally, in a specific embodiment of the disclosure, the NS adjustment unit 1004 is specifically configured to:

add the first and the second monitoring units to an original link that includes the to-be-monitored VNF; or create a dedicated test link based on an original link that includes the to-be-monitored VNF, where the test link includes the first and the second monitoring units.

Optionally, in a specific embodiment of the disclosure, the NFV system is connected to an operations support system OSS. In this case, the NFVO 100 further includes a sending unit 1005.

The sending unit 1005 is configured to send the monitoring information received by the receiving unit 1002 to the OSS.

Embodiment 11

Corresponding to Embodiment 4, Embodiment 11 of the disclosure provides a second VNF, applied to a Network Functions Virtualization NFV system. The NFV system includes a virtualized network function VNF and a management and orchestration system MANO, the MANO includes a virtualized network function manager VNFM and a network functions virtualization orchestrator NFVO, and a communications connection is established between the VNFM and the NFVO.

When there are at least two VNFs, the at least two VNFs include a first VNF and the second VNF. The second VNF is a monitoring management unit of the first VNF, the first VNF is referred to as a to-be-monitored VNF, and the VNFM is a life cycle management unit of the second VNF and the to-be-monitored VNF.

Figure 26:
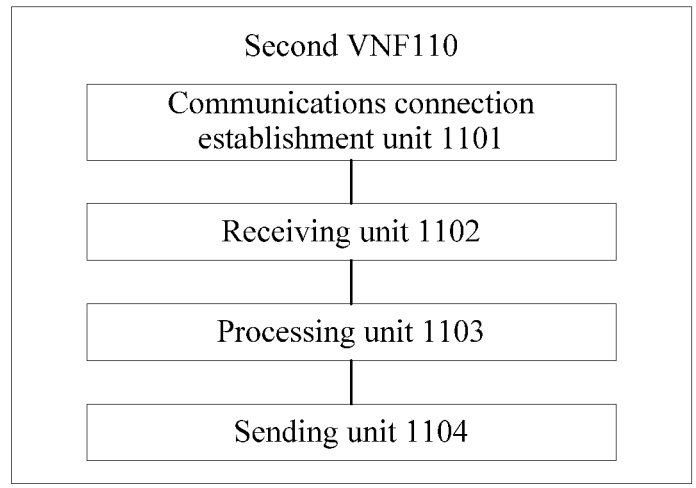
FIG. 26 is a schematic structural diagram of a second VNF according to Embodiment 11 of the disclosure.

As shown in FIG. 26, the second VNF 110 includes:

a communications connection establishment unit 1101, a receiving unit 1102, a processing unit 1103, and a sending unit 1104.

The communications connection establishment unit 1101 is configured to establish a communications connection to the VNFM when the second VNF is instantiated by the VNFM.

The receiving unit 1102 is configured to receive monitoring data of monitoring the to-be-monitored VNF.

The processing unit 1103 is configured to summarize and analyze the monitoring data received by the receiving unit 1102, to obtain monitoring information of the to-be-monitored VNF.

The sending unit 1104 is configured to send, to the NFVO, the monitoring information obtained after summarization and analysis.

According to the second VNF provided in Embodiment 11 of the disclosure, in a new MANO and NS architecture provided in this embodiment of the disclosure, the second VNF is the monitoring management unit of the first VNF, the first VNF is referred to as the to-be-monitored VNF, and the VNFM is the life cycle management unit of the second VNF and the to-be-monitored VNF. The second VNF includes: the communications connection establishment unit, configured to establish the communications connection to the VNFM when the second VNF is instantiated by the VNFM; the receiving unit, configured to receive the monitoring data of monitoring the to-be-monitored VNF; the processing unit, configured to summarize and analyze the monitoring data received by the receiving unit 1102, to obtain the monitoring information of the to-be-monitored VNF; and the sending unit, configured to send, to the NFVO, the monitoring information obtained after summarization and analysis. It can be learned that, in this embodiment of the disclosure, detailed VNF running information is obtained by proactively monitoring the to-be-monitored VNF by using the VNF. In this way, more comprehensive and more accurate data can be provided for determining a fault cause. This improves quality of network service provisioning.

Optionally, in a specific embodiment of the disclosure, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units.

The second VNF 110 further includes a configuration unit 1105.

The configuration unit 1105 is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNF.

In this case, the receiving unit 1102 is specifically configured to receive the monitoring data of monitoring the to-be-monitored VNF, sent by the second monitoring unit.

Embodiment 12

Corresponding to Embodiment 5, Embodiment 12 of the disclosure provides an NFVO, applied to a Network Functions Virtualization NFV system. The NFV includes at least one virtualized network function VNF and a management and orchestration system MANO, and the MANO includes a virtualized network function manager VNFM and the network functions virtualization orchestrator NFVO.

The NFVO is a monitoring management unit of one or more VNFs in the VNF, the one or more VNFs are referred to as a to-be-monitored VNF, and the VNFM is a life cycle management unit of the to-be-monitored VNF.

Figure 27:
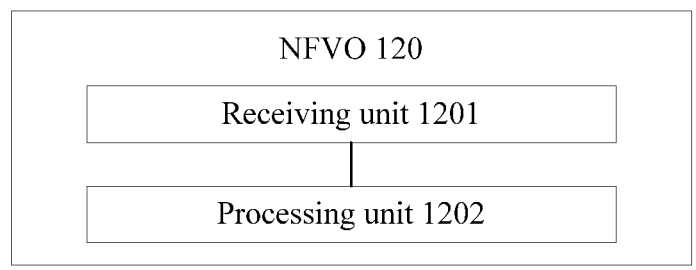
FIG. 27 is a schematic structural diagram of an NFVO according to Embodiment 12 of the disclosure.

As shown in FIG. 27, the NFVO 120 includes:
a receiving unit 1201 and a processing unit 1202.

The receiving unit 1201 is configured to receive monitoring data of monitoring the to-be-monitored VNF.

The processing unit 1202 is configured to summarize and analyze the monitoring data received by the receiving unit 1201, to obtain monitoring information of the to-be-monitored VNF.

According to the NFVO provided in Embodiment 12 of the disclosure, in a new MANO and NS architecture provided in this embodiment of the disclosure, the NFV system includes the at least one VNF and the MANO, the MANO includes the VNFM and the NFVO, and the communications connection is established between the VNFM and the NFVO. The NFVO is the monitoring management unit of the one or more VNFs, and the one or more VNFs are referred to as the to-be-monitored VNF. The NFVO includes: the receiving unit, configured to receive the monitoring data of monitoring the to-be-monitored VNF; and the processing unit, configured to summarize and analyze the monitoring data received by the receiving unit, to obtain the monitoring information of the to-be-monitored VNF. The MANO in this embodiment can obtain detailed VNF running information by detecting the to-be-monitored VNF by using the NFVO, so as to provide more comprehensive and more accurate data for determining a fault cause. This improves quality of network service provisioning. In addition, such an NFVO reusing manner avoids deployment of a dedicated test management unit. Therefore, management is relatively simplified.

Optionally, in a specific embodiment of the disclosure, the to-be-monitored VNF is located in a network service NS, a first monitoring unit and a second monitoring unit for monitoring the to-be-monitored VNF are configured in the NS, and the VNFM is further a life cycle management unit of the first and the second monitoring units.

The NFVO 120 further includes a monitoring unit instantiation request unit 1203.

The monitoring unit instantiation request unit 1203 is configured to initiate a monitoring unit instantiation request to the VNFM, so that the VNFM instantiates the first and the second monitoring units based on a description file of the first and the second monitoring units, and therefore, communications connections are established between the NFVO and the first and the second monitoring units, or connections are established between the NFVO and the first and the second monitoring units by using the VNFM.

Optionally, in a specific embodiment of the disclosure, the NFVO 120 further includes an NS adjustment unit 1204.

The NS adjustment unit 1204 is configured to adjust the NS that includes the to-be-monitored VNF, so that communications connections are established between the first and the second monitoring units and the to-be-monitored VNF.

Optionally, in a specific embodiment of the disclosure, the NFVO 120 further includes a configuration unit 1205.

The configuration unit 1205 is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO.

In this case, the receiving unit 1201 is specifically configured to receive the monitoring data of monitoring the to-be-monitored VNF, sent by the second monitoring unit.

Optionally, in a specific embodiment of the disclosure, the NFVO 120 further includes a configuration unit 1205.

The configuration unit 1205 is configured to configure the first and the second monitoring units by using the VNFM, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO by using the VNFM.

In this case, the receiving unit 1201 is specifically configured to receive, by using the VNFM, the monitoring data of monitoring the to-be-monitored VNF, sent by the second monitoring unit.

Optionally, in a specific embodiment of the disclosure, the NS adjustment unit 1204 is further configured to:

add the first and the second monitoring units to an original link that includes the to-be-monitored VNF; or create a dedicated test link based on an original link that includes the to-be-monitored VNF, where the test link includes the first and the second monitoring units.

Optionally, in a specific embodiment of the disclosure, the NFV system is connected to an operations support system OSS, and the NFVO 120 further includes a sending unit 1206.

The sending unit 1206 is configured to send the received monitoring information to the OSS.

Embodiment 13

Corresponding to Embodiment 6, Embodiment 13 of the disclosure provides an NFVO, applied to a Network Functions Virtualization NFV system. The NFV system includes at least one virtualized network function VNF, a management and orchestration system MANO, and a monitoring management entity, the MANO includes a virtualized network function manager VNFM and the network functions virtualization orchestrator NFVO, the monitoring management entity is a monitoring management unit of one or more VNFs in the VNF, the one or more VNFs are referred to as a to-be-monitored VNF, and the VNFM is a life cycle management unit of the to-be-monitored VNF.

The NFVO 130 includes a receiving unit 1301.

The receiving unit 1301 is configured to receive, during monitoring, information about monitoring performed by the monitoring management entity on the to-be-monitored VNF.

According to the NFVO provided in Embodiment 13 of the disclosure, in the new NFV system provided in this embodiment of the disclosure, the NFV system includes the at least one VNF, the MANO, and the monitoring management entity, the MANO includes the VNFM and the NFVO, the monitoring management entity is the monitoring management unit of the one or more VNFs in the VNF, and the one or more VNFs are referred to as the to-be-monitored VNF. The NFVO 130 includes the receiving unit. The receiving unit receives, during monitoring, the information about monitoring performed by the monitoring management entity on the to-be-monitored VNF. The MANO in this embodiment can obtain detailed VNF running information by using the monitoring management entity, so as to provide more comprehensive and more accurate data for determining a fault cause. This improves quality of network service provisioning.

Optionally, in a specific embodiment of the disclosure, the to-be-monitored VNF is located in a network service NS, a first monitoring unit and a second monitoring unit for monitoring the to-be-monitored VNF are configured in the NS, and the VNFM is further a life cycle management unit of the first and the second monitoring units.

Figure 28:
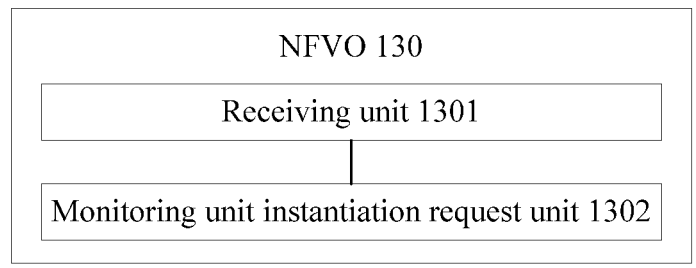
FIG. 28 is a schematic structural diagram of an NFVO according to Embodiment 13 of the disclosure.

As shown in FIG. 28, the NFVO 130 further includes a monitoring unit instantiation request unit 1302.

The receiving unit 1301 is configured to receive a monitoring unit software package uploaded by the monitoring management entity, where the software package includes a description file of the first and the second monitoring units.

The monitoring unit instantiation request unit 1302 is configured to initiate a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

Optionally, in a specific embodiment of the disclosure, the NFVO 130 further includes an NS adjustment unit 1303.

The NS adjustment unit 1303 is configured to adjust the NS that includes the to-be-monitored VNF, so that communications connections are established between the first and the second monitoring units and the to-be-monitored VNF.

Optionally, in a specific embodiment of the disclosure, the NS adjustment unit 1303 is further configured to:

add the first and the second monitoring units to an original link that includes the to-be-monitored VNF; or create a dedicated test link based on an original link that includes the to-be-monitored VNF, where the test link includes the first and the second monitoring units.

Optionally, in a specific embodiment of the disclosure, the NFV system is connected to an operations support system OSS, and the NFVO 130 further includes a sending unit 1304.

The sending unit 1304 is configured to send the received monitoring information to the OSS.

Embodiment 14

Corresponding to Embodiment 7, Embodiment 14 of the disclosure provides a monitoring management entity, applied to a Network Functions Virtualization NFV system. The NFV system includes at least one virtualized network function VNF, a management and orchestration system MANO, and the monitoring management entity, and the MANO includes a virtualized network function manager VNFM and a network functions virtualization orchestrator NFVO.

A communications connection is established between the monitoring management entity and the MANO by using a corresponding interface. The monitoring management entity is a monitoring management unit of one or more VNFs in the VNF, and the one or more VNFs are referred to as a to-be-monitored VNF. The VNFM is a life cycle management unit of the to-be-monitored VNF.

Figure 29:
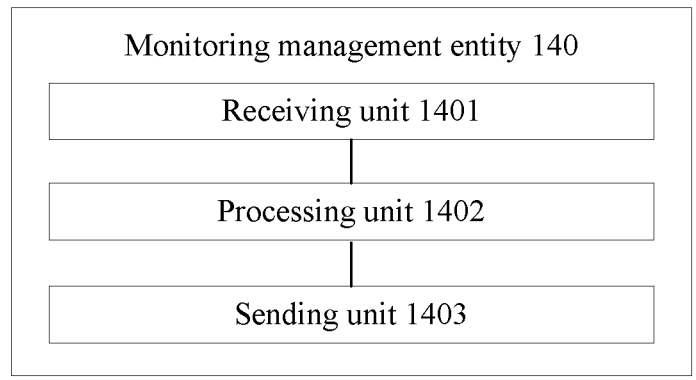
FIG. 29 is a schematic structural diagram of a monitoring management entity according to Embodiment 14 of the disclosure.

As shown in FIG. 29, the monitoring management entity 140 includes:

a receiving unit 1401, a processing unit 1402, and a sending unit 1403.

The receiving unit 1401 is configured to receive, during monitoring, monitoring data of monitoring the to-be-monitored VNF.

The processing unit 1402 is configured to summarize and analyze the monitoring data received by the receiving unit 1401, to obtain monitoring information of the to-be-monitored VNF.

The sending unit 1403 is configured to send the monitoring information to the NFVO.

According to the monitoring management entity provided in Embodiment 14 of the disclosure, in the new NFV system provided in this embodiment of the disclosure, the NFV system includes the at least one VNF, the MANO, and the monitoring management entity, the MANO includes the VNFM and the NFVO, the monitoring management entity is the monitoring management unit of the one or more VNFs in the VNF, and the one or more VNFs are referred to as the to-be-monitored VNF. The monitoring management entity includes: the receiving unit, configured to receive, during monitoring, the monitoring data of monitoring the to-be-monitored VNF; the processing unit, configured to summarize and analyze the monitoring data received by the receiving unit, to obtain the monitoring information of the to-be-monitored VNF; and the sending unit, configured to send the monitoring information to the NFVO. The MANO in this embodiment can obtain detailed VNF running information by using the monitoring management entity, so as to provide more comprehensive and more accurate data for determining a fault cause. This improves quality of network service provisioning.

Optionally, in a specific embodiment of the disclosure, the to-be-monitored VNF is located in a network service NS, a first monitoring unit and a second monitoring unit for monitoring the to-be-monitored VNF are configured in the NS, and the VNFM is further a life cycle management unit of the first and the second monitoring units.

The monitoring management entity 140 further includes an upload unit 1404.

The upload unit 1404 is configured to upload a monitoring unit software package, where the software package includes a description file of the first and the second monitoring units. In this case, the NFVO initiates a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

Optionally, in a specific embodiment of the disclosure, the monitoring management entity 140 further includes a configuration unit 1405.

The configuration unit 1405 is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the monitoring management entity.

In this case, the receiving unit 1401 is specifically configured to receive the monitoring data of monitoring the to-be-monitored VNF, sent by the second monitoring unit.

Embodiment 15

Corresponding to Embodiment 1, Embodiment 15 of the disclosure provides a network functions virtualization orchestrator NFVO, applied to a Network Functions Virtualization NFV system. The NFV system includes at least one virtualized network function VNF and a management and orchestration system MANO, and the MANO includes at least two virtualized network function managers VNFMs and the network functions virtualization orchestrator NFVO.

The at least two VNFMs include a first VNFM and a second VNFM, the first VNFM is a life cycle management unit of the VNF, the second VNFM is a monitoring management unit of one or more VNFs in the VNF, and the one or more VNFs are referred to as a to-be-monitored VNF.

Figure 30:
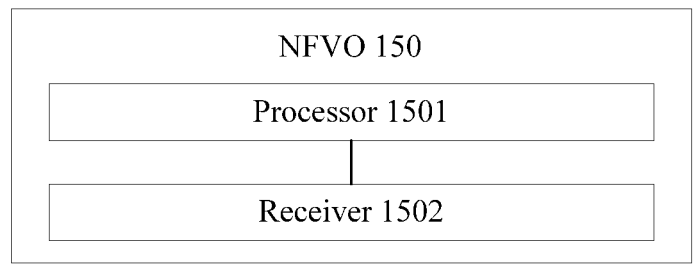
FIG. 30 is a schematic structural diagram of an NFVO according to Embodiment 15 of the disclosure.

As shown in FIG. 30, the NFVO 150 includes:
a processor 1501 and a receiver 1502.

The processor 1501 is configured to instantiate the second VNFM based on a software package of the second VNFM, so that a communications connection is established between the second VNFM and the NFVO.

The receiver 1502 is configured to receive, during monitoring, monitoring information that is sent by the second VNFM after the second VNFM summarizes and analyzes monitoring data of the to-be-monitored VNF.

According to the NFVO 150 provided in Embodiment 15 of the disclosure, in a new MANO and NS architecture provided in this embodiment of the disclosure, the second VNFM is the monitoring management unit of the one or more VNFs, and the one or more VNFs are referred to as the to-be-monitored VNF. The NFVO includes: the processor, configured to instantiate the second VNFM based on the software package of the second VNFM, so that the communications connection is established between the second VNFM and the NFVO; and the receiver, configured to receive, during monitoring, the monitoring information that is sent by the second VNFM after the second VNFM summarizes and analyzes the monitoring data. The MANO in this embodiment can obtain detailed VNF running information by detecting the to-be-monitored VNF by using the second VNFM, so as to provide more comprehensive and more accurate data for determining a fault cause. This improves quality of network service provisioning.

Optionally, in a specific embodiment of the disclosure, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units.

The processor 1501 is further configured to:
initiate a monitoring unit instantiation request to the second VNFM, so that the second VNFM instantiates the first and the second monitoring units based on a description file of the first and the second monitoring units, and therefore communications connections are established between the first and the second monitoring units and the second VNFM.

Optionally, in a specific embodiment of the disclosure, the processor 1501 is further configured to:
adjust the NS that includes the to-be-monitored VNF, so that communications connections are established between the first and the second monitoring units and the to-be-monitored VNF.

Optionally, in a specific embodiment of the disclosure, the NFV system is connected to an operations support system OSS, and the receiver 1502 is further configured to:
receive a monitoring request sent by the OSS, where the monitoring request is used to request to monitor the to-be-monitored VNF in the NS; or
when a user initiates a monitoring request by using the NFVO, receive the monitoring request sent by the user, where the monitoring request is used to request to monitor the to-be-monitored VNF in the NS.

Optionally, in a specific embodiment of the disclosure, the processor 1501 is further configured to:
add the first and the second monitoring units to an original link that includes the to-be-monitored VNF; or
create a dedicated test link based on an original link that includes the to-be-monitored VNF, where the test link includes the first and the second monitoring units.

Optionally, in a specific embodiment of the disclosure, when the NFV system is connected to an operations support system OSS, the NFVO 150 further includes a transmitter 1503.

The transmitter 1503 is configured to send the monitoring information received by the receiver 1502 to the OSS.

Embodiment 16

Corresponding to Embodiment 2, Embodiment 16 of the disclosure provides a second VNFM, applied to a Network Functions Virtualization NFV system. The NFV includes at least one virtualized network function VNF and a management and orchestration system MANO, and the MANO includes at least two virtualized network function managers VNFMs and a network functions virtualization orchestrator NFVO.

The at least two VNFMs include a first VNFM and the second VNFM, the first VNFM is a life cycle management unit of the VNF, the second VNFM is a monitoring management unit of one or more VNFs in the VNF, and the one or more VNFs are referred to as a to-be-monitored VNF.

Figure 31:
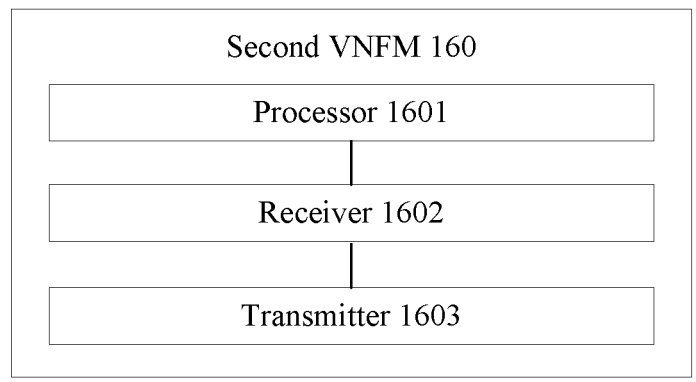
FIG. 31 is a schematic structural diagram of a second VNFM according to Embodiment 16 of the disclosure.

As shown in FIG. 31, the second VNFM 160 includes:

a processor 1601, a receiver 1602, and a transmitter 1603.

The processor 1601 is configured to establish a communications connection to the NFVO when the second VNFM is instantiated by the NFVO.

The receiver 1602 is configured to receive monitoring data of monitoring the to-be-monitored VNF.

The processor 1601 is further configured to summarize and analyze the monitoring data received by the receiver 1602, to obtain monitoring information of the to-be-monitored VNF.

The transmitter 1603 is configured to send, to the NFVO, the monitoring information obtained after summarization and analysis.

According to the second VNFM provided in Embodiment 16 of the disclosure, in a new MANO and NS architecture provided in this embodiment of the disclosure, the second VNFM is the monitoring management unit of the one or more VNFs, and the one or more VNFs are referred to as the to-be-monitored VNF. The second VNFM 160 includes: the processor, configured to establish the communications connection to the NFVO when the second VNFM is instantiated by the NFVO; the receiver, configured to receive the monitoring data of monitoring the to-be-monitored VNF, where the processor is further configured to summarize and analyze the monitoring data received by the receiver, to obtain the monitoring information of the to-be-monitored VNF; and the transmitter, configured to send, to the NFVO, the monitoring information obtained after summarization and analysis. The MANO in this embodiment can obtain detailed VNF running information by detecting the to-be-monitored VNF by using the second VNFM, so as to provide more comprehensive and more accurate data for determining a fault cause. This improves quality of network service provisioning.

Optionally, in a specific embodiment of the disclosure, the to-be-monitored VNF is located in a network service NS, a first monitoring unit and a second monitoring unit for monitoring the to-be-monitored VNF are configured in the NS, and the second VNFM is further a life cycle management unit of the first and the second monitoring units.

The processor 1601 is configured to instantiate the first and the second monitoring units based on a description file of the first and the second monitoring units, so that communications connections are established between the first and the second monitoring units and the second VNFM.

Optionally, in a specific embodiment of the disclosure, the processor 1601 is further configured to:

configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNFM.

The receiver 1602 is specifically configured to receive the monitoring data of monitoring the to-be-monitored VNF, sent by the second monitoring unit.

Embodiment 17

Corresponding to Embodiment 3, Embodiment 17 of the disclosure provides an NFVO, applied to a Network Functions Virtualization NFV system. The NFV system includes a virtualized network function VNF and a management and orchestration system MANO, the MANO includes a virtualized network function manager VNFM and the network functions virtualization orchestrator NFVO, and a communications connection is established between the VNFM and the NFVO.

When there are at least two VNFs, the at least two VNFs include a first VNF and a second VNF, the second VNF is a monitoring management unit of the first VNF, the first VNF is referred to as a to-be-monitored VNF, and the VNFM is a life cycle management unit of the second VNF and the to-be-monitored VNF.

Figure 32:
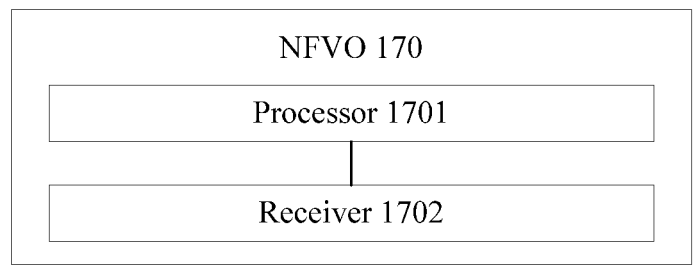
FIG. 32 is a schematic structural diagram of an NFVO according to Embodiment 17 of the disclosure.

As shown in FIG. 32, the NFVO 170 includes:

a processor 1701 and a receiver 1702.

The processor 1701 is configured to initiate, to the VNFM, a request for instantiating the second VNF, so that the VNFM instantiates the second VNF based on a description file of the second VNF, and therefore a communications connection is established between the second VNF and the VNFM.

The receiver 1702 is configured to receive, during monitoring, monitoring information that is sent by the second VNF after the second VNF summarizes and analyzes monitoring data.

The NFVO provided in Embodiment 17 of the disclosure is applied to the Network Functions Virtualization NFV system. In a new MANO and NS architecture provided in this embodiment of the disclosure, the second VNF is the monitoring management unit of the first VNF, the first VNF is referred to as the to-be-monitored VNF, and the VNFM is the life cycle management unit of the second VNF and the to-be-monitored VNF. In this case, the NFVO includes: the processor, configured to initiate, to the VNFM, the request for instantiating the second VNF; and the receiver, configured to receive, during monitoring, the monitoring information that is sent by the second VNF after the second VNF summarizes and analyzes the monitoring data. The NFVO in this embodiment instantiates the second VNF, and receives the information about monitoring performed by the second VNF on the to-be-monitored VNF. The monitoring information provides more comprehensive and more accurate data for determining a fault cause. This improves quality of network service provisioning.

Optionally, in a specific embodiment of the disclosure, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units.

The processor 1701 is further configured to:

initiate a monitoring unit instantiation request to the VNFM, so that the VNFM instantiates the first and the second monitoring units based on a description file of the first and the second monitoring units, and therefore communications connections are established between the first and the second monitoring units and the VNFM.

Optionally, in a specific embodiment of the disclosure, the processor 1701 is further configured to:

adjust the NS that includes the to-be-monitored VNF, so that communications connections are established between the first and the second monitoring units and the to-bemonitored VNF, and communications connections are established between the first and the second monitoring units and the second VNF.

Optionally, in a specific embodiment of the disclosure, the processor 1701 is specifically configured to:

add the first and the second monitoring units to an original link that includes the to-be-monitored VNF; or create a dedicated test link based on an original link that includes the to-be-monitored VNF, where the test link includes the first and the second monitoring units.

Optionally, in a specific embodiment of the disclosure, when the NFV system is connected to an operations support system OSS, the NFVO further includes a transmitter 1703.

The transmitter 1703 is configured to send the monitoring information received by the receiver 1702 to the OSS.

Embodiment 18

Corresponding to Embodiment 4, Embodiment 18 of the disclosure provides a second VNF, applied to a Network Functions Virtualization NFV system. The NFV system includes a virtualized network function VNF and a management and orchestration system MANO, the MANO includes a virtualized network function manager VNFM and a network functions virtualization orchestrator NFVO, and a communications connection is established between the VNFM and the NFVO.

When there are at least two VNFs, the at least two VNFs include a first VNF and the second VNF. The second VNF is a monitoring management unit of the first VNF, the first VNF is referred to as a to-be-monitored VNF, and the VNFM is a life cycle management unit of the second VNF and the to-be-monitored VNF.

Figure 33:
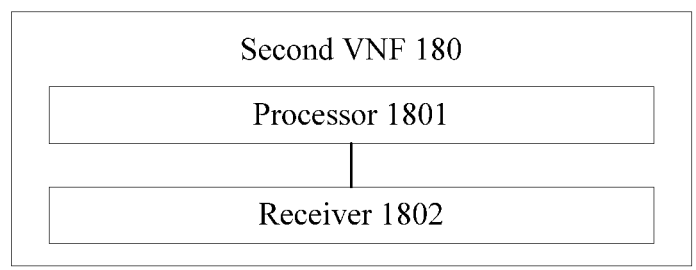
FIG. 33 is a schematic structural diagram of a second VNF according to Embodiment 18 of the disclosure.

As shown in FIG. 33, the second VNF 180 includes:
a processor 1801 and a receiver 1802.

The processor 1801 is configured to establish a communications connection to the VNFM when the second VNF is instantiated by the VNFM.

The receiver 1802 is configured to receive monitoring data of monitoring the to-be-monitored VNF.

The processor 1801 is further configured to summarize and analyze the monitoring data received by the receiver 1802, to obtain monitoring information of the to-be-monitored VNF.

The receiver 1802 is further configured to send, to the NFVO, the monitoring information obtained after summarization and analysis.

According to the second VNF provided in Embodiment 18 of the disclosure, in a new MANO and NS architecture provided in this embodiment of the disclosure, the second VNF is the monitoring management unit of the first VNF, the first VNF is referred to as the to-be-monitored VNF, and the VNFM is the life cycle management unit of the second VNF and the to-be-monitored VNF. The second VNF includes: the processor, configured to establish the communications connection to the VNFM when the second VNF is instantiated by the VNFM; and the receiver, configured to receive the monitoring data of monitoring the to-be-monitored VNF. The processor is further configured to summarize and analyze the monitoring data received by the receiver, to obtain the monitoring information of the to-be-monitored VNF. The receiver is further configured to send, to the NFVO, the monitoring information obtained after summarization and analysis. It can be learned that, in this embodiment of the disclosure, detailed VNF running information is obtained by proactively monitoring the to-be-monitored VNF by using the VNF. In this way, more comprehensive and more accurate data can be provided for determining a fault cause. This improves quality of network service provisioning.

Optionally, in a specific embodiment of the disclosure, the to-be-monitored VNF and the second VNF are located in a network service NS, a first monitoring unit and a second monitoring unit for monitoring the to-be-monitored VNF are configured in the NS, and the VNFM is further a life cycle management unit of the first and the second monitoring units.

The second VNF 180 further includes a processor 1801.

The processor 1801 is configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the second VNF.

The receiver 1802 is specifically configured to receive the monitoring data of monitoring the to-be-monitored VNF, sent by the second monitoring unit.

Embodiment 19

Corresponding to Embodiment 5, Embodiment 19 of the disclosure provides an NFVO, applied to a Network Functions Virtualization NFV system. The NFV includes at least one virtualized network function VNF and a management and orchestration system MANO, and the MANO includes a virtualized network function manager VNFM and the network functions virtualization orchestrator NFVO.

The NFVO is a monitoring management unit of one or more VNFs in the VNF, the one or more VNFs are referred to as a to-be-monitored VNF, and the VNFM is a life cycle management unit of the to-be-monitored VNF.

Figure 34:
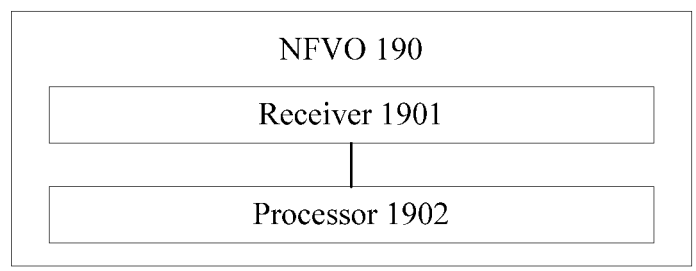
FIG. 34 is a schematic structural diagram of an NFVO according to Embodiment 19 of the disclosure.

As shown in FIG. 34, the NFVO 190 includes:
a receiver 1901 and a processor 1902.

The receiver 1901 is configured to receive monitoring data of monitoring the to-be-monitored VNF.

The processor 1902 is configured to summarize and analyze the monitoring data received by the receiver 1901, to obtain monitoring information of the to-be-monitored VNF.

According to the NFVO provided in Embodiment 19 of the disclosure, in a new MANO and NS architecture provided in this embodiment of the disclosure, the NFV system includes the at least one VNF and the MANO, the MANO includes the VNFM and the NFVO, and a communications connection is established between the VNFM and the NFVO. The NFVO is the monitoring management unit of the one or more VNFs, and the one or more VNFs are referred to as the to-be-monitored VNF. The NFVO includes: the receiver, configured to receive the monitoring data of monitoring the to-be-monitored VNF; and the processor, configured to summarize and analyze the monitoring data received by the receiver, to obtain the monitoring information of the to-be-monitored VNF. The MANO in this embodiment can obtain detailed VNF running information by detecting the to-be-monitored VNF by using the NFVO, so as to provide more comprehensive and more accurate data for determining a fault cause. This improves quality of network service provisioning. In addition, such an NFVO reusing manner avoids deployment of a dedicated test management unit. Therefore, management is relatively simplified.

Optionally, in a specific embodiment of the disclosure, the to-be-monitored VNF is located in a network service NS, a first monitoring unit and a second monitoring unit for monitoring the to-be-monitored VNF are configured in the NS, and the VNFM is further a life cycle management unit of the first and the second monitoring units.

The processor 1902 is further configured to initiate a monitoring unit instantiation request to the VNFM, so that the VNFM instantiates the first and the second monitoring units based on a description file of the first and the second monitoring units, and therefore, communications connections are established between the NFVO and the first and the second monitoring units, or communications connections are established between the NFVO and the first and the second monitoring units by using the VNFM.

Optionally, in a specific embodiment of the disclosure, the processor 1902 is further configured to:

adjust the NS that includes the to-be-monitored VNF, so that communications connections are established between the first and the second monitoring units and the to-be-monitored VNF.

Optionally, in a specific embodiment of the disclosure, the processor 1902 is further configured to:

configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO.

In this case, the receiver 1901 is specifically configured to receive the monitoring data of monitoring the to-be-monitored VNF, sent by the second monitoring unit.

Optionally, in a specific embodiment of the disclosure, the processor 1902 is further configured to:

configure the first and the second monitoring units by using the VNFM, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the NFVO by using the VNFM.

In this case, the receiver 1901 is specifically configured to receive, by using the VNFM, the monitoring data of monitoring the to-be-monitored VNF, sent by the second monitoring unit.

Optionally, in a specific embodiment of the disclosure, the processor 1902 is further configured to:

add the first and the second monitoring units to an original link that includes the to-be-monitored VNF; or create a dedicated test link based on an original link that includes the to-be-monitored VNF, where the test link includes the first and the second monitoring units.

Optionally, in a specific embodiment of the disclosure, the NFV system is connected to an operations support system OSS, and the NFVO 190 further includes a transmitter 1903.

The transmitter 1903 sends the monitoring information received by the receiver 1901 to the OSS.

Embodiment 20

Corresponding to Embodiment 6, Embodiment 20 of the disclosure provides an NFVO, applied to a Network Functions Virtualization NFV system. The NFV system includes at least one virtualized network function VNF, a management and orchestration system MANO, and a monitoring management entity, the MANO includes a virtualized network function manager VNFM and the network functions virtualization orchestrator NFVO, the monitoring management entity is a monitoring management unit of one or more VNFs in the VNF, the one or more VNFs are referred to as a to-be-monitored VNF, and the VNFM is a life cycle management unit of the to-be-monitored VNF.

Figure 35:
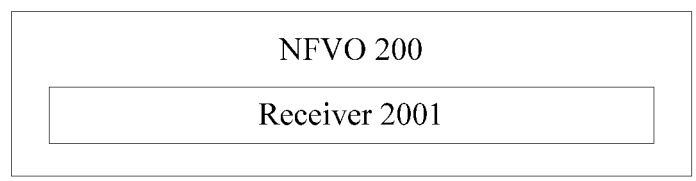
FIG. 35 is a schematic structural diagram of an NFVO according to Embodiment 20 of the disclosure.

As shown in FIG. 35, the NFVO 200 includes a receiver 2001.

The receiver 2001 is configured to receive, during monitoring, information about monitoring performed by the monitoring management entity on the to-be-monitored VNF.

According to the NFVO provided in Embodiment 20 of the disclosure, in the new NFV system provided in this embodiment of the disclosure, the NFV system includes the at least one VNF, the MANO, and the monitoring management entity, the MANO includes the VNFM and the NFVO, the monitoring management entity is the monitoring management unit of the one or more VNFs in the VNF, and the one or more VNFs are referred to as the to-be-monitored VNF. The NFVO includes the receiver. The receiver receives, during monitoring, the information about monitoring performed by the monitoring management entity on the to-be-monitored VNF. The MANO in this embodiment can obtain detailed VNF running information by using the monitoring management entity, so as to provide more comprehensive and more accurate data for determining a fault cause. This improves quality of network service provisioning.

Optionally, in a specific embodiment of the disclosure, the to-be-monitored VNF is located in a network service NS, a first monitoring unit and a second monitoring unit for monitoring the to-be-monitored VNF are configured in the NS, and the VNFM is further a life cycle management unit of the first and the second monitoring units.

The NFVO 200 further includes a processor 2002.

The receiver 2001 is configured to receive a monitoring unit software package uploaded by the monitoring management entity, where the software package includes a description file of the first and the second monitoring units.

The processor 2002 is configured to initiate a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

Optionally, in a specific embodiment of the disclosure, the processor 2002 is further configured to:

adjust the NS that includes the to-be-monitored VNF, so that communications connections are established between the first and the second monitoring units and the to-be-monitored VNF.

Optionally, in a specific embodiment of the disclosure, the processor 2002 is further configured to:

add the first and the second monitoring units to an original link that includes the to-be-monitored VNF; or create a dedicated test link based on an original link that includes the to-be-monitored VNF, where the test link includes the first and the second monitoring units.

Optionally, in a specific embodiment of the disclosure, the NFV system is connected to an operations support system OSS, and the NFVO 200 further includes a transmitter 2003.

The transmitter 2003 is configured to send the received monitoring information to the OSS.

Embodiment 21

Corresponding to Embodiment 7, Embodiment 21 of the disclosure provides a monitoring management entity, applied to a Network Functions Virtualization NFV system. The NFV system includes at least one virtualized network function VNF, a management and orchestration system MANO, and the monitoring management entity, and the MANO includes a virtualized network function manager VNFM and a network functions virtualization orchestrator NFVO.

A communications connection is established between the monitoring management entity and the MANO by using a corresponding interface. The monitoring management entity is a monitoring management unit of one or more VNFs in the VNF, and the one or more VNFs are referred to as a to-be-monitored VNF. The VNFM is a life cycle management unit of the to-be-monitored VNF.

Figure 36:
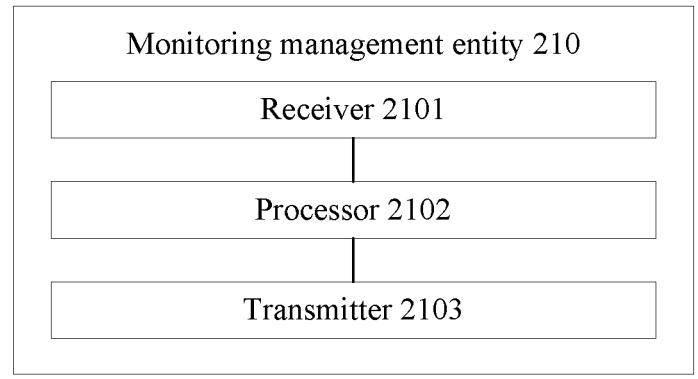
FIG. 36 is a schematic structural diagram of a monitoring management entity according to Embodiment 21 of the disclosure.

As shown in FIG. 36, the monitoring management entity 210 includes:

a receiver 2101, a processor 2102, and a transmitter 2103.

The receiver 2101 is configured to receive, during monitoring, monitoring data of monitoring the to-be-monitored VNF.

The processor 2102 is configured to summarize and analyze the monitoring data received by the receiver 2101, to obtain monitoring information of the to-be-monitored VNF.

The transmitter 2103 is configured to send the monitoring information to the NFVO.

According to the monitoring management entity provided in Embodiment 21 of the disclosure, in the new NFV system provided in this embodiment of the disclosure, the NFV system includes the at least one VNF, the MANO, and the monitoring management entity, the MANO includes the VNFM and the NFVO, the monitoring management entity is the monitoring management unit of the one or more VNFs in the VNF, and the one or more VNFs are referred to as the to-be-monitored VNF. The monitoring management entity includes: the receiver, configured to receive, during monitoring, the monitoring data of monitoring the to-be-monitored VNF; the processor, configured to summarize and analyze the monitoring data received by the receiver, to obtain the monitoring information of the to-be-monitored VNF; and the transmitter, configured to send the monitoring information to the NFVO. The MANO in this embodiment can obtain detailed VNF running information by using the monitoring management entity, so as to provide more comprehensive and more accurate data for determining a fault cause. This improves quality of network service provisioning.

Optionally, in a specific embodiment of the disclosure, the to-be-monitored VNF is located in a network service NS, a first monitoring unit and a second monitoring unit for monitoring the to-be-monitored VNF are configured in the NS, and the VNFM is further a life cycle management unit of the first and the second monitoring units.

The processor 2102 is further configured to upload a monitoring unit software package, where the software package includes a description file of the first and the second monitoring units.

The NFVO initiates a monitoring unit instantiation request to the VNFM, so that the VNFM instantiates the first and the second monitoring units based on the description file of the first and the second monitoring units, and therefore, communications connections are established between the first and the second monitoring units and the VNFM, and communications connections are established between the first and the second monitoring units and the monitoring management entity.

Optionally, in a specific embodiment of the disclosure, the processor 2102 is further configured to configure the first and the second monitoring units, so that the first monitoring unit sends test data to the to-be-monitored VNF according to configurations, and therefore, the test data is received by the second monitoring unit after being processed by the to-be-monitored VNF, and the second monitoring unit processes and analyzes the received processed test data to obtain the monitoring data, and sends the monitoring data to the monitoring management entity.

In this case, the receiver 2101 is specifically configured to receive the monitoring data of monitoring the to-be-monitored VNF, sent by the second monitoring unit.

Embodiment 22

Figure 37:
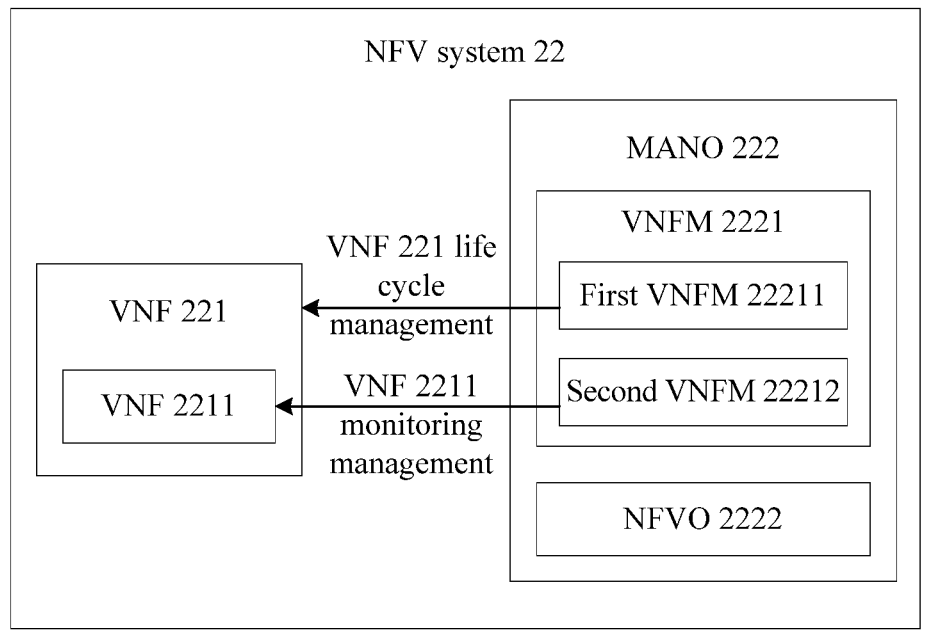
FIG. 37 is a system structure diagram of an NFV system according to Embodiment 22 of the disclosure.

Corresponding to Embodiment 1 and Embodiment 2, Embodiment 22 of the disclosure provides a Network Functions Virtualization NFV system 22. As shown in FIG. 37, the NFV system 22 includes at least one virtualized network function VNF 221 and a management and orchestration system MANO 222, and the MANO 222 includes at least two virtualized network function managers VNFMs 2221 and a network functions virtualization orchestrator NFVO 2222.

The at least two VNFMs 2221 include a first VNFM 22211 and a second VNFM 22212, the first VNFM 22211 is a life cycle management unit of the VNF 221, the second VNFM 22212 is a monitoring management unit of one or more VNFs in the VNF 221, and the one or more VNFs are referred to as a to-be-monitored VNF 2211.

The NFVO 2222 is configured to:

instantiate the second VNFM 22212 based on a software package of the second VNFM 22212, so that a communications connection is established between the second VNFM 22212 and the NFVO 2222; and receive, during monitoring, monitoring information that is sent by the second VNFM 22212 after the second VNFM 22212 summarizes and analyzes monitoring data.

The second VNFM 22212 is configured to:

establish a communications connection to the NFVO 2222 when the second VNFM 22212 is instantiated by the NFVO 2222;

receive the monitoring data of monitoring the to-be-monitored VNF 2211;

summarize and analyze the received monitoring data, to obtain the monitoring information of the to-be-monitored VNF 2211; and send, to the NFVO 2222, the monitoring information obtained after summarization and analysis.

Embodiment 22 of the disclosure provides the Network Functions Virtualization NFV system. A new MANO and NS architecture is deployed in the system. The second VNFM is the monitoring management unit of the one or more VNFs, and the one or more VNFs are referred to as the to-be-monitored VNF. The MANO in this embodiment can obtain detailed VNF running information by proactively monitoring the to-be-monitored VNF by using the second VNFM, so as to provide more comprehensive and more accurate data for determining a fault cause. This improves quality of network service provisioning.

Embodiment 23

Figure 38:
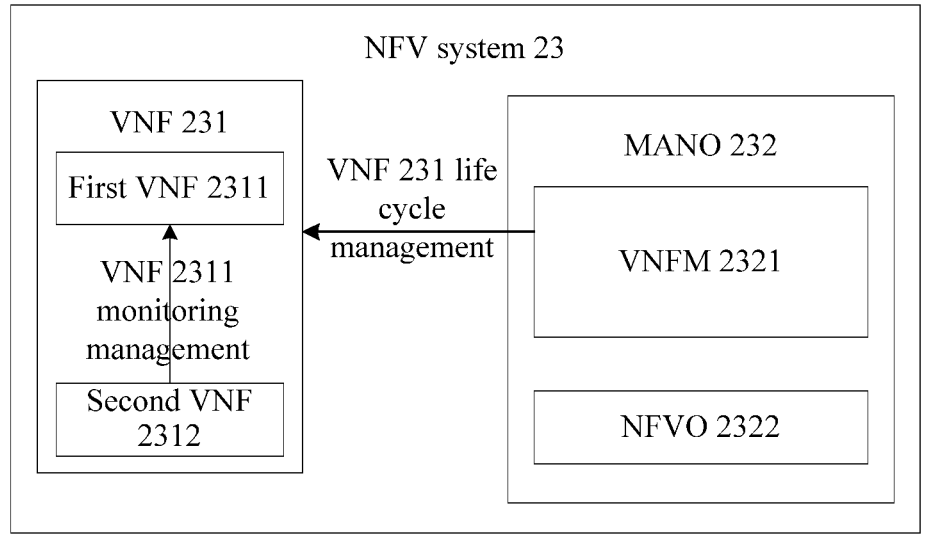
FIG. 38 is a system structure diagram of an NFV system according to Embodiment 23 of the disclosure.

Corresponding to Embodiment 3 and Embodiment 4, Embodiment 23 of the disclosure provides an NFV system 23. As shown in FIG. 38, the NFV system 23 includes a virtualized network function VNF 231 and a management and orchestration system MANO 232, the MANO 232 includes a virtualized network function manager VNFM 2321 and a network functions virtualization orchestrator NFVO 2322, and a communications connection is established between the VNFM 2321 and the NFVO 2322.

When there are at least two VNFs 231, the at least two VNFs 231 include a first VNF 2311 and a second VNF 2312. The second VNF 2312 is a monitoring management unit of the first VNF 2311, the first VNF 2311 is referred to as a to-be-monitored VNF 2311, and the VNFM 2321 is a life cycle management unit of the second VNF 2312 and the to-be-monitored VNF.

The NFVO 2322 is configured to:
initiate, to the VNFM 2321, a request for instantiating the second VNF, so that the VNFM 2321 instantiates the second VNF 2312 based on a description file of the second VNF 2312, and therefore a communications connection is established between the second VNF 2312 and the VNFM 2321; and receive, during monitoring, monitoring information that is sent by the second VNF 2312 after the second VNF 2312 summarizes and analyzes monitoring data.

The second VNF 2312 is configured to:
establish a communications connection to the VNFM 2321 when the second VNF 2312 is instantiated by the VNFM 2321;
receive monitoring data of monitoring the to-be-monitored VNF 2311;
summarize and analyze the received monitoring data, to obtain the monitoring information of the to-be-monitored VNF 2311; and
send, to the NFVO 2322, the monitoring information obtained after summarization and analysis.

Embodiment 23 of the disclosure provides the NFV system. A new MANO and NS architecture is deployed in the system. The second VNF is the monitoring management unit of the first VNF, the first VNF is referred to as the to-be-monitored VNF, and the VNFM is the life cycle management unit of the second VNF and the to-be-monitored VNF. The MANO in this embodiment can obtain detailed VNF running information by detecting the to-be-monitored VNF by using the second VNF, so as to provide more comprehensive and more accurate data for determining a fault cause. This improves quality of network service provisioning.

Embodiment 24

Figure 39:
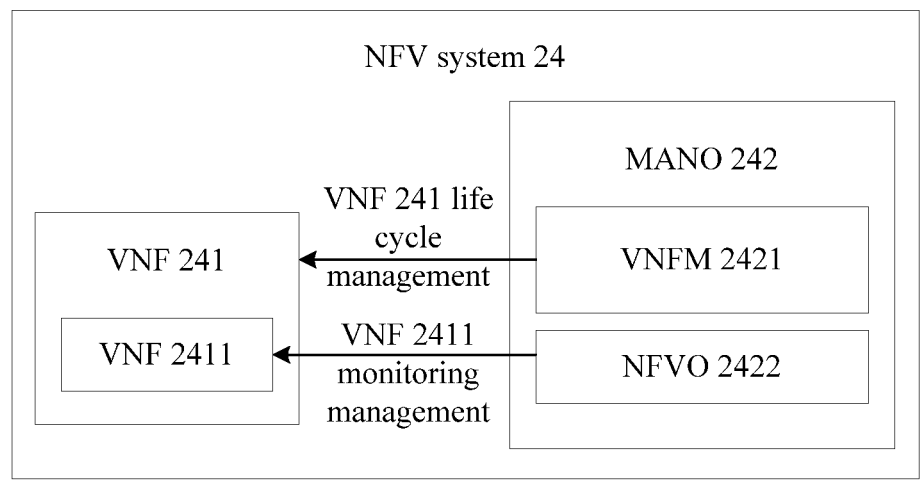
FIG. 39 is a system structure diagram of an NFV system according to Embodiment 24 of the disclosure.

Corresponding to Embodiment 5, Embodiment 24 of the disclosure provides a Network Functions Virtualization NFV system 24. As shown in FIG. 39, the NFV system 24 includes at least one virtualized network function VNF 241 and a management and orchestration system MANO 242, and the MANO 242 includes a virtualized network function manager VNFM 2421 and a network functions virtualization orchestrator NFVO 2422.

The NFVO 2422 is a monitoring management unit of one or more VNFs 2411 in the VNF 241, the one or more VNFs 2411 are referred to as a to-be-monitored VNF 2411, and the VNFM 2421 is a life cycle management unit of the to-be-monitored VNF 2411 (actually, the VNFM 2421 may also be considered as a life cycle management unit of the VNF 241).

The NFVO 2422 is configured to:
receive monitoring data of monitoring the to-be-monitored VNF 2411; and
summarize and analyze the received monitoring data, to obtain monitoring information of the to-be-monitored VNF 2411.

Embodiment 24 of the disclosure provides the NFV system. A new MANO and NS architecture is deployed in the system. The NFV system includes the at least one VNF and the MANO, the MANO includes the VNFM and the NFVO, and a communications connection is established between the VNFM and the NFVO. The NFVO is the monitoring management unit of the one or more VNFs, and the one or more VNFs are referred to as the to-be-monitored VNF. The MANO in this embodiment can obtain detailed VNF running information by detecting the to-be-monitored VNF by using the NFVO, so as to provide more comprehensive and more accurate data for determining a fault cause. This improves quality of network service provisioning. In addition, such a system in which the NFVO is reused avoids deployment of a dedicated test management unit. Therefore, management is relatively simplified.

Embodiment 25

Figure 40:
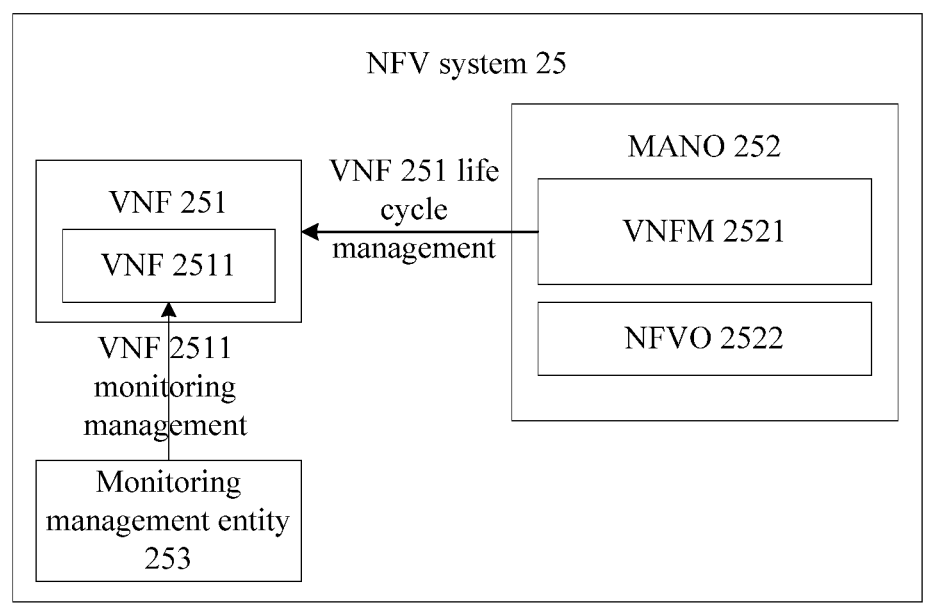
FIG. 40 is a system structure diagram of an NFV system according to Embodiment 25 of the disclosure.

Corresponding to Embodiment 6 and Embodiment 7, Embodiment 25 of the disclosure provides a Network Functions Virtualization NFV system 25. As shown in FIG. 40, the NFV system 25 includes at least one virtualized network function VNF 251, a management and orchestration system MANO 252, and a monitoring management entity 253, the MANO 252 includes a virtualized network function manager VNFM 2521 and a network functions virtualization orchestrator NFVO 2522, the monitoring management entity 253 is a monitoring management unit of one or more VNFs 2511 in the VNF 251, the one or more VNFs 2511 are referred to as a to-be-monitored VNF 2511, and the VNFM 2521 is a life cycle management unit of the to-be-monitored VNF 2511.

The NFVO 2522 is configured to:
receive, during monitoring, information about monitoring performed by the monitoring management entity 253 on the to-be-monitored VNF 2511.

The monitoring management entity 253 is configured to:
receive, during monitoring, monitoring data of monitoring the to-be-monitored VNF 2511;
summarize and analyze the received monitoring data, to obtain the monitoring information of the to-be-monitored VNF 2511; and
send the monitoring information to the NFVO 2522.

Embodiment 25 of the disclosure provides the NFV system. A new MANO and NS architecture is deployed in the system. The NFV system includes the at least one VNF, the MANO, and the monitoring management entity, the MANO includes the VNFM and the NFVO, the monitoring management entity is the monitoring management unit of the one or more VNFs in the VNF, and the one or more VNFs are referred to as the to-be-monitored VNF. The MANO in this embodiment can obtain detailed VNF running information by using the monitoring management entity, so as to provide more comprehensive and more accurate data for determining a fault cause. This improves quality of network service provisioning.

From descriptions of the foregoing implementations, it can be clearly understood by a person skilled in the art that, for ease and brevity of description, division of the foregoing function modules is merely an example for description. In actual application, the foregoing functions may be allocated, according to a requirement, to different function modules for implementation, that is, an internal structure of an apparatus is divided into different function modules to implement all or some of the functions described above. For specific working processes of the foregoing apparatuses, refer to corresponding processes in the foregoing method embodiments. Details are not described herein again.

In the several embodiments provided in this application, it should be understood that the disclosed apparatuses and methods may be implemented in other manners. For example, the foregoing apparatus embodiment is merely an example. For example, the module or unit division is merely logical function division, and may be other division in actual implementation. For example, multiple units or components may be combined, or may be integrated into another apparatus, or some features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or other forms.

The units described as separate parts may or may not be physically separate. Parts displayed as units may be one physical unit or multiple physical units, that is, may be located at one place or may be distributed at multiple different places. Some or all of the units may be selected according to an actual requirement, to achieve the objectives of the solutions in the embodiments.

In addition, functional units in the embodiments of the disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a readable storage medium. Based on such an understanding, the technical solutions of the disclosure essentially, or the part contributing to the conventional art, or all or a part of the technical solutions may be represented in a form of a software product. The software product is stored in a storage medium, and includes several instructions for instructing a device (which may be a single-chip microcomputer, a chip, or the like) or a processor to perform all or a part of the steps of the methods in the embodiments of the disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A virtualized network function (VNF) information obtaining method, comprising:

instantiating, by a network functions virtualization orchestrator (NFVO), a virtualized network function manager (VNFM) based on a software package of the VNFM to establish a communication connection between the VNFM and the NFVO;

receiving, by the NFVO during monitoring, monitoring information that is sent from the VNFM after the VNFM summarizes and analyzes monitoring data of a VNF in a network service (NS), and initiating, by the NFVO, a monitoring instantiation request to the VNFM, wherein the monitoring instantiation request is for instantiating a first monitoring and a second monitoring based on a description file and for establishing communication connections between the first and the second monitoring and the VNFM.

2. The method according to claim 1, further comprising:

adjusting, by the NFVO, the NS to establish communication connections between the first and the second monitoring and the VNF.

3. The method according to claim 1, further comprising:

receiving, by the NFVO, a monitoring request sent from an operations support system (OSS), wherein the monitoring request is used to request to monitor the VNF.

4. The method according to claim 3, wherein the monitoring request comprises:

identity (ID) information of the NS, ID information of the VNF, a test item, a test parameter, and authentication information.

5. The method according to claim 4, wherein:

the test item is an indicator that needs to be tested, and the test item comprises a processing delay and a packet loss rate; and the test parameter comprises a quantity of test times, a test frequency, a format of a test data packet, a quantity of result reporting times, and a result reporting frequency.

6. The method according to claim 2, wherein the adjusting the NS to establish the communication connections comprises:

adding the first and the second monitoring to an original link that comprises the VNF; or creating a dedicated test link based on an original link that comprises the VNF, wherein the dedicated test link further comprises the first and the second monitoring.

7. The method according to claim 1, further comprising:

sending, by the NFVO, the received monitoring information to an operations support system (OSS).

8. A virtualized network function (VNF) information obtaining apparatus, comprising:

at least one processor, a network interface, and a non-transitory computer readable storage medium storing a program for execution by the at least one processor, the program when executed causes the at least one processor to implement operations including:

instantiating a virtualized network function manager (VNFM) based on a software package of the VNFM to establish a communication connection between the VNFM and the VNF information obtaining apparatus;

receiving, during monitoring, monitoring information that is sent from the VNFM after the VNFM summarizes and analyzes monitoring data of a VNF in a network service (NS), and initiating a monitoring instantiation request to the VNFM, wherein the monitoring instantiation request is for instantiating a first monitoring and a second monitoring based on a description file and for establishing communication connections between the first and the second monitoring and the VNFM.

9. The apparatus according to claim 8, the operations further include:
adjusting the NS to establish communication connections between the first and the second monitoring and the VNF.

10. The apparatus according to claim 8, the operations further include:
receiving a monitoring request sent from an operations support system (OSS), wherein the monitoring request is used to request to monitor the VNF; or
receiving the monitoring request sent from the user, wherein the monitoring request is used to request to monitor the VNF.

11. The apparatus according to claim 10, wherein the monitoring request comprises:
identity (ID) information of the NS, ID information of the VNF, a test item, a test parameter, and authentication information.

12. The apparatus according to claim 11, wherein:
the test item is an indicator that needs to be tested, and the test item comprises a processing delay and a packet loss rate; and
the test parameter comprises a quantity of test times, a test frequency, a format of a test data packet, a quantity of result reporting times, and a result reporting frequency.

13. The apparatus according to claim 9, wherein the operation of adjusting the NS to establish the communication connections further includes:
adding the first and the second monitoring to an original link that comprises the VNF; or
creating a dedicated test link based on an original link that comprises the VNF, wherein the dedicated test link further comprises the first and the second monitoring.

14. The apparatus according to claim 8, the program further comprises instructions for:
sending the received monitoring information to an operation support system (OSS).

15. A virtualized network function (VNF) information obtaining apparatus, comprising:
at least one processor, a network interface, and a non-transitory computer readable storage medium storing a program for execution by the at least one processor, the program when executed causes the at least one processor to implement operations including:
establishing a communications connection to a network functions virtualization orchestrator (NFVO) when the VNF information obtaining apparatus is instantiated by the NFVO;
receiving monitoring data of a VNF;
summarizing and analyzing the received monitoring data to obtain monitoring information of the VNF; and
instantiating a first monitoring and a second monitoring based on a description file of the first and the second monitoring to establish communication connections between the first and the second monitoring and the VNFM.

16. The apparatus according to claim 15, wherein the operations further include:
configuring the first and the second monitoring;
wherein the operation of receiving the monitoring data of monitoring the VNF comprises:
receiving the monitoring data of monitoring VNF sent from the second monitoring.

17. The method according to claim 1, further comprising:
receiving, by the NFVO, a monitoring request sent by a user, wherein the monitoring request is used to request to monitor the VNF.

* * * * *